US012740920B2

(12) United States Patent
Hoebeke et al.

(10) Patent No.: US 12,740,920 B2
(45) Date of Patent: Sep. 22, 2026

(54) DEVICE FOR DOSING SOLID PARTICULATE MATERIAL

(71) Applicant: Lonza Sales AG, Basel (CH)

(72) Inventors: Hendrik Hoebeke, Bornem (BE); Hilde Buydts, Bornem (BE); Jan Bouquet, Bornem (BE)

(73) Assignee: Lonza Sales AG (CH)

( * ) Notice: Subject to any disclaimer, the term of this patent is extended or adjusted under 35 U.S.C. 154(b) by 0 days.

(21) Appl. No.: 18/730,388

(22) PCT Filed: Jan. 18, 2023

(86) PCT No.: PCT/EP2023/051109

§ 371 (c)(1),
(2) Date: Jul. 19, 2024

(87) PCT Pub. No.: WO2023/139114

PCT Pub. Date: Jul. 27, 2023

(65) Prior Publication Data

US 2025/0170025 A1 May 29, 2025

(30) Foreign Application Priority Data

Jan. 19, 2022 (EP) .................................... 22152283
Feb. 24, 2022 (EP) .................................... 22158418

(51) Int. Cl.
*A61J 3/07* (2006.01)
*B65B 1/04* (2006.01)
(Continued)

(52) U.S. Cl.
CPC ................ *A61J 3/074* (2013.01); *B65B 1/04* (2013.01); *B65B 1/26* (2013.01); *B65B 1/385* (2013.01);
(Continued)

(58) Field of Classification Search
CPC ........ A61J 3/074; G01F 11/003; G01F 11/18; G01F 15/125; B65B 1/04; B65B 1/26;
(Continued)

(56) References Cited

U.S. PATENT DOCUMENTS 3,893,492 A * 7/1975 Nohren .................... B65B 1/24 141/1
4,116,247 A * 9/1978 Zanasi ..................... B65B 1/38 141/81
(Continued)

FOREIGN PATENT DOCUMENTS

EP 0912396 5/2004
EP 0912396 B2 * 1/2011 ............ B65B 1/366
(Continued)

*Primary Examiner* — Robert F Long
*Assistant Examiner* — Eduardo R Ferrero
(74) *Attorney, Agent, or Firm* — Pandiscio & Pandiscio

(57) ABSTRACT

The present invention relates a dosing device, DOSDEV, for dosing solid particulate material into a receptacle, preferably into a capsule, the DOSDEV has a dosing element which has a tube shape which can be filled with the solid particulate material by sucking in the solid particulate material by means of a vacuum and wherein excess solid particulate material sticking to the entrance of the DOSDEV is blown off with gas.

25 Claims, 22 Drawing Sheets

(51) Int. Cl.

| | |
|---|---|
| ***B65B 1/26*** | (2006.01) |
| ***B65B 1/38*** | (2006.01) |
| ***G01F 11/00*** | (2006.01) |
| *B01L 3/02* | (2006.01) |
| *G01F 15/12* | (2006.01) |

(52) U.S. Cl.
CPC .......... *G01F 11/003* (2013.01); *B01L 3/0217* (2013.01); *B01L 2200/0657* (2013.01); *G01F 15/125* (2013.01)

(58) Field of Classification Search
CPC ......... B65B 1/38; B65B 1/385; B01L 3/0217; B01L 2200/0657
See application file for complete search history.

(56) References Cited

U.S. PATENT DOCUMENTS

| | | | | | |
|---|---|---|---|---|---|
| 4,341,244 | A * | 7/1982 | Facchini | A61J 3/074 | 141/286 |
| 4,542,835 | A * | 9/1985 | Gamberini | A61J 3/074 | 222/218 |
| 4,974,646 | A * | 12/1990 | Martin | B65D 90/54 | 406/84 |
| 5,438,396 | A * | 8/1995 | Mawdesley | G03G 15/087 | 399/256 |
| 5,823,046 | A * | 10/1998 | Schagerstrom | G01F 19/00 | 73/427 |
| 5,988,234 | A * | 11/1999 | Wegman | B65B 1/12 | 141/93 |
| 6,024,141 | A * | 2/2000 | Wegman | B65B 1/12 | 141/2 |
| 6,056,025 | A * | 5/2000 | Wegman | B65B 1/12 | 141/70 |
| 6,098,677 | A * | 8/2000 | Wegman | B65B 39/004 | 141/286 |
| 6,102,088 | A * | 8/2000 | Wegman | B65B 1/12 | 141/47 |
| 6,327,835 | B1 * | 12/2001 | Trebbi | A61J 3/074 | 53/53 |
| 6,393,926 | B1 * | 5/2002 | Bowersox, Jr. | B01L 3/0217 | 73/864.64 |
| 6,702,990 | B1 * | 3/2004 | Camacho | B01L 3/0217 | 83/167 |
| 7,247,275 | B2 * | 7/2007 | Caldwell | G01N 27/44717 | 83/167 |
| 7,836,922 | B2 * | 11/2010 | Poole | B65B 1/12 | 141/12 |
| 8,770,048 | B2 * | 7/2014 | Khuzwayo | G01N 1/16 | 73/864.51 |
| 9,221,561 | B2 * | 12/2015 | Maheshwari | B65B 1/46 | |
| 10,724,884 | B2 * | 7/2020 | Peters | G01F 11/003 | |
| 10,835,451 | B2 * | 11/2020 | Van Goolen | B65B 1/04 | |
| 11,801,950 | B2 * | 10/2023 | Rapparini | B65B 1/26 | |
| 2002/0015666 | A1 * | 2/2002 | Vann | B01L 3/0289 | 436/180 |
| 2003/0131905 | A1 * | 7/2003 | Duffield | B65B 1/38 | 141/125 |
| 2004/0011425 | A1 * | 1/2004 | Wegman | G03G 15/0879 | 141/311 A |
| 2006/0064943 | A1 * | 3/2006 | Trebbi | B65B 35/06 | 53/454 |
| 2007/0071652 | A1 * | 3/2007 | Cherng | B01L 3/0289 | 422/400 |
| 2007/0131707 | A1 * | 6/2007 | Poole | B65B 1/12 | 222/14 |
| 2007/0169839 | A1 * | 7/2007 | Ansaloni | A61J 3/074 | 141/144 |
| 2014/0238536 | A1 * | 8/2014 | Kumakura | B65D 83/06 | 141/67 |
| 2016/0067704 | A1 * | 3/2016 | Nitsch | B01L 3/0217 | 73/864.11 |
| 2018/0340809 | A1 * | 11/2018 | Peters | G01F 11/027 | |
| 2019/0233140 | A1 * | 8/2019 | Rapparini | B65B 1/42 | |
| 2024/0041780 | A1 * | 2/2024 | Laurichesse | A61K 9/4883 | |

FOREIGN PATENT DOCUMENTS

| | | | | |
|---|---|---|---|---|
| EP | 3295920 | | 3/2018 | |
| EP | 3295920 B1 | * | 12/2020 | A61J 3/074 |
| KR | 20170121395 A | * | 11/2017 | B65B 1/06 |
| WO | WO-2018017550 A1 | * | 1/2018 | A61J 3/074 |

* cited by examiner 2
2-1
2-8, 2-9
2-2
1-4
1-2
1-1
1-3
1-7
1-5
1-6
1

1-9
1-8
2-2
1-15, 1-16, 1-17
1-12, 1-13, 1-14

2
1-12
1
1
1

2
1-12
1-6
1
1
1
1
1
1
1
1
1

SECTION A-A
2
2-1
1-4
2-2
1
SECTION RECT

2
A
A

2
C
C
B
B
1-6
1
1
1
1
1
1
1
1
1
D

DEVICE FOR DOSING SOLID PARTICULATE MATERIAL

FIELD OF THE INVENTION

The present invention relates a dosing device, DOSDEV, for dosing solid particulate material into a receptacle, preferably into a capsule, the DOSDEV has a dosing element which has a tube shape which can be filled with the solid particulate material by sucking in the solid particulate material by means of a vacuum and wherein excess solid particulate material sticking to the entrance of the DOSDEV is blown off with gas.

BACKGROUND OF THE INVENTION

EP 3 295 920 A1 discloses a capsule filling machine comprising a transfer turret arranged to transfer the capsules through successive operating stations, including at least one dosing station arranged to fill capsule bodies of the capsules with a product (P) and comprising a dosing turret and a first dosing unit mounted on the dosing turret, the first dosing unit comprises a dosing cylinder and a piston movable within the dosing cylinder at least between a first internal position (D), wherein it forms within the dosing cylinder, a dosing chamber for holding a product dose (P1), and an ejection position (E) to push the product dose (P1) out of the dosing cylinder to a respective capsule body.

U.S. Pat. No. 10,835,451 B2 discloses an apparatus for dosing solid particulate material into one or more receptacles, the apparatus comprising: a reservoir for containing an amount of solid particulate material; a dosing unit comprising a dose collection position for collecting a predetermined dose of solid particulate material from the reservoir, and a dose release position for releasing the solid particulate material into the one or more receptacles; the dosing unit comprises a dosing chamber with an aperture which is immersed into the solid particulate material, while immersed in the solid particulate material a predetermined amount of the solid particulate material is sucked through the aperture into the dosing chamber by means of a vacuum and is also retained in the dosing chamber by means of said vacuum, after sucking in the predetermined amount of solid particulate material the dosing chamber with its aperture is emersed from the solid particulate material. Once emersed from the solid particulate material still excess solid particulate material may stick to an outer surface of the dosing chamber around or proximal to the aperture. The apparatus has a dosing chamber leveler, also called scraper, arranged to remove such excess solid particulate material sticking to an outer surface of the dosing chamber around or proximal to the aperture. With the scraper the dosing chamber is scraped. This is done to improve accuracy of the dose by more thorough elimination of excess solid particulate material residue that may stick to the outer surface of the dosing chamber around or in the proximity of the aperture.

The scraper is cantilevered from a portion of the reservoir and/or dosing unit or else and have a protruding surface proximal to an apex thereof to form a shape such as semi-circular or rectilinear.

When the dosing unit comprises a multitude of dosing chambers and the apparatus comprises a respective multitude of scrapers, the scrapers need to be adjusted very accurately relative to the position of the dosing chambers so that for example the distances between the apertures of the dosing chamber and the respective scrapers are all the same, small variations already lead to undesired variance of the doses. This accurate adjustment needs time and extra effort. Furthermore there is a risk that one or more scarpers break during operation which may result in pieces of scraper ending in the solid particulate material, that is in the dose. In case that the solid particulate material is a drug substance or a nutritional this contamination by broken pieces of scraper must be avoided under any circumstances.

There was a need for a dosing chamber for solid particulate material which allows for enhancement of the accuracy and reproducibility of the dose by controlled removal of excess solid particulate material extending over the aperture to the outside of the chamber and/or sticking to the outside of the dosing chamber. The effort of time consuming adjustment of the positions of scrapers relative to the aperture of the dosing chamber should be reduced or even avoided, and another objective is that the risk of broken pieces of scrapers finding their way into the dose should be minimized or even avoided.

The problem was solved by using a dosing chamber which allows for removal of such excess of solid particulate material by a gas jet.

With the present invention a number of advantages can be achieved. In particular, the provision of the slit allows for a reliable removal of particulates from the dispensing opening of DOSDEV without mechanical scrapping elements.

SUMMARY OF THE INVENTION

Subject of the invention is a dosing device, DOSDEV, for dosing solid particulate material into a receptacle;

- DOSDEV comprises a dosing element which consists of two parts, an inner tube shaped extension and an outer tube shaped extension, both extensions protrude downwards at the lower side of DOSDEV;
- the inner tube shaped extension and the outer tube shaped extension are coaxially aligned with respect to each other;
- the inner tube shaped extension is located within the outer tube shaped extension;
- the outer diameter of the inner tube shaped extension is smaller than the inner diameter of the outer shaped extension, whereby a space, SPACE, is formed between the outer tube shaped extension and the inner tube shaped extension, the SPACE extending circumferentially around the inner tube shaped extension;
- the inside of the inner tube shaped extension forms a dosing chamber;
- the opening at the lower end of the inner tube shape extension forms an opening of the dosing chamber at its lower end;
- the wall of the outer tube shaped extension extends beyond the rim of the end of the wall of the inner tube shaped extension in axial direction and has a bend, BEND, in the axial proximity of the end of the wall of the inner tube shaped extension, by this BEND the wall of the outer tube shaped extension extends radially inwards at least partially around the end of the inner tube shaped extension;
- the outer tube shaped extension ends with an opening whose diameter is smaller than the inner diameter of the outer tube shaped extension axially upwards before the BEND;
- the SPACE extends over the inner surface of the BEND and further on to the rim of the end of the wall of the outer tube shaped extension, thereby radially inwards from the BEND the SPACE ends in an opening slit, SLIT, between the end of the inner tube shaped extension and the end of the outer tube shaped extension;

the rim of the end of the wall of the outer tube shaped extension does not extend in a radial inward direction beyond the inner diameter of the end of wall of the inner tube shaped extension.

With the present invention a number of advantages can be achieved. In particular, the provision of the slit allows for a reliable removal of particulates from the dispensing opening of DOSDEV without mechanical scrapping elements.

Abbreviations

ANGLE the angle of the end of the wall of the outer tube shaped extension introduced by the BEND relative to the axial direction of the outer tube shaped extension BEND the bend in the wall of the outer tube shaped extension located in the axial proximity of the end of the wall of the inner tube shaped extension; bending the wall of the outer tube shaped extension radially inwards at least partially around the end of the inner tune shaped extension DOSDEV device for dosing solid particulate material into a receptacle D50 Mass-median-diameter (MMD), the average particle diameter by mass FWHM Full Width at Half Maximum IDR inner diameter of the rim of the upper end of a lower tube, that is the inner diameter of the rim of the upper end of the upper section of the lower tube NUM-DE the number of dosing elements comprised in DOSDEV.

NUM-DE-CONNECTED is the number of dosing elements which are actually connected to DOSDEV NUM-DE-SODE number of dosing elements contained in a SODE POS-DE number of positions of a dosing element sigma Relative standard deviation or degree of polydispersity SLIT the slit between the end of the inner tube shaped extension and the end of the outer tube shaped extension SLIDE the slide formed when the upper channel is a straight channel with a direction in TRANSDEV not parallel to the vertical direction, but with an angle against the vertical direction of from greater than 0 to smaller than 90°

SODE a set of dosing elements, wherein the inner diameter of the inner tube shaped extension of anyone of the dosing element contained in the set is different from the inner diameter of the inner tube shaped extension of any other of the dosing elements contained in the set; so all inner diameters of the inner tube shaped extensions in the set are different SOLT set of lower tubes, wherein the diameter of the discharging opening of each lower tube is different from any other, so all the diameters of the discharging opening of the lower tubes are different SPACE space between the outer tube shaped extension and the inner tube shaped extension extending circumferentially around the inner tube shaped extension SPACECAV space cavity to which each SPACE of each dosing element connects

DETAILED DESCRIPTION OF THE INVENTION

The receptacle, into which the solid particulate material is to be dosed, may be a two piece hard capsule. Two piece hard capsules are used for medical and nutritional applications, for example for administering pharmaceuticals or nutraceuticals to a human. Standard sizes of such two piece hard capsules available on the market are known to the skilled person, they are cited for example in "Technical Reference File Hard Gelatin Capsules" of Capsugel Library, 2nd Edition, www.capsugel.com, now a Lonza company.

Wall thickness may range from 80 to 120 micrometers, a typical value is 100 micrometer The terms "capsule" and "capsule shell" are often used interchangeably, also in this invention, sometimes, for example in prior art publications, a distinction is made, and then usually the term "capsule shell" means the empty capsule and the term "capsule" means the capsule filled with a pharmaceutical or some other substance.

A two piece hard capsule, which may also be called a two part hard capsule, consists of two parts, a cap and a body.

Typical sizes of a body of a two piece hard capsule are given in Table 1 for the two extreme capsule sizes 000 and 5 for had gelatin capsules:

TABLE 1

| Size | 000 | 5 |
|---|---|---|
| length [mm] | 22.2 | 9.3 |
| external diameter [mm] | 9.6 | 4.7 |
| approx. volume [ml] | 1.37 | 0.13 |

In capsule filling machines the body is filled with the desired content of the capsule, in case of this invention the desired solid particulate material is filled into the body. So to be more specific, when it is said that the receptacle is a two piece hard capsule, then the receptacle, into which the solid particulate material is to be dosed, is the body of a two piece hard capsule. The filling of the capsule can be done with the desired solid particulate material only or it can be a filling with the desired solid particulate material and with any other material, this other material can be solid or liquid and can be filled before or after the filling of the solid particulate material with the DOSDEV.

DOSDEV accordingly is adapted for filling a receptacle, which is a two piece hard capsule used for medical and nutritional applications, for example the size of DOSDEV is adapted to the typical sizes of two piece hard capsule, such as the volume of DOSDEV being adapted to the typical volumes of bodies of two piece hard capsules. In particular the volume of the dosing chamber can be adapted to the volume of a body of a two piece hard capsule; and/or the size of the outer diameter of the dosing element can be adapted, that is it can be equal or smaller, preferably smaller, then the inner diameter of the body.

The term "inner surface of the cap or of the body" means "inner surface of the wall of the cap or of the body" and are used interchangeably, if not stated explicitly otherwise.

A typical cap of a capsule comprises two parts, a closed end, which is often dome shaped, and a part, usually of cylindrical shape, which abuts the closed end and which ends with the open end of the cap, this open end is a rim enclosing the opening of the cap, it can also be called the edge of the open end of the cap.

Likewise a typical body of a capsule comprises similar two part, a closed end, which is often dome shaped, and a part, usually of cylindrical shape, which abuts the closed end and which ends with the open end of the body, this open end is a rim enclosing the opening of the body, it can also be called the edge of the open end of the body.

Telescopic engagement in the sense of this invention means an at least partial contact of the inner wall of the cap with the outer wall of the body. It also means that cap and body overlap in a closed capsule, and where they overlap in the closed position, they show an at least partial fit of their forms. The telescopic engagement of the cap and the body may be realized by sliding the cap over the body, in other words by inserting the body into the cavity of the cap. The body is slid with the open end first into the cavity of the cap. Thereby the cap and the body are at least partially form fittingly connected or engaged. So telescopic engagement means an at least partial form fitting engagement of the cap with the body.

The outer diameter of the cylindrical part of the body is equal to or slightly smaller than the inner diameter of the cylindrical part of the cap. When the capsule is closed by telescopic engagement of the cap with the body, at least part of the, preferably cylindrical, part of the cap slides over at least part of the, preferably cylindrical, part of the body, thereby a region of overlap is defined, where at least a part of the wall of the, preferably cylindrical, part of the cap overlaps with at least a part of the wall of the, preferably cylindrical, part of the cap. A closed capsule shell may have an essentially hollow-cylindrical shape.

When using terms of direction such as downward or upwards, and of position such as the terms lower or upper, then these terms refer to the vertical direction.

When referring herein to the horizontal direction then the direction perpendicular to the vertical direction is meant.

If not mentioned differently, the directions relate to a DOSDEV and a dosing element in an operational state.

The inner and the outer tube shaped extension have an axial and a radial direction; the axial direction is parallel to the axis of the tube shaped extension; the radial direction in the direction of the radius of the tube shaped extension.

Preferably, the inner tube shaped extension is located in the center of the outer tube shaped extension.

The inner tube shaped extension may be a part which is separable from the outer tube shaped extension and from any other part of the DOSDEV, or it may be an integral part of the outer tube shaped extension or of the DOSDEV.

The outer tube shaped extension may be a part which is separable from the inner tube shaped extension and from any other part of the DOSDEV, or it may be an integral part of the inner tube shaped extension or of the DOSDEV.

The dosing element may be a part which is separable from any other part of DOSDEV, or it may be an integral part of the DOSDEV.

In a preferred embodiment, the inner tube shaped extension and the outer tube shaped extension are two parts which are separable from each other and from any other part of DOSDEV.

When DOSDEV comprises the dosing element as a part which is separable from any other part of DOSDEV, then DOSDEV comprises at least two parts, the dosing element and a body of DOSDEV which has a position of a dosing element where the dosing element can be connected to the body of DOSDEV.

When at least one part or preferably both parts of the dosing element are parts which are separable from any other part of DOSDEV and from each other respectively, then maintenance, such as an exchange of a filter element which is mentioned herein, and cleaning is facilitated.

The dosing element and herewith also the inner tube shaped extension and the outer tube shaped extension may have two sections, an upper section and a lower section, with the lower section being the protruding section of the dosing element, that is the protruding section of the inner tube shaped extension and the protruding section of the outer tube shaped extension respectively, whereas the upper section being located within the other part of DOSDEV.

The lower section of the dosing element contains the lower section of the inner tube shaped extension and the lower section of the outer tube shaped extension.

The upper section of the dosing element contains the upper section of the inner tube shaped extension and the upper section of the outer tube shaped extension.

Preferably, at least the protruding section of the inner tube shaped extension, has the shape of a tube, more preferably the protruding section of the inner tube shaped extension, has the shape of a tube with a constant inner diameter over the axial extension of this tube shaped lower section, that means that the inner diameter of the lower section of the inner tube shaped extension and the diameter of the opening of the dosing chamber are identical;

at least the protruding section of the outer tube shaped extension, has the shape of a tube.

Thereby the lower section of the dosing element, that is the protruding section of the dosing element, has the shape of a tube.

DOSDEV and the body of DOSDEV respectively, can be described as having an upper and a lower section.

Preferably, the inner tube shaped extension and the outer tube shaped extension are located in the lower section of DOSDEV.

Preferably, the inner tube shaped extension and the outer tube shaped extension are located in the lower section of DOSDEV and are two parts which are separable from any other part of DOSDEV and from each other; more preferably, the inner tube shaped extension and the outer tube shaped extension form the lower section of DOSDEV and are two parts which are separable from any other part of DOSDEV and from each other.

The lower section of the dosing element and thereby both the lower sections of the inner and outer tube shaped extension protrude axially downwards, preferably vertically downwards. Since the dosing element is a part of DOSDEV, this protrusion of the dosing element is the bottom of DOSDEV; the lower end of the dosing element, that is the lower end of the outer tube shaped extension, is the lower end of DOSDEV.

Preferably, the protruding part of the outer tube shaped extension protrudes with an axial length of 5 to 30 mm, more preferably 5 to 20 mm, more preferably 5 to 18 mm, even more preferably 8 to 18 mm, especially 10 to 16 mm axially downwards. A typical axial length may be 13 mm.

DOSDEV may be a device that comprises more than one dosing element, with DOSDEV and the dosing element as described herein, also with all their embodiments.

Preferably, when DOSDEV is a device that comprises more than one dosing element, then all dosing elements are identical to each other.

When DOSDEV comprises more than one dosing element, then the dosing elements may be parts which are separable from each other and from any other part of DOSDEV; preferably all the dosing elements of DOSDEV are parts which are separable from each other and from any other part of DOSDEV.

When DOSDEV comprises more than one dosing element which are parts which are separable from each other and from any other part of DOSDEV, then DOSDEV comprises the body of DOSDEV which contains a number of positions of a dosing element, POS-DE, where a dosing element can be connected to DOSDEV.

NUM-DE is the number of dosing elements comprised in DOSDEV.

NUM-DE and POS-DE are both integer values;

NUM-DE-CONNECTED is the number of dosing elements which are actually connected to DOSDEV with NUM-DE-CONNECTED=1 to POS-DE;

in case that all dosing elements contained in DOSDEV are integral parts of DOSDEV which cannot be separated from DOSDEV, then NUM-DE-CONNECTED is equal to POS-DE;

in case that at least one of the dosing elements contained in DOSDEV is a part which is separable from any other part of DOSDEV, then NUM-DE-CONNECTED can be equal to or smaller than POS-DE;

in case that DOSDEV comprises more than one dosing element which are parts which are separable from each other and from any other part of DOSDEV, then NUM-DE is equal to POS-DE, and NUM-DE-CONNECTED can be equal to or smaller than NUM-DE.

For the ease of reading it is assumed that even when at least one dosing element is a part which is separable from any other part of DOSDEV, nevertheless all dosing elements are connected in DOSDEV for the sake of this description, so that POS-DE, NUM-DE and NUM-DE-CONNECTED are the same; but the skilled person is aware that a dosing operation can be run with such a DOSDEV where NUM-DE-INSTALLED is smaller than POS-DE.

For example NUM-DE or POS-DE respectively, may be equal to the number or to a fraction of the number of positions for capsules per capsule holder on commercially available capsule filling machines. NUM-DE or POS-DE respectively may be from 1 to 48, preferably from 1 to 40, more preferably from 1 to 25, even more preferably from 1 to 20, especially from 1 to 15, more especially from 1 to 10; a typical value of NUM-DE or POS-DE respectively is 9.

When NUM-DE or POS-DE respectively is greater than 1, that is when DOSDEV is a device that contains more than one dosing element, then preferably all dosing elements contained in DOSDEV protrude axially with the same axial length, and all the lower ends of the dosing elements of DOSDEV, that is all the lower ends of the outer tube shaped extensions are horizontally aligned with each other with respect to their vertical position in DOSDEV. Preferably, when DOSDEV contains more than one dosing element, then the protruding part of any dosing element is not connected or in touch with the protruding part of any other dosing element, but is spaced apart or offset from the protruding part of any respective other dosing element.

The SPACE is provided where the outer tube shaped extension does not touch the inner tube shaped extension, that is where the inner wall of the outer tube shaped extension does not touch the outer wall of the inner tube shaped extension. The SPACE ends downwards with the SLIT. The SLIT extends circumferentially around the opening of the dosing chamber. The SPACE extends circumferentially around the end of the inner tube shaped extension. From the axially upper beginning of the BEND, the SPACE extends over the inner surface of the BEND and further on to the rim of the end of the wall of the outer tube shaped extension, that is into the SLIT. So the lower end of SPACE is the SLIT. In the axially upward direction starting from the SLIT, the SPACE extends at least over the BEND. Preferably the SPACE extends axially upwards from the BEND at least for a certain length along the outer wall of the inner tube shaped extension; preferably this certain length being equal to or smaller than the length of the inner tube shaped extension.

By the BEND in the axial proximity of the end of the wall of the inner tube shaped extension, that is after the BEND in the radially inward direction towards the end of the outer tube shaped extension, the wall of the outer tube shaped extension ends radially inwards with an angle, ANGLE, relative to the axial direction of the outer tube shaped extension, ANGLE is from 45 to 90°, preferably from 60 to 90°, more preferably from 70 to 90°, even more preferably from 80 to 90°, in particular 90°. ANGLE of 90° means that the wall of the outer tube shaped extension ends in the horizontal direction radially inwards, if the axis of the outer tube shaped extension is vertically arranged.

By the BEND any gas exiting the SPACE through the SLIT exits no longer axially, in particular vertically, but exits the SPACE through the SLIT in the direction of ANGLE radially inwards.

The requirement that the rim of the end of the wall of the outer tube shaped extension does not extend in a radial direction beyond the inner diameter of the end of wall of the inner tube shaped extension, means that the diameter of the opening of the outer tube shaped extension is equal to or larger than the diameter of the inner diameter of the inner tube shaped extension at its lower end, which forms the opening of the dosing chamber.

The rim of the end of the wall of the inner tube shaped extension actually has two edges and extends between these two edges, an inner edge and an outer edge, the inner edge is the end of the inner surface of the wall of the inner tube shaped extension, the outer edge is the end of the outer surface of the wall of the inner tube shaped extension. Preferably, the end of the wall of the outer tube shaped extension extends at least so far radially inwards that the end of the wall of the outer tube shaped extension ends with a rim that is axially aligned with the outer edge of the rim of the end of the wall of the inner tube shaped extension, that means it is axially aligned with the outer surface of the inner tube shaped extension; this means that the diameter of the opening of the outer tube is equal to or smaller than the outer diameter of the inner tube shaped extension.

Preferably, the outer tube shaped extension ends with an opening whose diameter is smaller than the inner diameter of the outer tube shaped extension axially upwards before the BEND, preferably whose diameter is equal to or smaller than the outer diameter of the inner tube shaped extension, and whose diameter is not smaller than the inner the diameter of the inner tube shaped extension.

Even more preferably, ANGLE is 90° and the end of the wall of the outer tube shaped extension ends with a rim that is vertically aligned with the inner surface of the inner tube shaped extension. This means that the diameter of the opening of the outer tube is equal to the inner diameter of the lower end of the inner tube shaped extension, that also means that the diameter of the opening of the outer tube shaped extension is equal to the opening of the dosing chamber. Thereby any gas exiting the SPACE through the SLIT exits in the horizontal direction radially inwards.

Preferably, the width of the SLIT is from 0.1 to 1 mm, more preferably from 0.1 to 0.75 mm, even more preferably from 0.1 to 0.5 mm, especially from 0.2 to 0.4 mm, more especially from 0.25 to 0.35 mm. A typical value of the width of the SLIT may be 0.3 mm.

Preferably, the inner diameter of the lower section of the inner tube shaped extension is from 3 to 10 mm, more preferably 4 to 9 mm; typical inner diameters may be 4 mm, 5 mm, 6 mm and 8 mm. This inner diameter of the inner tube shaped extension is the diameter of the opening of the dosing chamber.

Preferably, the thickness of the wall of the lower section of the inner tube shaped extension is from 0.2 to 5 mm, more preferably from 0.2 to 3 mm, even more preferably from 0.2 to 2 mm, especially from 0.3 to 1.5 mm, more especially from 0.3 to 1 mm; a typical thickness may be 0.5 mm.

Typical outer diameters of the lower section of the inner tube shaped extension may be 5 mm, 6 mm, 7 mm and 9 mm.

Preferably, the radial width of the SPACE in the lower section of the dosing element axially upwards from the BEND is from 0.1 to 3 mm, more preferably from 0.25 to 2 mm, even more preferably from 0.25 to 1.5 mm; especially from 0.25 to 1 mm; a typical width of the SPACE in the lower section of the dosing element axially upwards from the BEND may be 0.5 mm.

Typical inner diameters of the lower section of the outer tube shaped extension axially upwards from the BEND may be 6 mm, 7 mm, 8 mm and 10 mm.

Preferably, the thickness of the wall of the lower section of the outer tube shaped extension axially upwards from the BEND is from 0.2 to 5 mm, more preferably from 0.2 to 3 mm, even more preferably from 0.2 to 2 mm, especially from 0.3 to 1.5 mm, more especially from 0.3 to 1 mm; a typical thickness may be 0.5 mm.

Typical outer diameters of the lower section of the outer tube shaped extension axially upwards from the BEND may be 7 mm, 8 mm, 9 mm and 11 mm.

Preferably, the inner diameter of the end of the outer tube shaped extension is from 3 to 11 mm, more preferably from 3.5 to 9.5 mm; typical inner diameters may be 4 mm, 5 mm, 6 mm and 8 mm.

Typical values for four dosing elements DE1, DE2, DE3 and DE4 may be according to Table 2:

TABLE 2

| | diameter of the opening of the dosing chamber [mm] | inner diameter of the end of the outer tube shaped extension [mm] |
|---|---|---|
| DE1 | 4 | 4 |
| DE2 | 5 | 5 |
| DE3 | 6 | 6 |
| DE4 | 8 | 8 |

Preferably, in DE1, DE2, DE3 and DE4, the thickness of the wall of the inner tube shaped extension is 0.5 mm;

the radial width of the SPACE is 0.5 mm;

the thickness of the wall of the outer tube shaped extension is 0.5 mm the width of the SLIT is 0.3 mm.

The diameter of the opening of the dosing chamber, as well as the diameter of the dosing chamber, are chosen according to the particle size of the solid particulate material, for example a fine solid particulate material with a particle size of around 0.1 mm may be dosed with a dosing element having a diameter of the opening of the dosing chamber of 4 mm, whereas a solid particulate material with a particle size of around 2 mm is rather dosed with a dosing element having a diameter of the opening of the dosing chamber of 8 mm. The diameter may also be adjusted to the amount to be dosed.

The dosing chamber is the interior of the inner tube shaped extension. The lower side of the dosing chamber is the opening of the dosing chamber, that is the opening of the inner tube shaped extension. The upper side of the dosing chamber is limited by a radial wall, preferably by a horizontal wall, comprising a filter element, the filter element comprises a filter. So the DOSDEV further comprises the filter element.

The filter provides for retaining solid particulate material in the dosing chamber, the filter allows for applying either vacuum or an air blow to the dosing chamber through the filter.

The inner tube shaped extension may end axially upwards with the radial wall limiting the dosing chamber, or the inner tube shaped extension may extend beyond the radial wall.

Preferably, the filter is located in the center of the radial wall delimiting the dosing chamber. Preferably, the filter element and the filter have a round, flat shape.

In one embodiment the filter element is a disk containing the filter, preferably the disk containing the filter is realized in the shape of a flat ring containing the filter.

In another embodiment the filter element is the filter.

In another embodiment, the radial wall is the filter element and the filter element is the filter, so the radial wall is the filter.

In another embodiment, the radial wall delimiting the dosing chamber is the filter element; more preferably with the filter element being a ring containing the filter or being the filter.

The lower side of the filter element and of the filter respectively face the dosing chamber.

The filter of the filter element has a mesh size that is smaller than the average particle diameter of the solid particulate material that is being dosed by DOSDEV. Thereby any sucking of solid particulate material through the filter out of the dosing chamber is prevented. So the filter effectively retains the solid particulate material in the dosing chamber while allowing for applying vacuum to the dosing chamber for sucking solid particulate material into the dosing chamber. This mesh size can also be or be called a pore size or an opening size or an aperture size.

The mesh size of the filter can be chosen and adapted to the particle size of the solid particulate material that is to be dosed; for example for particle sizes of from 80 micrometers to 2 mm a mesh size of from 35 to 45, preferably of from 40 to 45 micrometers can be conveniently used; a typical mesh size may be 43 micrometers.

With a mesh size from 35 to 45 micrometers typical values for the open and passable area of the filter may be from 8 to 15% of the area of the filter.

Preferably the area of the filter is at least 10%, more preferably at least 15%, of the area of the radial wall delimiting the upper end of the inner tube shaped extension; typical areas are from 20 to 60%.

The dosing chamber extends in the inner tube shaped extension from the opening of the dosing chamber axially upwards to the radial wall containing the filter element. Preferably, the dosing chamber has a cylindrical form; the axial wall of the cylinder forming the dosing chamber are formed by the inner tube shaped extension, the lower end of the cylinder forming the dosing chamber is the opening of the inner tube shaped extension, that is the opening of the dosing chamber, and the top end of the cylinder forming the dosing chamber is delimited by the radial wall containing the filter element. The opening of the dosing chamber and the dosing chamber are in fluid connection through the filter with a channel which starts from the upper side of the filter and extends through at least the upper part of DOSDEV, this channel can be connected to a vacuum supply and is called the vacuum channel herein; the vacuum can be applied via the vacuum channel to the dosing chamber and can be used to suck up solid particulate material through the opening of the dosing chamber into the dosing chamber. The dosing chamber can also be in fluid connection through the filter and through the vacuum channel with a gas supply for applying an air blow via the vacuum channel and through the filter into the dosing chamber. Thereby both alternatives are possible: applying an air blow or a suction via the vacuum channel and through the filter into the dosing chamber.

Preferably, the inner diameter of the dosing chamber is constant from its lower end, that is from the opening of the dosing chamber, up to the radial wall delimiting the dosing chamber at its upper end. That means that preferably the inner tube shaped extension has a constant inner diameter over its length. Preferably at least the section of the inner tube shaped extension which is the axial wall of the dosing chamber, is a tube and the axial wall of the dosing chamber is an axially straight tubular, that is a cylindrical wall.

Preferably, the radial wall comprising the filter element is movable in the axial direction of the dosing chamber between an upper position and a lower position. The upper position can also be referred to as the vacuum position of the radial wall comprising the filter element, that is as the vacuum position of the filter element, and the lower position can also be referred to as the ejecting position of the filter element. Preferably, the ejecting position is axially close to or even aligned with the end of the inner tube shaped extension. More preferably, the ejecting position is axially close to or even aligned with the end of the inner tube shaped extension, and does not exceed axially beyond the rim of the end of the wall of the inner tube shaped extension; that is it does not extend axially into the slit.

Preferably, the radial wall comprising the filter element is attached with its upper side to the lower end of a tube, which is called filter tube herein, this is preferably the case, when the radial wall is the filter element and the filter element is the filter, so that the filter is attached to said lower end of the filter tube, for example by welding, the filter tube has an outer diameter that is equal to or smaller than the inner diameter of the dosing chamber. The lower end of the filter tube can be part of the radial wall containing the filter element. The circumference of the radial wall containing the filter element has the same shape as the circumference of the dosing chamber, preferably both shapes are circular shapes with the dosing chamber being the inside of a cylinder, that is of a tube, and the radial wall snuggly fits into the dosing chamber.

The axial location of the vacuum position, that is the axial location of the radial wall comprising the filter element, determines the size of the dosing chamber, the axial position of the vacuum position, or in short the vacuum position may be chosen and adjusted for one dosing operation and thereby the size of the dosing chamber is set which again sets the size of one dose of solid particulate material which is sucked into the dosing chamber. The vacuum position can also be called the filling height of the dosing chamber.

In case that DOSDEV comprises more than one dosing element, preferably all the individual vacuum channels starting from each dosing element connect still within DOSDEV to one combined vacuum channel which then is connected to the vacuum source. Thereby only one vacuum source is required to apply vacuum simultaneously to all openings of the dosing chambers in DOSDEV. Thereby the sucking up of the solid particulate material is made less complicated and more reproducible and equal for each and all the dosing chambers because not for each dosing chamber individually a strength of vacuum needs to be set and controlled for a predetermined amount of time for sucking up a desired quantity of solid particulate material into the respective dosing element, but only one predetermined strength of vacuum needs to be set and controlled for a predetermined time in order to suck up simultaneously the desired and same amount of solid particulate material into each dosing chamber.

The SPACE may be connected at its end opposite to the SLIT to a gas supply. The SPACE starts on its lower end from the SLIT and extends through the space between the inner and outer tube shaped extensions of the dosing element and then connects to one or more gas channels which extend further through DOSDEV, preferably through the upper part of DOSDEV. SPACE can be connected via the one or more gas channels to a gas supply, the supplied gas flows from the gas supply through the one or more gas channels into SPACE in DOSDEV and exits from the SLIT.

In case that DOSDEV comprises more than one dosing element, each SPACE of each dosing element can be individually connected to a gas supply, for example through one or more gas channels through DOSDEV, preferably through the upper part of DOSDEV, or each SPACE of each dosing element is connected, optionally through one or more gas channels, to a space cavity, SPACECAV, SPACECAV is located in DOSDEV, preferably in the upper part of DOSDEV, and then SPACECAV again can be connected, for example via a gas channel, to the gas supply. Thereby each SLIT of each dosing element is in fluid connection with the respective other SLITs of the other dosing elements via the SPACE, optionally via the one or more gas channels, and SPACECAV, and each SLIT of each dosing element is in fluid connection with the gas supply via SPACECAV. Thereby only one gas supply is required to feed simultaneously all SPACEs in each dosing element via SPACECAV with gas, the dosing of the gas is made less complicated and more reproducible and equal for each dosing element because not for each dosing element individually a predetermined gas pressure needs to be set and controlled for a predetermined amount of time, but only one predetermined gas pressure needs to be set and controlled for a predetermined time in order to blow simultaneously a desired and equal amount of gas with a desired and equal velocity of gas flow out of each SLIT of each dosing element.

Preferably, SPACECAV is located in the DOSDEV, preferably in the upper part of DOSDEV, above the dosing elements, which are preferably located in the lower section of DOSDEV.

From SPACECAV there may be one or more exits to the SPACE.

In one embodiment, DOSDEV comprises a body of DOSDEV which has a position for a dosing element where a dosing element, which is a part which is separable from any other part of DOSDEV, can be connected to the body of DOSDEV; and

- DOSDEV is a kit of parts comprising, in addition to the body of DOSDEV, a set of dosing elements, SODE, for the position of a dosing element;
- the dosing elements of SODE are parts which are separable from each other and from any other part of DOSDEV;
- within a SODE the inner diameter of the inner tube shaped extension of anyone of the dosing elements contained in the SODE is different from the inner diameter of the inner tube shaped extension of any other of the dosing elements contained in the SODE;

with the DOSDEV and any dosing element as defined herein, also with all their embodiments.

A position in DOSDEV for a dosing element may also be called a seat for a dosing element.

Preferably, the number of dosing elements contained in a SODE, NUM-DE-SODE, is from 2 to 10, more preferably from 2 to 7, even more preferably from 2 to 5; a typical SODE contains the four dosing elements DE1, DE2, DE3 and DE4.

So when DOSDEV has more than one position for a dosing element where a dosing element, which is a part which is separable from any other part of DOSDEV, can be connected to the body of DOSDEV, then DOSDEV has the same number of SODE as the number of said positions for a dosing element and anyone of these SODEs is identical to any other of these SODEs.

Therefore

NUM-DE=POS-DE, when DOSDEV does not contain a SODE; but

NUM-DE=NUM-DE-SODE*POS-DE, when DOSDEV contains one SODE for each position of a dosing element.

For example, when DOSDEV or the body of DOSDEV respectively, contains 9 positions for dosing elements and one SODE with 4 dosing elements for each position of a dosing elements, then POS-DE is 9;

NUM-DE 36;

NUM-DE-SODE=4;

NUM-DE-CONNECTED=1 to 9.

Further subject of the invention is a transfer device, TRANSDEV, adapted for transferring solid particulate material from the DOSDEV into a receptacle;

TRANSDEV has an upper side facing upwards in vertical direction and a bottom side facing downward in vertical direction;

TRANSDEV comprises in its upper side a receiving opening and in its bottom side a discharging opening;

the receiving opening and the discharging opening are connected by a channel;

the receiving opening of TRANSDEV corresponds to the opening of the dosing chamber of DOSDEV;

the discharging opening of TRANSDEV is adapted to serve as an interface for interacting with to the opening of the receptacle;

with DOSDEV as defined herein, also with all its embodiments.

So the receiving opening is the opening of the channel at the upper side of TRANSDEV; and the discharging opening is the opening of the channel at the bottom side the TRANSDEV.

The channel runs through TRANSDEV connecting the receiving opening with the discharging opening.

TRANSDEV is a device for cooperation with DOSDEV and corresponds with and to DOSDEV, they are interrelated devices.

The correspondence of DOSDEV with TRANSDEV, that is their cooperation and interrelation, is manifest in that the opening at the lower end of the inner tube shape extension, that is the opening of the dosing chamber, of DOSDEV corresponds with and to the receiving opening on TRANSDEV. Preferably the shape of the opening of the dosing chamber corresponds to the shape of the receiving opening. DOSDEV can be positioned above TRANSDEV in such a way that the opening of the dosing chamber is in vertical alignment with the receiving opening in TRANSDEV, this position of DOSDEV is also called a position of vertical alignment of DOSDEV and TRANSDEV. The correspondence of said openings in the two devices means that any solid particulate material which is discharged from the opening of the dosing chamber, when DOSDEV is in vertical alignment with TRANSDEV, is charged into, for example enters or falls into the corresponding receiving opening of TRANSDEV.

The correspondence of said two openings in the two devices is realized by a correspondence of the sizes and/or shapes of the two openings.

The correspondence of said two openings is provided in such a way that any loss of solid particulate material which could occur during the transfer from the opening of the dosing chamber into the receiving opening is minimized or even zero, that means as little as possible, preferably all of the solid particulate material discharged from the dosing chamber is charged into the receiving opening in TRANSDEV, which otherwise would mean a loss of solid particulate material.

Preferably the center of the opening of the dosing chamber of DOSDEV is vertically aligned with the center of the receiving opening of TRANSDEV when DOSDEV is in vertical alignment with TRANSDEV.

The receiving opening of TRANSDEV has any shape which corresponds to the shape of the opening of the dosing chamber, preferred shapes are a circular shape or a shape of a slot, in particular a shape of a slot.

The width of the receiving opening corresponds to the diameter of the opening of the dosing chamber; the width of the receiving opening is equal to or larger, preferably larger than the diameter of the opening of the dosing chamber.

Preferably, the width of the receiving opening is from 3 to 15 mm, more preferably from 3.1 to 15 mm, even more preferably from 4 to 15 mm, especially from 4.1 to 15 mm, more especially from 8.1 to 15 mm, even more especially from 9 to 12 mm; a typical width may be 10.7 mm.

When solid particulate material is discharged from DOSDEV via TRANSDEV into a receptacle, then DOSDEV is in vertical alignment with TRANSDEV and TRANSDEV, that is any discharging opening of TRANSDEV is in vertical alignment with the respective opening of a receptacle.

This means that when discharging solid particulate material from DOSDEV via TRANSDEV into a receptacle, then the opening of a dosing chamber of DOSDEV is in vertical alignment with a respective receiving opening in TRANSDEV and the respective discharging opening of TRANSDEV, which is connected via the respective channel with said receiving opening, is in vertical alignment with the respective opening of a receptacle. Thereby solid particulate material is discharged from the dosing chamber of DOSDEV into the receiving opening of TRANSDEV, then the solid particulate material passes through the respective channel to the respective discharging opening of TRANSDEV and is discharged from TRANSDEV into the respective opening of a receptacle.

This vertical alignment of DOSDEV, TRANSDEV and the receptacle provides for a minimized loss or even no loss of solid particulate material during the dosing operation.

Preferably, the discharging opening of TRANSDEV corresponds to the opening of the receptacle into which the solid particulate material shall be dosed; more preferably the diameters of the discharging opening corresponds to the diameter of the opening of the receptacle, even more preferably the diameter of the discharging opening is smaller than the diameter of the opening of the receptacle into which the solid particulate material shall be dosed.

The channel of TRANSDEV comprises two sections, an upper channel and a lower channel;

the upper end of the upper channel is the receiving opening;

the lower end of the lower channel is the discharging opening.

So the upper channel and the lower channel is a pair that forms the channel.

The upper channel and/or the lower channel may be a bore in TRANSDEV.

Preferably the upper channel is a straight channel with a direction in TRANSDEV not parallel to the vertical direction, but with an angle against the vertical direction of from greater than 0 to smaller than 90°, preferably of from 10 to 80°, more preferably of from 20 to 80°, even more preferably of from 20 to 75°, especially of from 25 to 75°, more especially from 30 to 65°, and thereby forms a slide, SLIDE;

typical angles against the vertical direction may be 30°, 40°, 45°, 50°, 60° and 65°, preferred angles are 45° and 60°.

Preferably, the lower channel is a straight channel extending in a vertical direction in TRANSDEV.

Both the upper and the lower channel and also the connection with each other is realized in such a way that there is no obstruction or hindrance to the solid particulate material passing through TRANSDEV from the receiving opening to the discharging opening.

Preferably, the upper channel is a bore in TRANSDEV.

Preferably, the lower channel is a part that is separable from any other part of TRANSDEV; so in this preferred embodiment, TRANSDEV comprises at least two parts which are separable from each other and from any other part of TRANSDEV. The two parts of TRANSDEV being a body, which is called body of TRANSDEV herein, and the lower channel. In this embodiment, the upper channel is preferably a bore in the body of TRANSDEV.

Preferably, the lower channel, when it is a separable part, is a tube shaped part, also called lower tube herein; and the body of TRANSDEV has a vertical bore that extends from the bottom of the body of TRANSDEV upwards into the body of TRANSDEV and which corresponds to the lower tube.

The correspondence of the vertical bore and the lower tube means that preferably at least the upper end of the lower tube corresponds with the vertical bore; preferably at least the shape of the upper end of the lower tube corresponds with the shape of the vertical bore; preferably at least the upper end of the lower tube can be connected to or inserted into the vertical bore. So preferably, the inner diameter of the vertical bore corresponds at least to the outer diameter of the upper end of the lower tube; preferably they are equal.

So preferably the upper end of the lower tube fits into the vertical bore; the upper end of the lower tube can be inserted into the vertical bore, preferably the inner diameter of the vertical bore is equal to the outer diameter of the upper end of the lower tube.

The length of the vertical bore corresponds to the length of the lower tube; it may be up to a factor 1.5 longer or up to a factor of 0.5 shorter than the length of the lower tube.

The lower channel, when it is a separable part, or the lower tube respectively, can be fastened to the body of TRANSDEV in the vertical bore.

The fastening of the lower tube to TRANSDEV in the respective vertical bore can for example be realized by a screw type connection; for this purpose both the inner surface of the vertical bore and the outer surface of the lower tube may have respective threads corresponding to each other; or preferably, TRANSDEV comprises at least three parts, the body of TRANSDEV, a base plate and the lower tube, which are separable from each other and from any other part of TRANSDEV;

the body of TRANSDEV contains the vertical bore and the upper channel;

the lower tube can be fastened to the body of TRANSDEV in the vertical bore by the base plate, the base plate is fastened to the bottom of the body of TRANSDEV;

the base plate has a circular opening with a diameter corresponding to the outer diameter of the lower tube so that the lower tube can be fixed to TRANSDEV in the vertical bore.

The fastening of the lower tube to the body of TRANSDEV in the vertical bore by the base plate may for example be realized (a) by a diameter of the circular opening of the base plate which is smaller than the outer diameter of the end of the lower tube and larger than the inner diameter of the end of the lower tube;

or, preferably, (b) the lower tube has an axial section in the shape of a ring shaped protrusion on its outer surface, the ring shaped protrusion extends circumferentially around the outer surface of the lower tube with an extension in the axial direction of the lower tube which is smaller than the length of the lower tube, and the ring shaped protrusion is located axially on the lower tube with a distance from the upper end and with another distance from the lower end of the lower tube;

thereby the lower tube has at least three axial sections, an upper section, a middle section which is the ring shaped protrusion, and a lower section, with the outer diameters of the upper and lower sections being smaller than the outer diameter of the ring shaped protrusion;

the vertical bore starts at the bottom of the body of TRANSDEV with a circular recess having an inner diameter corresponding to the outer diameter of the ring shaped protrusion of the lower tube, and having a vertical height corresponding to the length of the axial extension of the ring shaped protrusion, this circular recess can be called the first section of the vertical bore;

from the circular recess, that is from the first section of the vertical bore, the vertical bore continues with a second section of the vertical bore upwards with an inner diameter which corresponds to the outer diameter of the upper section of the lower tube, and with a length that corresponds to the length of the upper section of the lower tube;

the diameter of the circular opening in the base plate corresponds to the outer diameter of the lower section of the lower tube.

Preferably the outer diameters of the upper section and of the lower section of the lower tube are equal.

Preferably, the vertical bore starts at the bottom of the body of TRANSDEV with a circular recess the has an inner diameter that is equal to the outer diameter of the ring shaped protrusion of the lower tube.

Preferably, the vertical height of circular recess with which the vertical bore starts at the bottom of the body of TRANSDEV has a vertical height being equal to or slightly smaller, more preferably very slightly smaller, than the length of the axial extension of the ring shaped protrusion.

Preferably, the diameter of the circular opening in the base plate is equal to the outer diameter of the lower section of the lower tube.

Thereby the lower tube fits into the vertical bore with the ring shaped protrusion fitting into the circular recess and with the ring shaped protrusion abutting with the upper end of the circular recess; the lower section of the lower tube extends into or even through the base plate, and the upper section of the lower tube extends into the vertical bore above the circular recess, that is into the second section of the vertical bore, and the lower end of the ring shaped protrusion abuts with or even protrudes very slightly from the rim of the beginning of the vertical bore at the bottom of the body of TRANSDEV, that is from the lower rim of the circular recess, thereby the base plate of TRANSDEV snuggly fixes the lower tube in the vertical bore in TRANSDEV.

The thickness of the base plate may be same or different from the length of the lower section of the lower tube, preferably, the thickness of the base plate is equal to or smaller than, more preferably equal to the length of the lower section of the lower tube.

Preferably, from the circular recess, that is from the first section of the vertical bore, the vertical bore continues with the second section of the vertical bore upwards which has an inner diameter which is equal to the outer diameter of the upper section of the lower tube, and with a length that is equal to or larger than the length of the upper section of the lower tube, more preferably equal.

Preferably, the vertical bore continues with the third section of the vertical bore upwards from the position of the upper end of the upper section of the lower tube, when the lower tube is inserted in the vertical bore, but with a diameter that is smaller than the outer diameter of the upper section of the lower tube; preferably with a diameter that is equal to or smaller than the inner diameter of the rim of the end of the upper section of the lower tube.

So the vertical bore can be described as comprising three sections, the lowest and first section of the vertical bore is the circular recess of the vertical bore, upwards from the first section of the vertical bore the second section of the vertical bore continues which is the section of the vertical bore wherein the upper section of the lower tube is positioned, from the second section of the vertical bore the third section of the vertical bore continues upwards, which is the section of the vertical bore with a diameter which is smaller than the diameter of the second section of the vertical bore.

The lower opening of the upper channel opens into the vertical bore above the upper end of the upper section of the lower tube when the lower tube is inserted into the vertical bore, that is it opens into the third section of the vertical bore.

The width of the lower opening of the upper channel corresponds to the diameter of the third section of the vertical bore; correspondence means that the transition from the lower end of the upper channel into the third section of the vertical bore causes no obstruction or hindrance to the passage of the solid particulate material, so preferably the width of the lower end or lower opening of the upper channel is equal to or smaller than the diameter of the third section of the vertical bore.

In essence, the diameters of the lower opening of the upper channel, of the third section of the vertical bore, and the inner diameter of the lower tube correspond such with each other that any solid particulate material travelling from the receiving opening through TRANSDEV to the discharging opening will not be impeded or blocked when passing from the upper channel, then through the third section of the vertical bore and further on into the lower tube, but the solid particulate material passes smoothly from the lower opening of the upper channel down through the vertical bore into and through the lower tube.

The outer diameter of the middle section of the lower tube, that is of the ring shaped protrusion of the lower tube, may be larger by a factor of from 1.05 to 1.4, preferably of from 1.1 to 1.3, more preferably of from 1.2 to 1.3, than the outer diameter of the upper section of the lower tube; for example the outer diameter of the upper section of the lower tube may be 6 to 10 mm, preferably 7 to 9 mm; a typical value of the outer diameter of the upper section of the lower tube may be 8 mm; for example the outer diameter of the middle section of the lower tube may be from 6.3 to 14 mm, preferably from 8.5 to 10.5 mm; a typical outer diameter of the middle section of the lower tube may be 9.8 mm, preferably with the outer diameter of the upper section and of the lower section of the lower tube being equal.

The thickness of the base plate may be 2 to 5 mm, preferably 2 to 4 mm, more preferably 3 mm.

The body of TRANSDEV may be described as having two regions, an upper region of TRANSDEV containing the upper channel and a lower region of TRANSDEV containing the lower channel or lower tube. The body of TRANSDEV may be realized with one part or with two parts in vertical direction which are separable from each other, the upper part containing the upper region of TRANSDEV and the lower part containing the lower region of TRANSDEV;

- preferably the body of TRANSDEV is realized with one part containing the upper channel in the upper region of the body and the lower channel or lower tube in the lower region of the body;
- with the upper channel, the lower channel and the lower tube as defined herein, also with all their embodiments.

In case of two separable parts the upper part and the lower part of the body of TRANSDEV may be fastened to each other by a connection known to the skilled person, such as a screw type connection.

The inner diameter of the lower end of the lower tube actually is the diameter of the discharging opening.

Preferably, the shape of the discharging opening corresponds to the shape of the opening of the receptacle;

- preferably, the inner diameter of the lower end of the lower channel or lower tube, that is the diameter of the discharging opening, corresponds to the diameter of the opening of the receptacle into which the solid particulate material shall be dosed;
- more preferably the diameter of the discharging opening is smaller than the diameter of the opening of the receptacle into which the solid particulate material shall be dosed.

When the receptacle is a body of a two piece hard capsule then the diameter of the discharging opening corresponds to the diameter of the opening of the body of a capsule, that is to the inner diameter of the body of a capsule. The inner diameter of the body of a capsule depends on the size of the capsule, typical sizes of the inner diameter of the body of the capsule are defined by the specifications of the standard capsule sizes available on the market, such as the sizes 000, 00el, 00, 0el, 0el*, 0, 1el, 1, 2el, 2, 3, 4el, 4 or 5; preferably the diameter of the discharging opening is smaller than the inner diameter of the body of the capsule; inner diameters of the various capsule sizes are known to the skilled person.

The diameter of the discharging opening may be from 3 to 7 mm, preferably from 3 to 6 mm. Typical values of the diameter of the discharging opening are 3.5, 4, 4.5 and 5.5 mm. Table 1 gives typical diameters of the discharging opening for some capsule sizes.

TABLE 1

| capsule size | 000 | 00el | 00 | 0el | 0 | 1 | 2 | 3 | 4 |
|---|---|---|---|---|---|---|---|---|---|
| external diameter of body (1) [mm] | 9.55 | 8.18 | 8.18 | 7.34 | 7.34 | 6.63 | 6.07 | 5.57 | 5.05 |
| diameter of the discharging opening [mm] | 5.5 | 5.5 | 5.5 | 5.5 | 5.5 | 4.5 | 4.5 | 4 | 3.5 |

(1) "Technical Reference File Hard Gelatin Capsules" of Capsugel Library, 2nd Edition, Coni-Snap ® Capsules. Typical wall thickness of the body may be from 75 to 130 micrometers.

Preferably, the inner diameter of the lower section of the lower tube is the diameter of the discharging opening.

In one embodiment, TRANSDEV is a kit of parts comprising the base plate, the body of TRANSDEV with the channel comprising the vertical bore, the upper channel and a set of lower tubes, SOLT, for the vertical bore,

- wherein in SOLT the diameter of the discharging opening of anyone of the lower tubes contained in SOLT is different from the diameter of the discharging opening of any other of the lower tubes contained in SOLT;
- with each lower tube in the SOLT fitting into the vertical bore;
- with the lower tubes in the SOLT and the base plate being parts which are separable from each other and from any other part of TRANSDEV,
- with the base plate, the body of TRANSDEV, the vertical bore, the upper channel and any lower tube as defined herein, also with all their embodiments.

Preferably each diameter of the discharging opening of each lower tube within a SOLT corresponds to one of the various diameters of the openings of the receptacles.

When TRANSDEV is a kit of parts containing a SOLT, then the number of lower tubes in the SOLT may be from 2 to 14, preferably from 2 to 10, even more preferably from 2 to 7, especially from 2 to 5, a typical number may be 4;

- when the number of tubes in the SOLT is 4, than typical values for the four different diameters of the discharging opening of the four tubes in the SOLT may be 3.5, 4, 4.5 and 5.5 mm.

When the lower tube is a part which is separable from any other part of TRANSDEV, then the upper section of the lower tube has at its upper end a circumferential chamfer and ends with the circumferential chamfer on the inside of the lower tube, the chamfer of the upper end of the lower tube, which enlarges the inner diameter of the lower tube in axial direction towards and up to the rim of the end of the upper section of the lower tube, thereby the inner diameter of the rim, IDR, of the end of the upper section of the lower tube, is larger than the inner diameter of the lower tube in axial direction downwards before the start of the chamfer.

Preferably this IDR corresponds to, preferably is equal to or larger than, more preferably is larger than the inner diameter of the third section of the vertical bore that continues upwards from the position of the upper end of the upper section of the lower tube, when the lower tube is inserted in the vertical bore.

Preferably, when TRANSDEV is a kit of parts and comprises a SOLT,

- then all the rims of the ends of the upper sections of each lower tube in the SOLT have the same IDR;
- preferably the upper section of any lower tube in the SOLT has the same outer diameter as the upper section of any other lower tube in the SOLT; the different diameters of the discharging openings of the lower tubes in the SOLT are realized by respective different wall thicknesses, that is by respective different inner diameters of the lower section of the lower tubes in the SOLT;
- thereby all lower tubes in a SOLT fit into the respective vertical bore.

TRANSDEV may comprise more than one channel.

Preferably, when TRANSDEV comprises more than one channel, then the vertical positions of the receiving openings with respect to their vertical position in TRANSDEV are the same for all receiving opening, so all the receiving openings are vertically aligned with each other with respect to their vertical position in TRANSDEV;

- that means that all the upper ends of the upper channels of TRANSDEV, that is all the upper rims of the upper channels, are horizontally aligned with each other with respect to their vertical position in TRANSDEV.

Preferably, when TRANSDEV comprises more than one channel, then all channels are identical.

In case that TRANSDEV comprises more than one channel, than preferably TRANSDEV comprises each channel in form of the vertical bore, the upper channel and the lower tube; preferably the vertical bore, the upper channel and the lower tube in each channel are identical for all channels.

The upper channel and the lower channel of a channel form a pair, also the receiving opening and the discharging opening which are connected by a channel form a pair.

So when TRANSDEV has more than one channel and is a kit of parts comprising a SOLT, then TRANSDEV comprises one SOLT for each vertical bore and anyone of these SOLTs is identical to any other of these SOLTs.

When DOSDEV comprises more than one dosing element,

- then TRANSDEV comprises the same number of channels, that is the same number of pairs of receiving opening and discharging opening as the number of dosing elements in DOSDEV;
- with DOSDEV, TRANSDEV, the receiving opening, the discharging opening and the channel as defined herein, also with all their embodiments;
- so in other words when DOSDEV comprises more than one dosing element, then TRANSDEV comprises the same number of pairs of upper channel and lower channel as the number of dosing elements in DOSDEV;
- with the upper channel and the lower channel as defined herein, also with all their embodiments;

wherein

- the vertical positions of the receiving openings of each channel with respect to their vertical position in TRANSDEV are the same for all receiving opening, so all the receiving openings are vertically aligned with each other with respect to their vertical position in TRANSDEV;

in the release position of DOSDEV DOSDEV is located above TRANSDEV in such a way that the horizontal positions of the receiving openings in TRANSDEV correspond to the horizontal positions of the openings of the dosing chambers in DOSDEV, so that each opening of a dosing chamber in DOSDEV has one corresponding receiving opening in TRANSDEV forming a corresponding pair; and DOSDEV can be positioned above TRANSDEV in such a way that each opening of a dosing chamber is in horizontal and vertical alignment with the corresponding receiving opening in TRANSDEV;

preferably, the center of each opening of a dosing chamber is in vertical alignment with the center of the corresponding receiving opening in TRANSDEV.

Preferably, when DOSDEV comprises more than one dosing element, then TRANSDEV comprises the base plate, the body of TRANSDEV with the same number of channels as the number of dosing elements in DOSDEV, each channel comprising a respective vertical bore, an upper channel and a lower tube for the vertical bore;

with all lower tubes and the base plate being parts which are separable from each other and from the body of TRANSDEV, with the base plate having one bore for each channel;

with all channels being identical to each other;

more preferably, TRANSDEV is a kit of parts comprising one SOLT for each channel, with all SOLTs being identical to each other;

with the base plate, the body of TRANSDEV, the dosing element, DOSDEV, the vertical bore, the upper channel, the lower tube and the SOLTs as defined herein, also with all their embodiments.

A SOLT for a channel allows for a rapid adaptation of TRANSDEV to a change of size of the receptacle, that is to a change of the diameter of the opening of the receptacle; this adaptation is simply done by installing the respective lower tube from the SOLT with the desired diameter of the discharging opening. This exchange can for example simply be realized by disconnecting the base plate from the body of TRANSDEV, removing a currently inserted lower tube with a wrong inner diameter of the discharging opening and inserting the lower tube from the SOLT with the desired inner diameter of the discharging opening. The same advantage is realized obviously when TRANSDEV comprises more than one channel, with a SOLT for each channel and with the SOLTs being identical to each other; when the width of the opening of the receptacles changes, then simply all the lower tubes with the appropriate diameter of the discharging opening from each SOLTs are inserted into the vertical bores in TRANSDEV and are fixed simultaneously by the base plate.

The solid particulate material, when it is discharged out of the opening of the dosing chamber, enters through the receiving opening into the TRANSDEV, moves and passes through the channel and exits TRANSDEV through the discharging opening. The solid particulate material essentially falls down from the dosing chamber into the TRANSDEV and moves through TRANSDEV and falls out of TRANSDEV into the receptacle by force of gravity.

Further subject of the invention is a dosing apparatus, DOSAPP, comprising DOSDEV; the DOSAPP is adapted for being connected to a gas supply and to a vacuum source; if DOSAPP is connected to the gas supply then the SPACE is in fluid connection with the gas supply;

if DOSAPP is connected to the vacuum source then the dosing chamber is in fluid connection with the vacuum source;

with DOSDEV and SPACE as defined herein, also with all their embodiments.

When DOSAPP is connected to a gas supply, the gas supply thereby is in fluid connection through the SPACE with the SLIT. Thereby any gas supplied from the gas supply passed through the SPACE and exits the SPACE through the SLIT. Thereby the gas supply with its fluid connection through the SPACE to the SLIT provides for a gas jet out of the SLIT when gas is pressed from the gas supply into the SPACE for a predetermined time with a predetermined pressure.

DOSAPP interacts with a reservoir for containing solid particulate material, and a receptacle contained in a retaining unit for retaining a receptacle.

DOSAPP has an interface for interacting with the reservoir for containing solid particulate material;

the interface is formed by the lower end of the dosing chamber, that is the opening of the dosing chamber, of DOSDEV.

In one embodiment, it is the DOSAPP that comprises both the reservoir for containing solid particulate material, and the receptacle retaining unit for retaining a receptacle;

in another embodiment, it is a filling machine which comprises all three components:

DOSAPP;

the reservoir for containing solid particulate material, and the receptacle retaining unit for retaining a receptacle;

in yet another embodiment, which is also a preferred embodiment, it is DOSAPP that comprises the reservoir for containing solid particulate material, and it is a filling machine, that comprises DOSAPP and the receptacle retaining unit for retaining a receptacle, and DOSAPP interacts with the receptacle contained in a reservoir for containing solid particulate material.

DOSAPP has at least two positions for DOSDEV, a first position and a second position, these at least two positions of DOSDEV are horizontally spaced apart, DOSAPP can displace DOSDEV back and forth between these positions.

Preferably, DOSAPP can displace DOSDEV in at least one of said at least two positions, which are horizontally spaced apart, also back and forth between at least two vertical positions, which are vertically spaced apart at the respective horizontal position.

Preferably DOSAPP has at least said two positions for DOSDEV, which are horizontally spaced apart, the second position is a position of DOSDEV where DOSDEV is located above the reservoir, and the first position is is called the release position of DOSDEV, in the release position DOSDEV is located above the receptacle retaining unit and the opening of the dosing chamber of DOSDEV is in vertical alignment with the receiving opening of the receptacle for releasing the collected dose of the solid particulate material from the dosing chamber into a receptacle retained in the receptacle retaining unit;

with DOSAPP and DOSDEV as defined herein, also with all their embodiments.

Preferably, if DOSAPP can displace DOSDEV in at least one of said at least two positions, which are horizontally spaced apart, also vertically then it is the second of said at least two positions where DOSAPP can displace DOSDEV vertically;

more preferably, DOSAPP can displace DOSDEV vertically between a position which is vertically on the same level as the release position and a position which is vertically on a lower level than the release position.

DOSAPP can displace DOSDEV back and forth between the position above the reservoir and the release position.

Preferably, when DOSDEV is in the position above the reservoir, then DOSAPP can displace DOSDEV and the reservoir relative to each other back and forth between two vertical positions, a collecting position and a distanced position;

in the collecting position the lower end of the dosing chamber, that is the opening of the dosing chamber, is immersed in the solid particulate material when solid particulate material is contained in the reservoir; the collecting position is the position wherein DOSDEV is located vertically closer to the reservoir, that is closer than in the distanced position, for collecting a predetermined dose of solid particulate material from the reservoir into the dosing chamber of DOSDEV, preferably, the collecting position is vertically on a lower level than the release position;

in the distanced position the lower end of the dosing chamber, that is the opening of the dosing chamber, is outside and above the solid particulate material, the distanced position is the position wherein DOSDEV is located vertically at a greater distance to the reservoir than in the collecting position, preferably, the distanced position is vertically on the same level as the release position.

Preferably, if DOSAPP can displace DOSDEV in at least one of said at least two positions, which are horizontally spaced apart, also back and forth between at least two positions vertically spaced apart, then one of said at least two positions vertically spaced apart is said collecting position and the other one is said distanced position.

In one embodiment, when DOSDEV is in the position above the reservoir, then DOSAPP can displace DOSDEV relative to the reservoir back and forth between the collecting position and the distanced position while the reservoir remains in its vertical position on the same level, that means it is not displaced vertically.

So the lower end of the dosing chamber, that is the opening of the dosing chamber, of DOSDEV provides an interface for interacting in the collecting position with the reservoir for containing solid particulate material; and in the release position with the opening of the receptacle, if DOSAPP does not comprises TRANDEV, or with the receiving opening of TRANSDEV, if DOSAPP comprises TRANDEV, the opening of the dosing chamber is adapted respectively.

If DOSAPP does not contain a TRANSDEV, but the solid particulate material is directly discharged from the dosing chamber of DOSDEV into the opening of the receptacle, then in the release position the opening of the dosing chamber of DOSDEV is in vertical alignment with the opening of the receptacle.

Preferably, DOSAPP also comprises TRANSDEV;

in the release position DOSDEV is located above TRANSDEV and the opening of the dosing chamber of DOSDEV is in vertical alignment with the receiving opening of TRANSDEV for releasing a collected dose of the solid particulate material from the dosing chamber into the receiving opening of TRANSDEV;

TRANSDEV is located above the receptacle retaining unit and the discharging opening of TRANSDEV is in vertical alignment with the opening of the receptacle for releasing a collected dose of the solid particulate material, which was received from the dosing chamber, into the receiving opening of TRANSDEV;

with TRANSDEV as defined herein, also with all its embodiments.

In the release position the collected dose of the solid particulate material is released from the dosing chamber into the receiving opening of TRANSDEV and from TRANSDEV, that is from the discharging opening of TRANSDEV, the solid particulate material is released into the receptacle.

Both the collecting position and the distanced position are predetermined vertical positions of DOSDEV and the reservoir in DOSAPP. The collecting position may be adjusted and predetermined according to the level of solid particulate material contained in the reservoir. The distanced position may be adjusted and predetermined according to the various needs such as arising from the function of exchanging DOSDEV between the position above the reservoir and the release position, from the need of optimum speed of operation.

Also the filling height of the solid particulate material in the reservoir may be predetermined and adjusted to allow for an optimal immersion of the lower end of the dosing chamber, that is the opening of the dosing chamber, in the collecting position in the solid particulate material.

The vertical displacement of DOSDEV and the reservoir with respect to each other is done by DOSAPP, DOSAPP can displace DOSDEV or the reservoir or both back and forth between the collecting position and the distanced position.

On one embodiment DOSAPP displaces only the reservoir vertically while the vertical position of DOSDEV remains unchanged, thereby DOSDEV and the reservoir are displaced between the collecting and the distanced position relative to each other. In this embodiment the reservoir is displaced between a lower position and an upper position; when the reservoir is in the lower position then DOSDEV and the reservoir are in the distanced position relative to each other, when the reservoir is in the upper position then DOSDEV and the reservoir are in the collecting position relative to each other.

Preferably, the reservoir can impart a fluid-like state to the solid particulate material at least for the time while the dosing chamber is in contact with the solid particulate material, that is for the time starting with placement of the dosing chambers into the solid particulate material, continuing with the collecting of the solid particulate material into the dosing chamber of DOSDEV in the collecting position and ending with the removal of the dosing chamber out of the solid particulate material.

The fluid-like state, which the reservoir can impart to the solid particulate material, is preferably realized by a fluidized bed, wherein a gas is injected into the solid particulate material, preferably from a bottom surface of the reservoir up, to provide sufficient turbulence to keep the solid particulate material in a fluid-like state, that is in a free-flowing and non-agglomerated state.

DOSAPP may comprise more than one DOSDEV, such as 1, 2, 3 or 4 DOSDEVs, preferably 2.

When DOSAPP comprises two DOSDEVs, then preferably one of the two DOSDEVs is positioned in the first of the at least two positions which are horizontally spaced apart that DOSAPP has for DOSDEV, i.e. the release position, when the other of the two DOSDEVs is positioned in second of the at least two positions which are horizontally spaced apart that DOSAPP has for DOSDEV, i.e. the position above the reservoir; and DOSAPP can exchange the two DOSDEVs between these two positions, preferably DOSAPP exchanges the two DOSDEVs between these two positions simultaneously.

Thereby the DOSDEV in the position above the reservoir can collect a dose of solid particulates materials from the reservoir into the dosing chamber while in the meantime the other DOSDEV can release its collected dose of solid particulate material from its dosing chamber into the receptacle or into TRANSDEV; this can take place alternatingly with each exchange by DOSAPP of the two DOSDEVs between the two positions.

The reservoir can further interact with a feed container for feeding or charging solid particulate material into the reservoir, this may be realized via a slide. The reservoir can have a sensor for measuring the degree of its filling state and the feeding of the solid particulate material from the feed container into the reservoir can be controlled and automated with the use of the sensor.

The receptacle retaining unit can retain more than one receptacle.

When DOSDEV comprises more than one dosing element, then

- the receptacle retaining unit of DOSAPP has at least the same number of receptacles as the number of dosing element in DOSDEV;
- and in the release position each opening of the dosing chamber of DOSDEV is in vertical alignment with the respective opening of a receptacle;
- when DOSAPP also comprises TRANSDEV, then in the release position each opening of the dosing chamber of DOSDEV is in vertical alignment with the respective receiving opening of TRANSDEV, and each discharging opening of TRANSDEV is in vertical alignment with the respective opening of a receptacle.

Preferably, the receptacle retaining unit retains at least as many, preferably more receptacles than the number of dosing elements comprised in DOSDEV.

Preferably, when the receptacle retaining unit retains more than one receptacles, then the receptacles are arranged in the receptacle unit in a circular arrangement.

The receptacle retaining unit may be of a rotary type having a rotary turret which holds at its circumference the receptacles such as bodies of two piece hard capsules. The receptacles are aligned in a ring form around the rotary turret.

The spatial alignment, in particular the horizontal alignment of the dosing elements and of the corresponding channels in TRANSDEV, and therewith also of the dosing elements in DOSDEV, corresponds to the alignment of the receptacles in the receptacle retaining unit; in case of the receptacle retaining unit being of a rotary type then the horizontal alignment of the channels in TRANSDEV and of the dosing elements in DOSDEV corresponds to at least a part of the ring form of the rotary alignment of the receptacles in the receptacle retaining unit.

DOSAPP may also allow for a vertical displacement of DOSDEV in the release position and/or of TRANSDEV, if TRANSDEV is comprised in DOSAPP, in order to vertically adjust or set or optimize the vertical distance between DOSDEV and the receptacles, between DOSDEV and TRANSDEV or between TRANSDEV and the receptacles, that is to vertically adjust the distances between the opening of the dosing chamber of DOSDEV, the receiving opening and the discharging opening of TRANSDEV and the openings of the receptacles; any such adjustment can be done before the start of or during a filling campaign.

For the purpose of this vertical displacement DOSAPP may allow for a vertical movement of DOSDEV and/or of TRANSDEV in the release position.

Any capability of vertical displacement and/or vertical movement of DOSDEV and/or TRANSDEV can be used to facilitate optimal release of the solid particulate material from the dosing chamber ultimately into the receptacle and minimizing or even avoiding any loss of solid particulate material during the passage of solid particulate material from the doing chamber to the receptacle.

DOSAPP or a filling machine may also allow for a horizontal, for example for a circular movement, of the receptacles in the receptacle retaining unit relative to the horizontal position of the opening of the dosing chamber of DOSDEV in the release position and/or relative to the horizontal position of the discharging opening of TRANSDEV. This horizontal movement may be used to exchange under DOSDEV and/or under TRANSDEV filled receptacles against empty receptacles for the next filling step.

In another embodiment, both the receptacle retaining unit and DOSAPP are each a part of a filling machine, and the filling machine effects any movement, such as horizontal or vertical, of the receptacles in the receptacle retaining unit relative to the horizontal and vertical position of the opening of the dosing chamber of DOSDEV in the release position and/or relative to the horizontal and vertical position of the discharging opening of TRANSDEV.

DOSAPP may also provide for horizontal movement of TRANSDEV.

By any of the possible movements of the DOSDEV, of TRANSDEV, of the receptacle in the receptacle retaining unit, of the receptacle retaining unit and of the reservoir, the dosing of solid particulate material into the dosing chamber and the release of the solid particulate material from the dosing chamber ultimately into the receptacle can be optimized by providing for vertical alignment with respect to each other of any of the respective parts which correspond to and interact with each other in the various steps of the filling operation in order to avoid any spill or loss of solid particulate material in the course of charging a dose of solid particulate material into a receptacle.

A further subject of the invention is a method for dosing solid particulate material from a reservoir into a receptacle, characterized in that the method is carried out with a device according to the invention.

Features and advantages which have been described for the device—as far as applicable—also relate to the method and vice versa and will therefore only be described once.

Further subject of the invention is a method for dosing solid particulate material from a reservoir, which contains the solid particulate material, into a receptacle, preferably the receptacle is contained in a retaining unit for retaining a receptacle, with the dosing apparatus, DOSAPP, as defined herein, also with all its embodiments;

- the reservoir contains an amount of solid particulate material;
- DOSAPP is connected to a gas supply and to a vacuum source;
- the SPACE is in fluid connection with the gas supply;
- the dosing chamber is in fluid connection with the vacuum source;
- the second of the two positions that DOSAPP has for DOSDEV is a position of DOSDEV above the reservoir;
- when DOSDEV is in the second position, then DOSAPP can displace DOSDEV and the reservoir relative to each other back and forth between two vertical positions, a collecting position and a distanced position;

in the collecting position the lower end of the dosing chamber, that is the opening of the dosing chamber, is immersed in the solid particulate material when solid particulate material is contained in the reservoir;

in the distanced position the lower end of the dosing chamber, that is the opening of the dosing chamber, is outside and above the solid particulate material when solid particulate material is contained in the reservoir;

TRANSDEV is located above the receptacle retaining unit and the discharging opening of TRANSDEV is in vertical alignment with the opening of the receptacle;

the method comprises the six steps step (A), step (B), step (C), step (D), step (E) and step (F), which are done consecutively in their alphabetical order, (A) displacing DOSDEV and the reservoir relative to each other from the distanced position to the collecting position, thereby immersing the lower end of the dosing chamber into the solid particulate material;

(B) applying a vacuum with a predetermined strength to the dosing chamber, thereby sucking a predetermined dose of solid particulate material into the dosing chamber;

(C) displacing DOSDEV and the reservoir relative to each other from the collecting position back to the distanced position;

(D) cutting off of any excess solid particulate material sticking to the outside of the lower end of the dosing element of DOSDEV with a gas jet blown out of the SLIT of the dosing element by pressing gas with a predetermined pressure for a predetermined time from the gas supply into the SPACE;

(E) displacing DOSDEV from the distanced position relative to the reservoir to the release position;

(F) releasing the dose of solid particulate into the receptacle, with DOSDEV being in the release position, by lowering the strength of the vacuum;

with DOSAPP, DOSDEV, the reservoir, the receptacle retaining unit, the position above the reservoir, release position as defined herein, also with all their embodiments;

the method starts with a configuration of DOSAPP where DOSDEV is in the distanced position Step (D) can already be done while step (C) is still being done, that is from the point of time when the lower end of the dosing chamber is no longer immersed in the solid particulate material, the cutting off of any excess solid particulate material can take place.

The requirement that the rim of the end of the wall of the outer tube shaped extension does not extend in a radial direction beyond the inner diameter of the end of wall of the inner tube shaped extension, actually provides for avoiding that the gas jet exiting the SLIT is directed into the dosing chamber, thereby a turbulence within the dosing chamber could be provoked and solid particulate material could be ejected from the dosing chamber when actually only any excess solid particulate material sticking to the outside of the lower end of the dosing element of DOSDEV should be cut off, such undesired ejecting of solid particulate material from the inside of the dosing chamber needs to be avoided. So by this relation of the diameters of the opening of the dosing chamber and the rim of the end of the wall of the outer tube shaped extension, that means that the diameter of the opening of the outer tube shaped extension is equal to or larger than the diameter of the opening of the dosing chamber, it is provided that the gas jet exits the SLIT radially, that is perpendicular to the axial direction of the dosing chamber, when said diameters are equal, or in addition to such radial direction then in axial direction only away from the dosing chamber, that is in downward direction, such may be the case when the diameter of the rim of the end of the wall of the outer tube shaped extension is larger then the diameter of the opening of the dosing chamber.

Furthermore said requirement prevents bridging of solid particulate material or solid particulate material getting stuck, because if the rim of the end of the wall of the outer tube shaped extension were to extend in radial direction beyond the inner diameter of the end of wall of the inner tube shaped extension, then a circumferential edge protruding radially inwards into the opening of the dosing chamber would be formed that could obstruct solid particulate material falling out of the dosing chamber.

Preferably, after step (F) a seventh step, step (G), is done, in step (G) DOSAPP displaces DOSDEV from the release position back to the distanced position.

Preferably, after step (F) a seventh step, step (G), is done, in step (G) DOSAPP displaces DOSDEV from the release position back to the distanced position relative to the reservoir.

In case of dosing of more than one dose D (i) with a DOSDEV comprising one dosing element, with i=1 to n, i and n being an integer and denoting the ith dose, n being the total number of doses, then the method comprises all seven steps (A) to (G) and all seven steps (A) to (G) are done for each dose, with step (A) (i+1) for the ensuing dose D (i+1) being done after step (G) (i) of the preceding dose D (i), and in any step after step (F) (i) for D (i) and before the step (F) (i+1) for the next dose D (i+1) the receptacle R (i), that was filled with D (i) in step (F) (i), needs to be exchanged under DOSDEV or under TRANSDEV, as the case may be, against the next receptacle R (i+1) to be filled with the next dose D (i+1). The skilled person understands that the method, when more than one dose is dosed with a DOSDEV comprising one dosing element, can start for the first dose D(1) with any of the 7 steps as long as step (F)(1) is done for D(1), the ensuing steps after the starting step are done consecutively in their alphabetical order and step (A) is done after step (G); the method stops after the last dose D(n) has been filled into the last receptacle R(n) in the step (F)(n) and before any step (F) (n+1) would be done.

In case of a DOSDEV comprising more than one dosing element, then the doses of each dosing element in DOSDEV are filled simultaneously into the respective receptacles and all the doses of a DOSDEV containing more than one dosing element may be called a charge of doses; and the skilled person understands that what has been described for one dose from a DOSDEV comprising one dosing element with regard to the steps of the method and their start, sequence and end, applies likewise for the dosing of a charge of doses from a DOSDEV containing more than one dosing element.

In case that DOSAPP contains two DOSDEVs, then preferably DOSAPP carries out simultaneously the method for both DOSDEVs, but with the sequence of steps for each DOSDEV shifted against the other one in such a way that step (E) for the one DOSDEV is done simultaneously with step (G) for the other DOSDEV.

Even more than two DOSDEVs in DOSAPP are possible, for example when DOSAPP comprises seven DOSDEVS, then each DOSDEV runs simultaneously through its succession of method steps with all 7 successions of method steps being shifted against the respective other DOSDEV by one step.

The predetermined time during which the gas is forced from the gas supply into the SPACE is from 0.01 to 1 sec, preferably from 0.01 to 0.5 sec, more preferably from 0.01 to 0.3 sec, even more preferably from 0.02 to 0.06 sec; a typical value may be 0.04 sec.

The predetermined pressure with which the gas is forced from the gas supply into the SPACE may be from 0.01 to 5 bar, preferably from 0.01 to 3 bar. A typical value may be from 0.01 to 2 bar.

The pressure together with the time may be predetermined and adjusted and adapted to the specific characteristics of each solid particulate material.

Since the SLIT is a circumferential slit around the opening of the dosing chamber the gas jet out of the SLIT of the dosing element has the shape of a circular or radial disc. Thereby any excess solid particulate material sticking to the outside of the lower end of the dosing element is effectively cut off from the lower end of the dosing element and falls down. Since the gas jet is applied while DOSDEV is in the distanced position relative to the reservoir, the excess solid particulate material actually falls down and back into the reservoir, thereby no waste of solid particulate material occurs and also contamination of the outside of DOSAPP and its environment by excess solid particulate material is avoided.

The strength and duration of the gas jet can be adjusted by choosing and setting the predetermined pressure and the predetermined time for forcing of the gas from the gas supply into the SPACE; obviously the optimum values is dependent on the nature of the solid particulate material.

The use of a gas jet for removing excess solid particulate material sticking to the outside of the lower end of the dosing chamber instead of using a mechanical scraper sets the risk of breaking a scraper to zero, thereby no broken parts of a scraper occur and cannot become a source for contamination of the solid particulate material in the reservoir, which could later on actually find its way into the receptacle and which must be avoided, or a source for a mechanical blockage or obstruction of DOSAPP; also any time consuming adjustment of the spatial alignment of a scraper with the outside of the lower end of the dosing element is not required, this is especially time consuming when DOSDEV contains more than one dosing element and the scraper actually is realized in form of a scraper unit containing more than one scraper, in this case the spatial alignment requires great care since not only vertical alignment of each scraper with all the other scrapers is required, but also horizontal alignment of the scraper unit is required so that all scrapers contained in the scraper unit show the same vertical distance from all the ends of dosing element. The gas jet provides for a more reproducible dosing of solid particulate material into a receptacle with less variance of the final amount of the sold particulate material in the receptacle.

The gas is preferably air or an inert gas such as nitrogen gas.

Once the vacuum has been applied in step (B) and the predefined dose of solid particulate material has been sucked into the dosing chamber, the vacuum remains active until the release of the solid particulate material in step (F).

The release of the solid particulate material from the dosing chamber in step (F) is effected or at least triggered by lowering of the strength of the vacuum, preferably by removing the vacuum, that was applied to suck the solid particulate material into the dosing chamber, thereby the dose of the solid particulate material falls down from the dosing chamber, optionally through TRANSDEV as the installation may be, into the receptacle.

In addition to removing of the vacuum that was applied to suck the solid particulate material into the dosing chamber, the release of the solid particulate material in step (F) may also be enhanced by applying positive gas pressure through the vacuum channel, that is by applying a gas blow through the vacuum channel and through the filter to the dosing chamber for ejecting the solid particulate material from the dosing chamber. This gas blow through the vacuum channel and through the filter is applied for a predetermined amount of time and with a predetermined force or pressure in order to enhance the emptying of the dosing chamber of the dose of the solid particulate material.

In one embodiment, the release of the solid particulate material from the dosing chamber in step (F) is effected by a step a):

a) at least lowering, preferably removing the vacuum that was applied to suck the solid particulate material into the dosing chamber;

and after step a) either a step b), a step c) or a succession of a step b) and a step c) is done:

b) moving the radial wall containing the filter element from the vacuum position to the ejecting position, thereby pushing any solid particulate material, which has remained in the dosing chamber after step a), out of the dosing chamber;

c) a gas blow is applied through the filter into the dosing chamber.

Preferably, all three steps a), b) and c) are done in their alphabetical order.

After step a), step b) and optionally step c), the radial wall containing the filter element is in a step d) again moved back from the ejecting position into the vacuum position. Step d) may be part of done still in step (F), but it may also be done in the ensuing step (G). Obviously step d) must be done before step (B), that is the radial wall containing the filter element must be in the vacuum position before solid particulate material is sucked in from the reservoir by the vacuum.

Constructing the radial wall containing the filter element to be movable axially within the dosing chamber provides for the possibility of doing step b) and/or step c); step b) and step c) both enhance the reproducibility of the dosing of solid particulate material, furthermore step b) provides for a cleaning of the dosing chamber, furthermore step c) provides for a cleaning of the dosing filter from any residual solid particulate material that may stick to the filter.

The solid particulate material can be any kind of material such as drug products, pharmaceuticals, chemicals, nutraceuticals and the like. The different solid particulate materials to be dosed may have different granularity with respect to particle size and particle size distribution and can be characterized for example by D50 values, sigma and FWHM values. For different solid particulate materials differing in their particle size the appropriate filter can be chosen with a mesh size that's safeguards the retention of the solid particulate material in the dosing chamber and prevent the sucking of solid particulate material through the filter into the vacuum channel and ultimately into the vacuum source.

The predetermined strength of the vacuum can be varied and can be adjusted and adapted to the requirements which arise from sucking various kinds of solid particulate material into the dosing chamber and from sucking predefined doses of various sizes of solid particulate material into the dosing chamber.

BRIEF DESCRIPTION OF THE DRAWINGS

The present invention will be described again with reference to the enclosed drawings, wherein:

FIG. 9: shows a perspective view of part of an inner surface of DOSDEV, the inner surface is exposed by the removal of part of DOSDEV as shown in FIG. 8, that is roughly a quarter, by two respective cross cuts along the areas defined by the lines B-B and D-D and the area defined by the lines C-C and D-D, thereby a perspective view on a horizontal cross cut through the upper part of 5 of the 9 dosing elements located in the inside of DOSDEV is revealed.

DETAILED DESCRIPTION OF PREFERRED EMBODIMENTS

Figure 2:
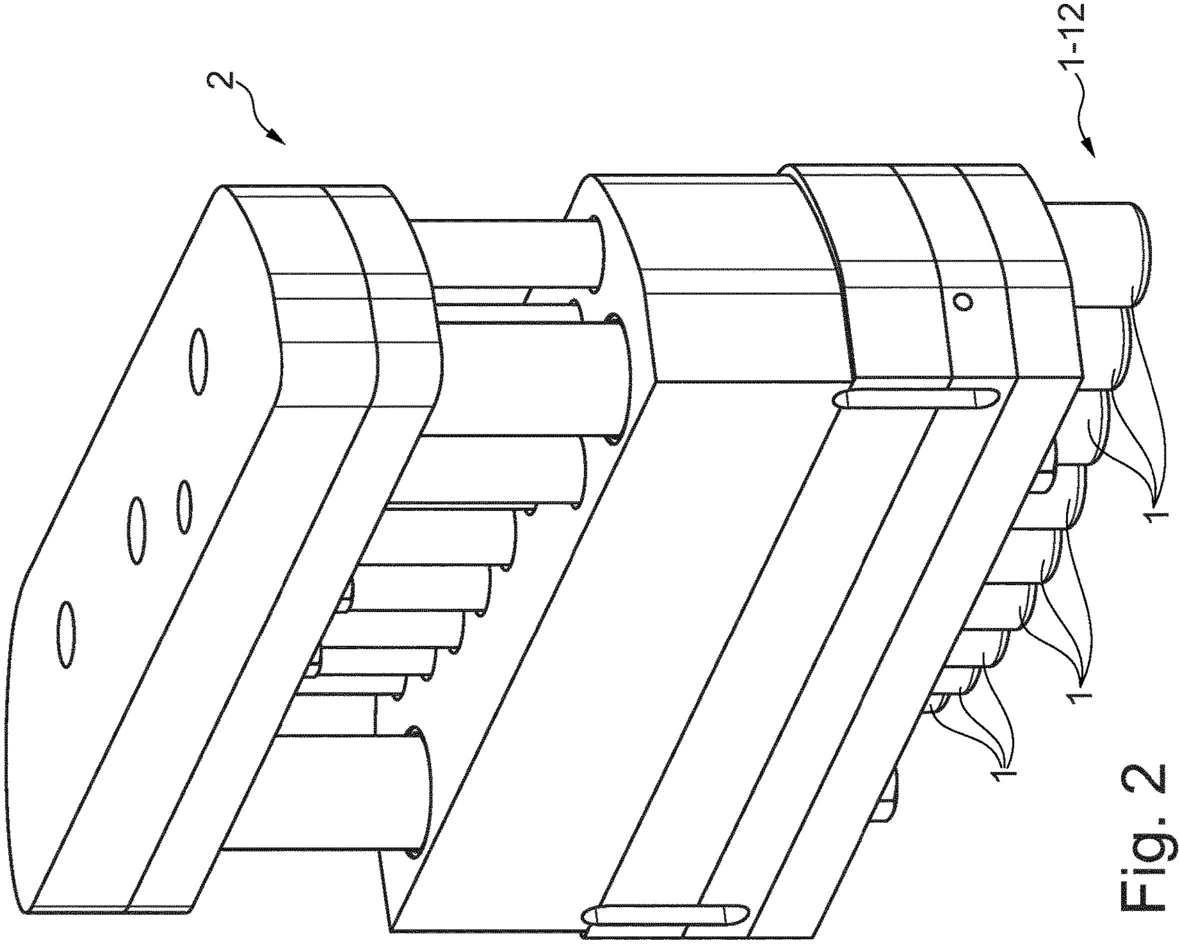
FIG. 2: shows a perspective view of DOSDEV with 9 dosing elements.
Figure 3:
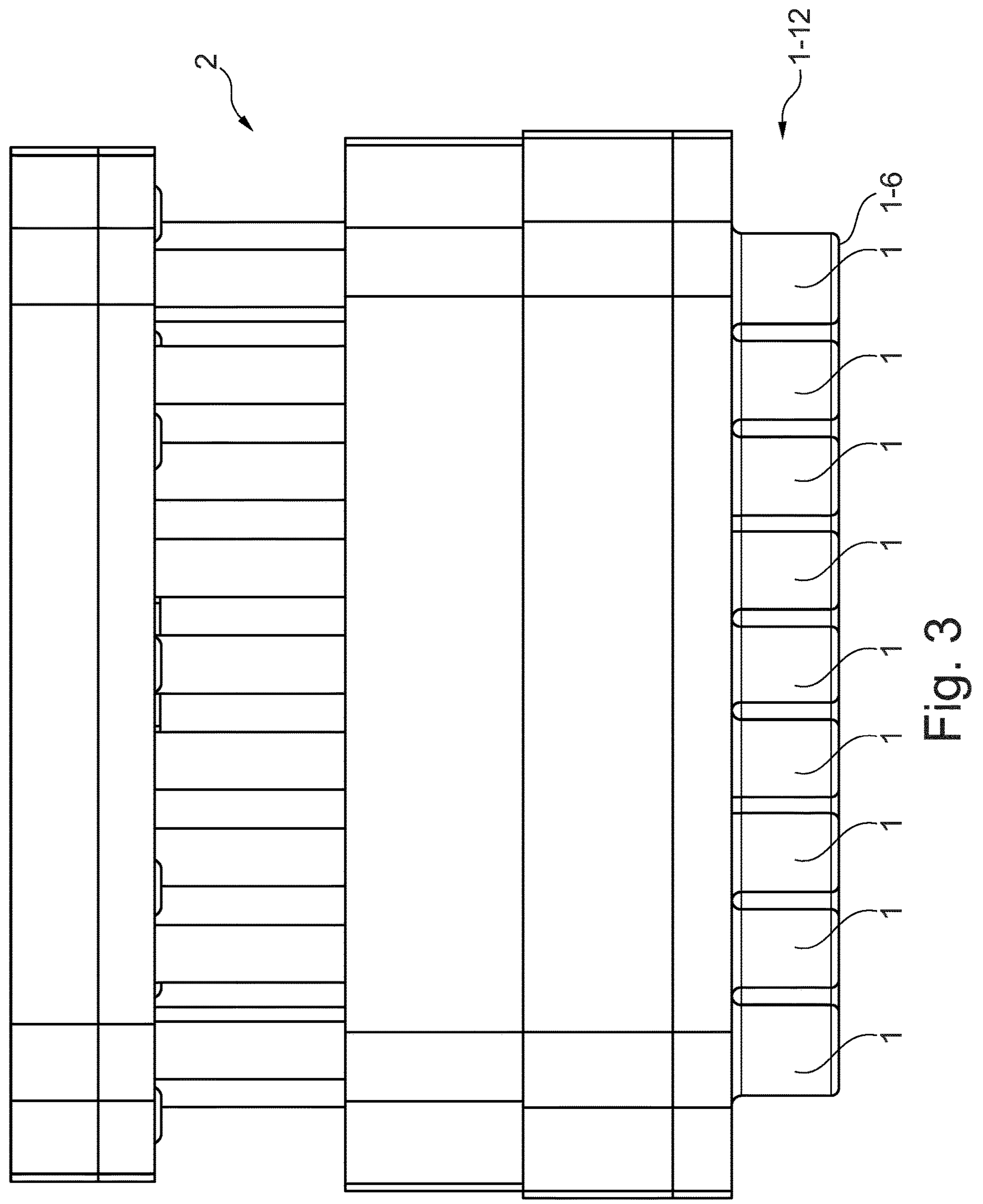
FIG. 3: shows a front view of DOSDEV with 9 dosing elements.
Figures 4, 4A, 4B:
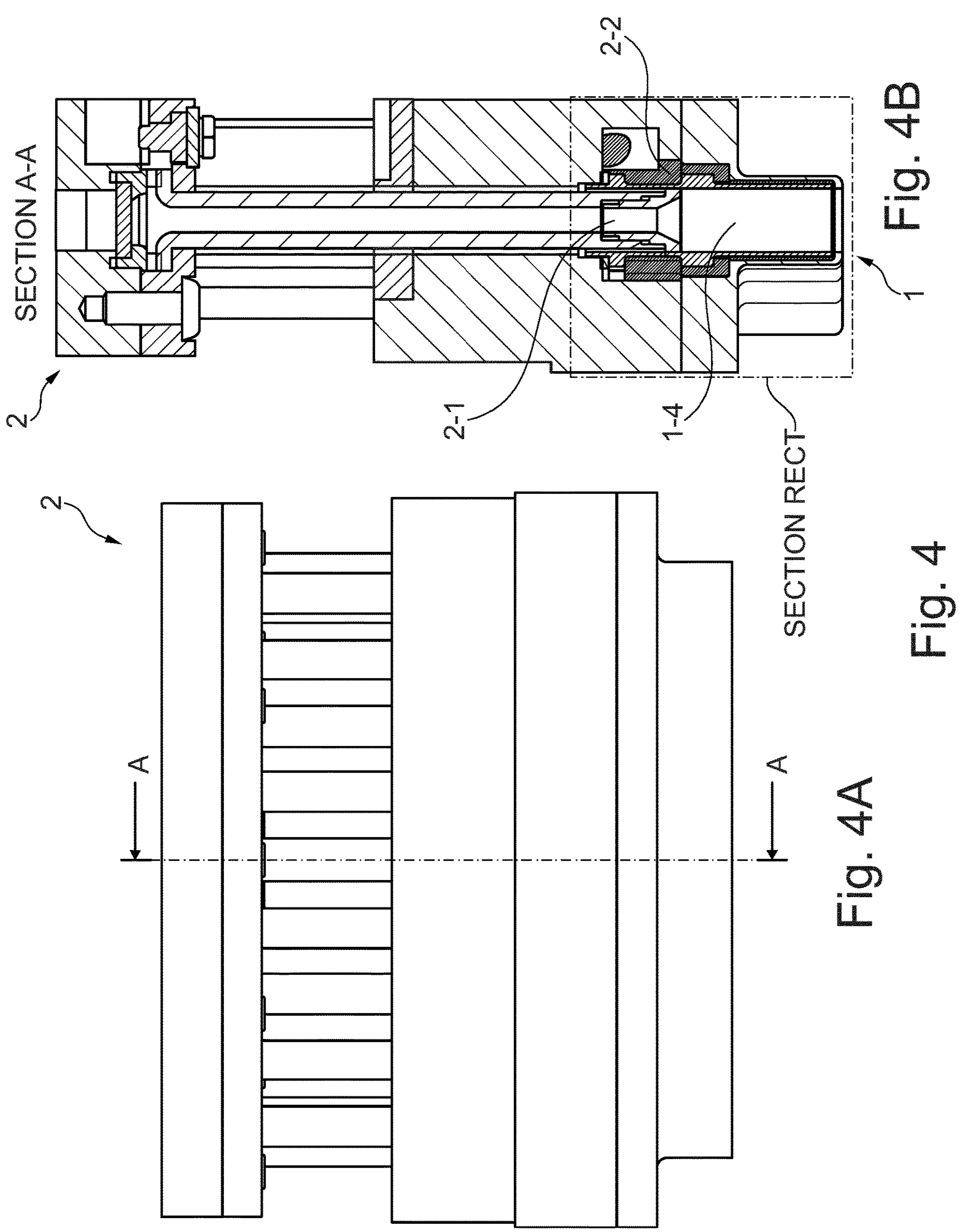
FIG. 4: shows in FIG. 4A a front view of DOSDEV, the 9 dosing elements, which are shown in FIG. 3, are not detailed in FIG. 4A, and in FIG. 4B a side view of a vertical section "SECTION A-A" through DOSDEV along the line A-A in FIG. 4A, side view shows sectional details of the dosing element; also shown in FIG. 4B is the rectangular section "SECTION RECT" of DOSDEV which is shown enlarged in FIG. 1.

The present invention will now be described in more detail with reference to the enclosed figures. Same components and arrangements are denoted in the figures by the same reference numerals and the respective description may be omitted in order to avoid redundancies. FIGS. 2 to 4 shows views of an embodiment of the DOSDEV (2) with 9 dosing elements (1). FIG. 4A shows a front view of DOSDEV (2), the 9 dosing elements (1) are not detailed in FIG. 4A. FIG. 4B shows a side view of a vertical cross sectional view "SECTION A-A" through DOSDEV (2) along the line A-A shown in FIG. 4A. This side view of FIG. 4B shows cross sectional details of one dosing element (1); also shown in FIG. 4B is the rectangular section "SECTION RECT" of DOSDEV (2) which is shown enlarged in FIG. 1.

FIG. 2 shows a perspective view of DOSDEV (2) with the 9 dosing elements (1).

FIG. 3 shows a front view of DOSDEV (2) with the 9 dosing elements (1).

Figure 1:
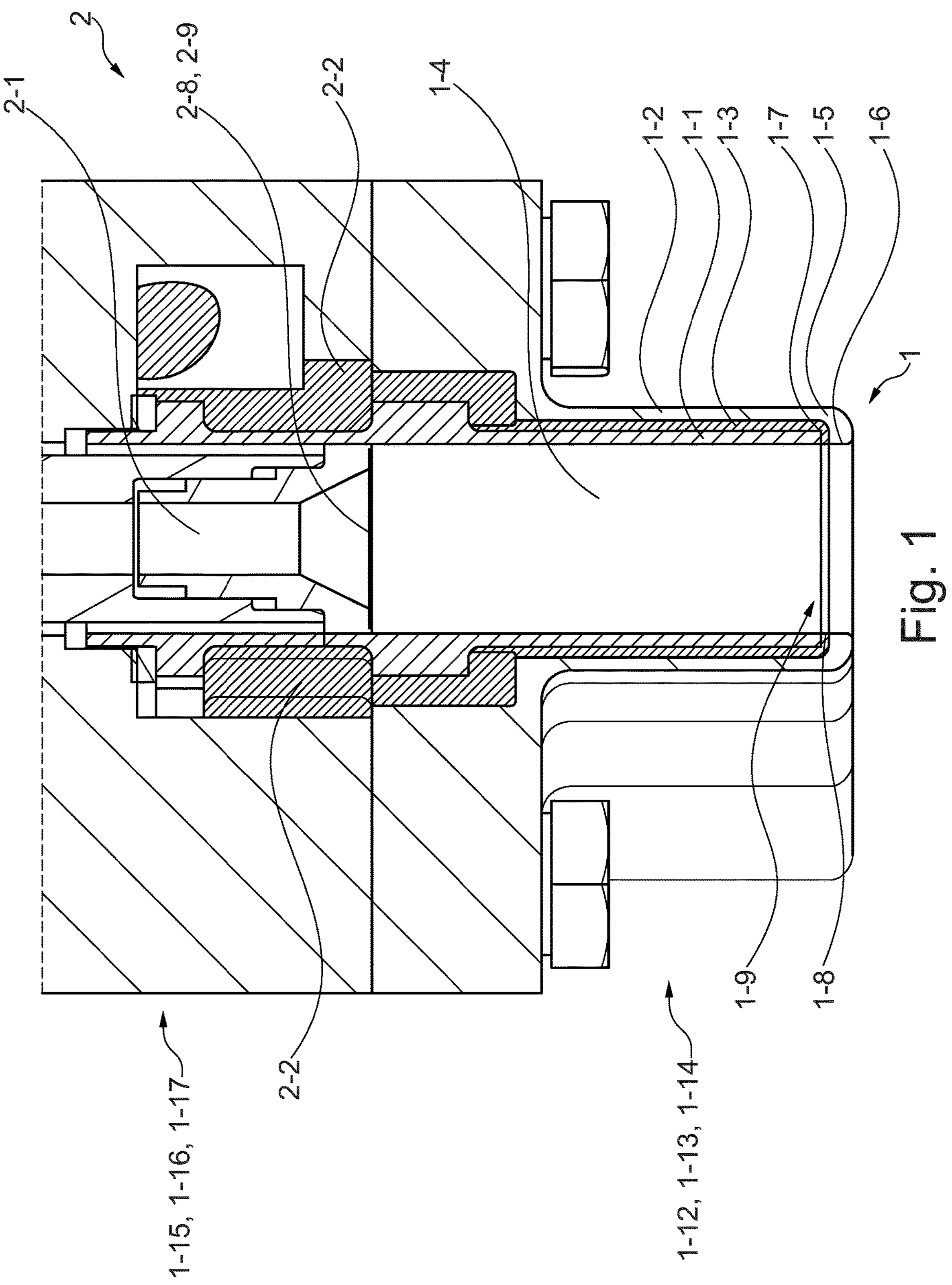
FIG. 1: shows a vertical sectional view of a dosing element.

FIG. 1 shows the enlarged rectangular section "SECTION RECT" shown in FIG. 4B of DOSDEV (2); the side view shows details of an embodiment of a dosing element (1).

The dosing element (1) consists of an inner tube shaped extension (1-1) and an outer tube shaped extension (1-2), both extensions protrude downwards at the lower side of DOSDEV (2);

- the inner tube shaped extension (1-1) and the outer tube shaped extension (1-2) are coaxially aligned with respect to each other;
- the inner tube shaped extension (1-1) is located within the outer tube shaped extension (1-2);
- the outer diameter of the inner tube shaped extension (1-1) is smaller than the inner diameter of the outer shaped extension, whereby a space, SPACE (1-3), is formed between the outer tube shaped extension (1-2) and the inner tube shaped extension (1-1), the SPACE (1-3) extending circumferentially around the inner tube shaped extension (1-1);

the inside of the inner tube shaped extension (1-1) forms a dosing chamber (1-4);

the opening at the lower end of the inner tube shape extension forms an opening (1-9) of the dosing chamber (1-4) at its lower end;

the wall of the outer tube shaped extension (1-2) extends beyond the rim (1-7) of the end of the wall of the inner tube shaped extension (1-1) in axial direction and has a bend, BEND (1-5), in the axial proximity of the end of the wall of the inner tube shaped extension (1-1), by this BEND (1-5) the wall of the outer tube shaped extension (1-2) extends radially inwards at least partially around the end of the inner tube shaped extension (1-1);

the outer tube shaped extension (1-2) ends with an opening whose diameter is smaller than the inner diameter of the outer tube shaped extension (1-2) axially before the BEND (1-5);

the SPACE (1-3) extends over the inner surface of the BEND (1-5) and further on to the rim (1-6) of the end of the wall of the outer tube shaped extension (1-2), thereby radially inwards from the BEND (1-5) the SPACE (1-3) ends in an opening slit, SLIT (1-8), between the end of the inner tube shaped extension (1-1) and the end of the outer tube shaped extension (1-2);

the rim (1-6) of the end of the wall of the outer tube shaped extension (1-2) does not extend in a radial inward direction beyond the inner diameter of the end of wall of the inner tube shaped extension (1-1).

The dosing element (1) is a part which is separable from any other part of DOSDEV (2); the inner tube shaped extension (1-1) and the outer tube shaped extension (1-2) are two parts which are separable from each other and from any other part of DOSDEV (2).

DOSDEV (2) comprises two parts, the dosing element (1) and a body of DOSDEV (2) which has a position of a dosing element (1) where the dosing element (1) can be connected to the body of DOSDEV (2).

The dosing element (1), and therewith the inner tube shaped extension (1-1) and the outer tube shaped extension (1-2), has two sections, an upper section and a lower section, with the lower section being the protruding section (1-12) of the dosing element, the protruding section (1-13) of the inner tube shaped extension and the protruding section (1-14) of the outer tube shaped extension respectively, whereas the upper section being located within the other part of DOSDEV (2). Depicted in FIG. 1, FIG. 2 and FIG. 3 is the protruding section (1-12) of the dosing element (1), FIG. 1 shows the location of the upper section (1-15) of the dosing element (1), of the upper section (1-16) of inner tube shaped extension (1-1) and of the upper section (1-17) of outer tube shaped extension (1-2).

The lower section of the dosing element (1) contains the lower section of the inner tube shaped extension (1-1) and the lower section of the outer tube shaped extension (1-2).

The upper section (1-15) of the dosing element (1) contains the upper section (1-16) of inner tube shaped extension (1-1) and the upper section (1-17) of outer tube shaped extension (1-2).

The lower section of the dosing element (1), that is the protruding section (1-13) of the inner tube shaped extension (1-1), has the shape of a tube with a constant inner diameter over the axial extension of this tube shaped lower section, that means that the inner diameter of the lower section of the inner tube shaped extension (1-1) and the diameter of the opening (1-9) of the dosing chamber (1-4) are identical;

the lower sections of the dosing element (1), that is the protruding section (1-14) of the outer tube shaped extension (1-2), has the shape of a tube.

Thereby the lower section of the dosing element (1), that is the protruding section (1-12) of the dosing element (1), has the shape of a tube.

The lower section of the dosing element (1) and thereby both the lower sections of the inner and outer tube shaped extension (1-2) protrude vertically downwards.

Since the dosing element (1) is a part of DOSDEV (2), this protrusion of the dosing element (1) is the bottom of DOSDEV (2); the lower end of the dosing element (1), that is the lower end of the outer tube shaped extension (1-2), is the lower end of DOSDEV (2).

The protruding part of the outer tube shaped extension (1-2) protrudes with a vertical length of 13 mm vertically downwards.

DOSDEV (2) is a device that comprises 9 dosing elements (1) as depicted in FIG. 2, FIG. 3, FIG. 5, FIG. 9, FIG. 15, FIG. 16 and FIG. 17.

All 9 dosing elements (1) are identical to each other.

All 9 dosing elements (1) of DOSDEV (2) are parts which are separable from each other and from any other part of DOSDEV (2).

DOSDEV (2) comprises the body of DOSDEV (2) which contains 9 POS-DE, where a dosing element (1) can be connected to DOSDEV (2), NUM-DE is 9 and NUM-DE-CONNECTED is 9 as depicted in FIG. 2, FIG. 3, FIG. 5, FIG. 9, FIG. 15, FIG. 16 and FIG. 17.

All dosing elements (1) contained in DOSDEV (2) protrude axially with the same vertical length, and all the lower ends of the dosing elements (1) of DOSDEV (2), that is all the lower ends of the outer tube shaped extensions (1-2) are horizontally aligned with each other with respect to their vertical position in DOSDEV (2), as depicted in FIG. 2, FIG. 3, FIG. 5, FIG. 9, FIG. 15, FIG. 16 and FIG. 17.

Figure 18:
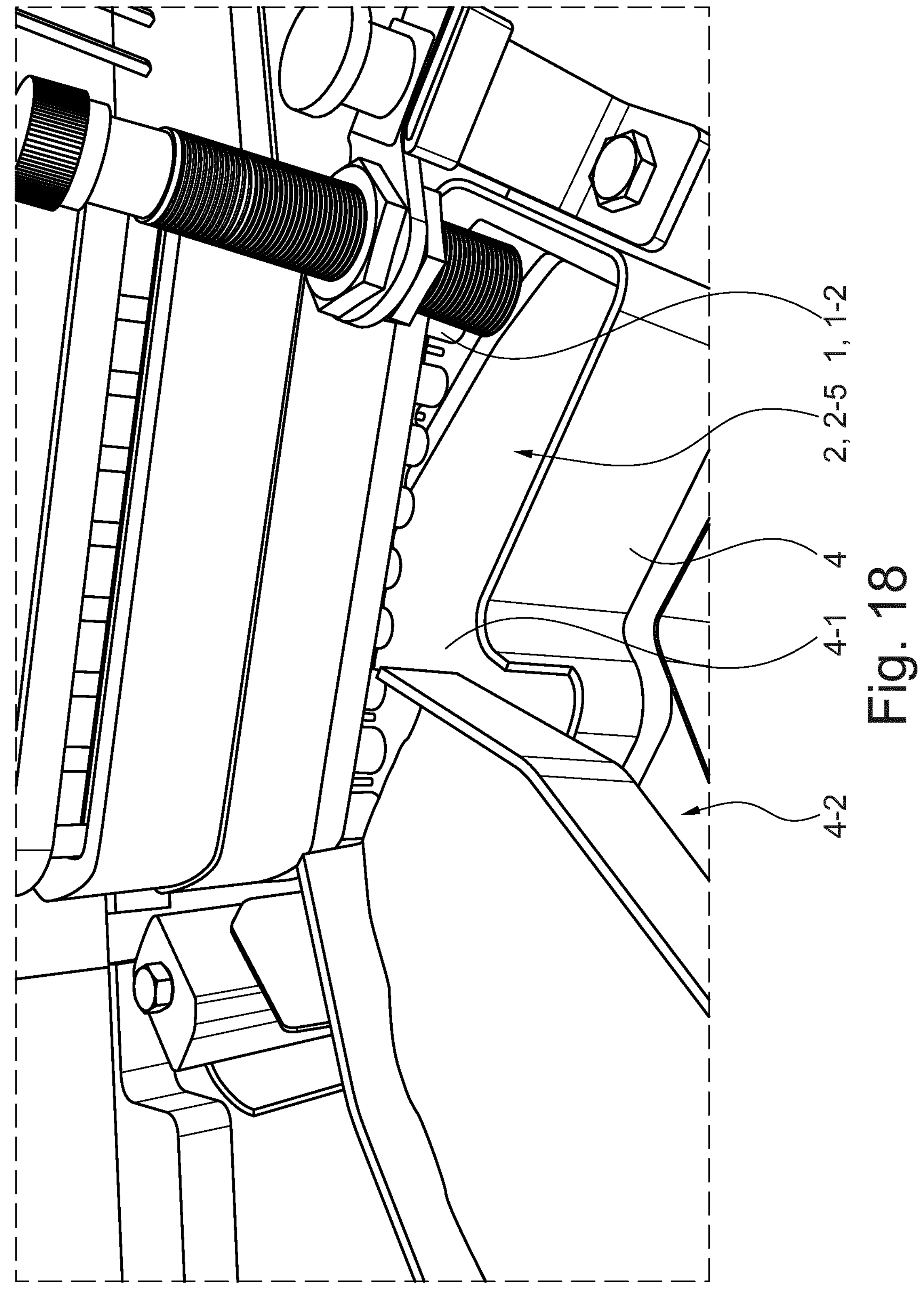
FIG. 18 shows a part of DOSAPP and a DOSDEV with 9 dosing elements, with DOSDEV being on the way from the distanced position relative to the reservoir to the release position (not shown) which is located on the other side of DOSAPP opposite to the side where the position of above the reservoir is located; DOSAPP has turned DOSDEV for some degrees from the position above the reservoir around a vertical axis into the direction of the release position; no excess material is sticking to the outside of the lower end of the dosing elements.

The protruding part of any dosing element (1) is not connected or in touch with the protruding part of any other dosing element (1), but is separated from the protruding part of any other dosing element (1), as depicted in FIG. 18.

FIG. 1 shows, that the SPACE (1-3) is provided where the outer tube shaped extension (1-2) does not touch the inner tube shaped extension (1-1), that is where the inner wall of the outer tube shaped extension (1-2) does not touch the outer wall of the inner tube shaped extension (1-1). The SPACE (1-3) ends axially downwards with the SLIT (1-8). The SLIT (1-8) extends circumferentially around the opening (1-9) of the dosing chamber (1-4). The SPACE (1-3) extends circumferentially around the end of the inner tube shaped extension (1-1). From the axially upper beginning of the BEND (1-5), the SPACE (1-3) extends over the inner surface of the BEND (1-5) and further on to the rim (1-6) of the end of the wall of the outer tube shaped extension (1-2), that is until the SLIT (1-8). So the end of SPACE (1-3) in the axially downward direction is the SLIT (1-8). In the axially upward direction starting from the SLIT (1-8), the SPACE (1-3) extends over the BEND (1-5). The SPACE (1-3) extends axially upwards from the BEND (1-5) at least for a certain length along the of the inner tube shaped extension (1-1).

By the BEND (1-5) in the axial proximity of the end of the wall of the inner tube shaped extension (1-1), that is after the BEND (1-5) in the radially inward direction towards the end of the outer tube shaped extension (1-2), the wall of the outer tube shaped extension (1-2) ends radially inwards with an angle, ANGLE, of 90° and the rim (1-6) of the end of the wall of the outer tube shaped extension (1-2) ends is vertically aligned with the inner surface of the inner tube shaped extension (1-1). This means that the diameter of the opening of the outer tube is equal to the inner diameter of the lower end of the inner tube shaped extension (1-1), that also means that the diameter of the opening of the outer tube shaped extension (1-2) is equal to the opening (1-9) of the dosing chamber (1-4).

The 9 dosing elements (1) depicted in FIG. 2, FIG. 3, FIG. 5, FIG. 9, FIG. 15, FIG. 16 and FIG. 17 are one of four dosing elements (1) DE1, DE2, DE3 and DE4 according to Table 3:

TABLE 3

| | diameter of the opening (1-9) of the dosing chamber (1-4) [mm] | inner diameter of the end of the outer tube shaped extension [mm] |
|---|---|---|
| DE1 | 4 | 4 |
| DE2 | 5 | 5 |
| DE3 | 6 | 6 |
| DE4 | 8 | 8 |

In DE1, DE2, DE3 and DE4, the thickness of the wall of the inner tube shaped extension (1-1) is 0.5 mm;

the radial width of the SPACE (1-3) is 0.5 mm;

the thickness of the wall of the outer tube shaped extension (1-2) is 0.5 mm the width of the SLIT (1-8) is 0.3 mm.

Figure 5:
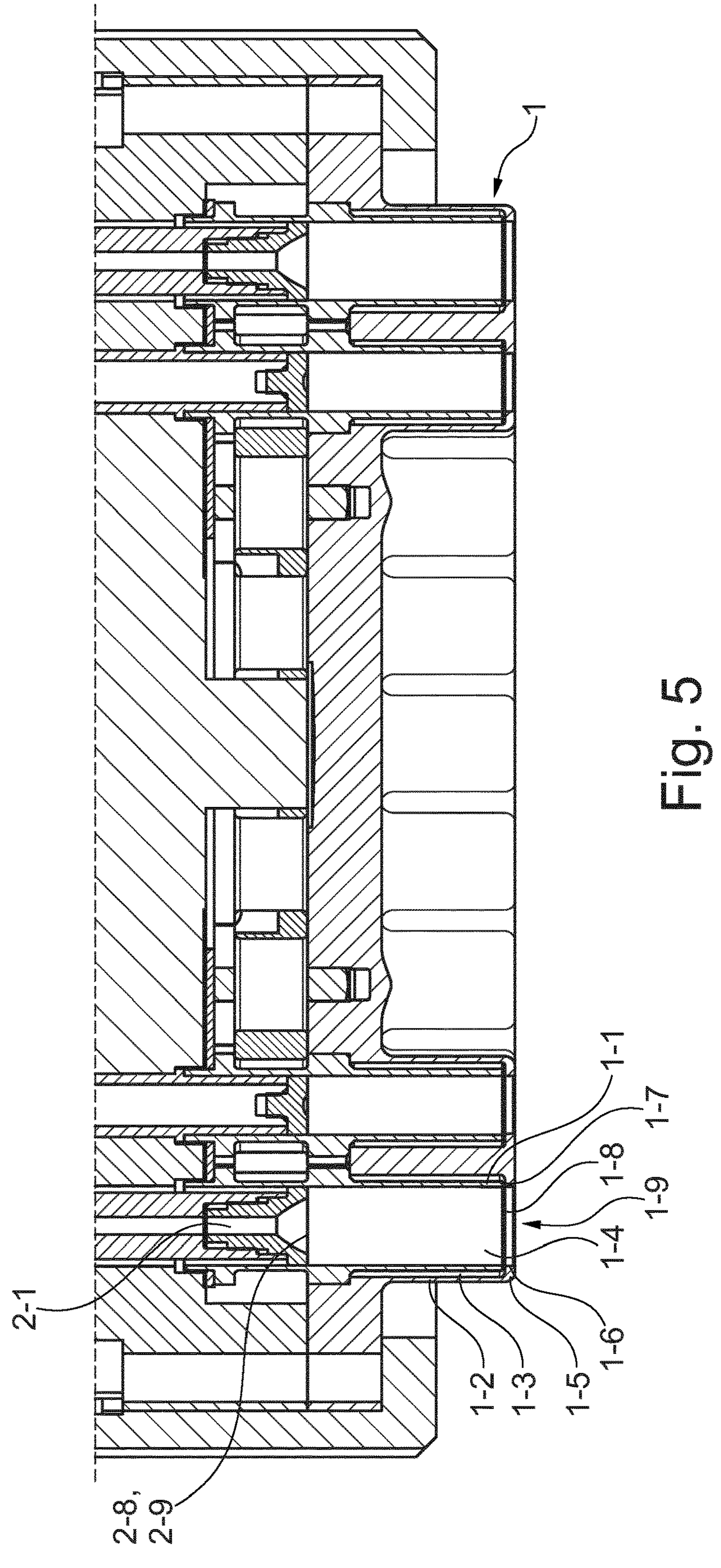
FIG. 5: shows a vertical sectional view of the lower section of DOSDEV with 9 dosing elements, the section cuts through the center of the first and last dosing element.
Figure 6:
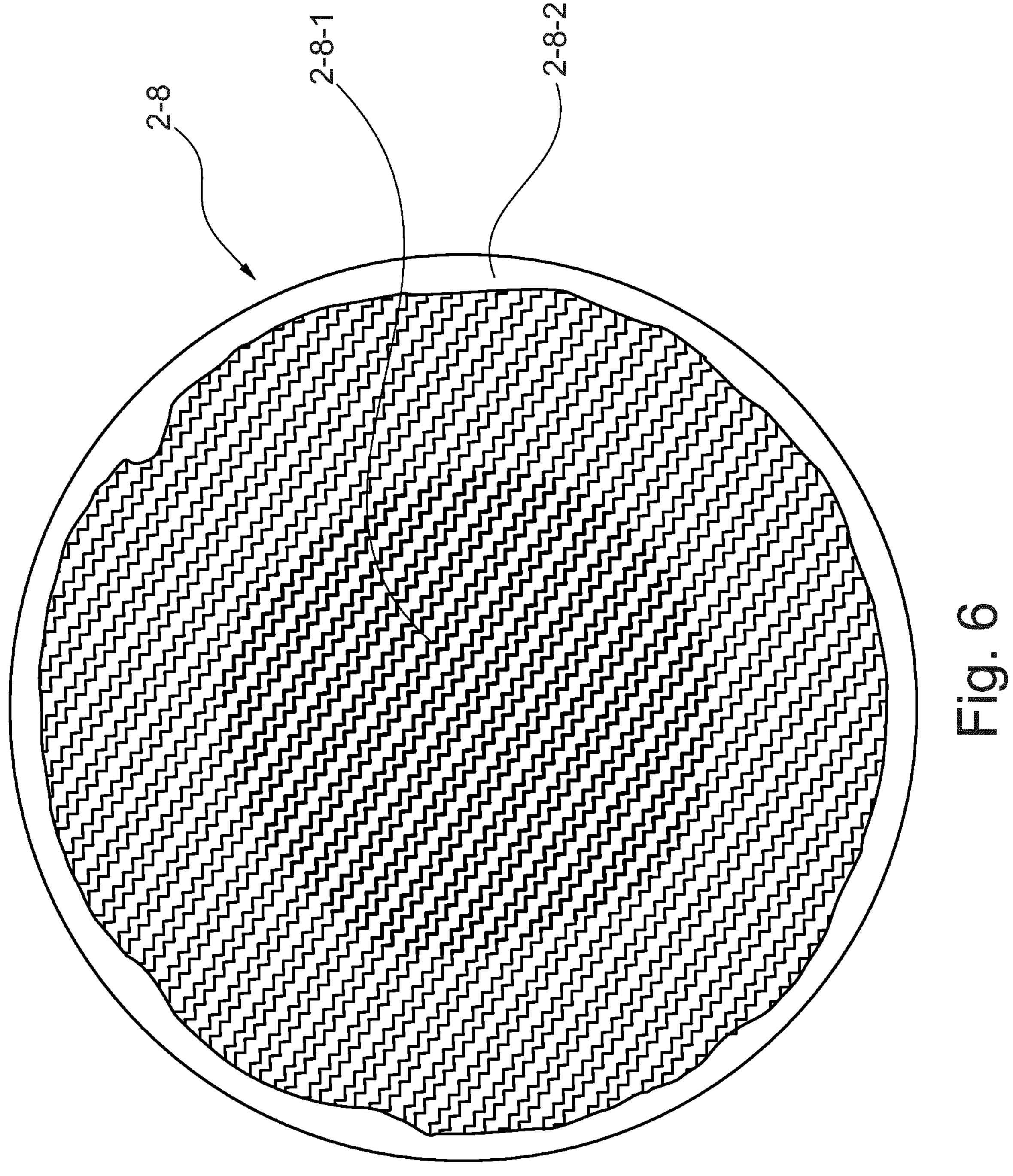
FIG. 6: shows a filter element
Figure 7:
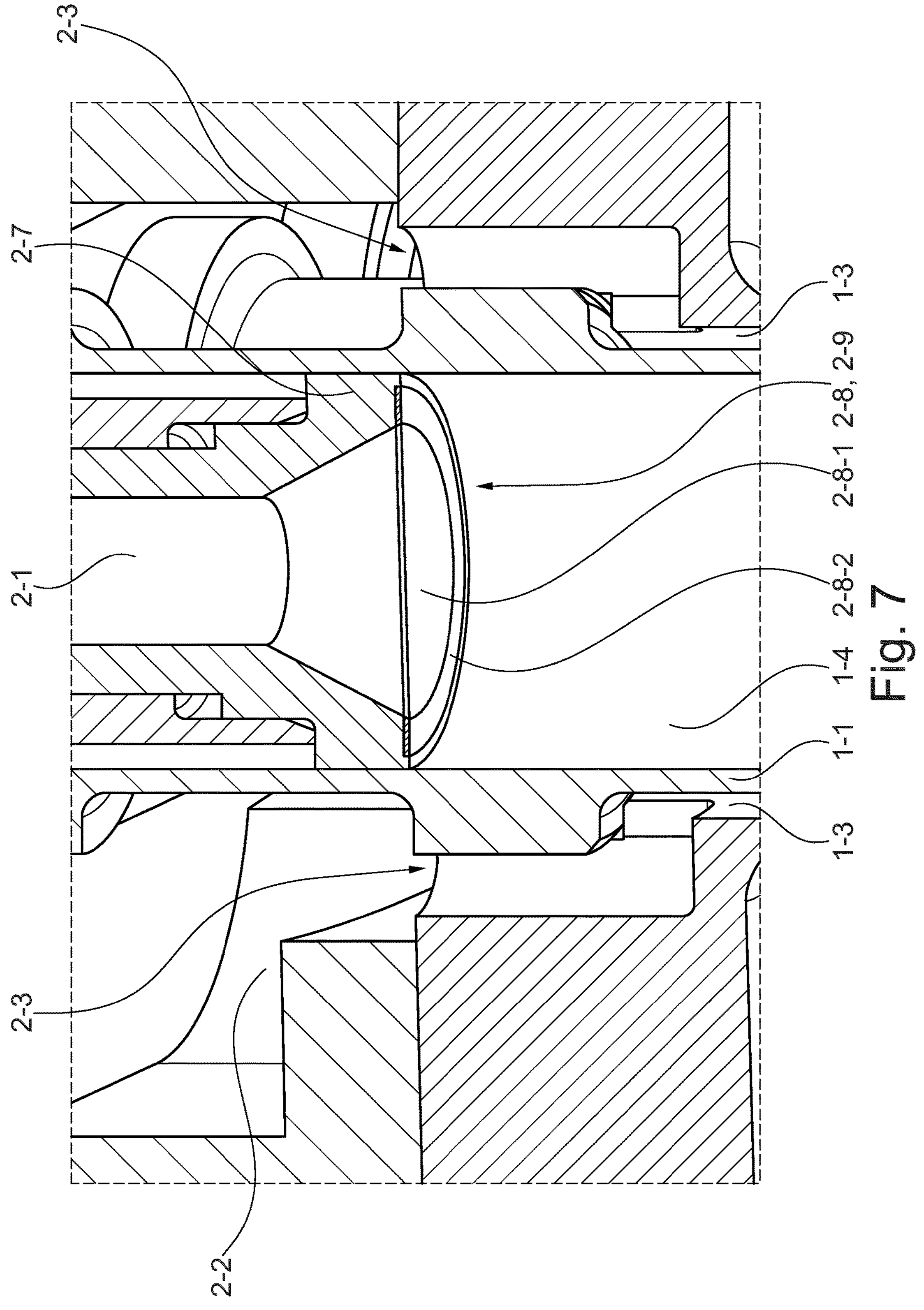
FIG. 7: shows a partially perspective sectional view of the upper part of the dosing element containing the filter element.
Figure 8:
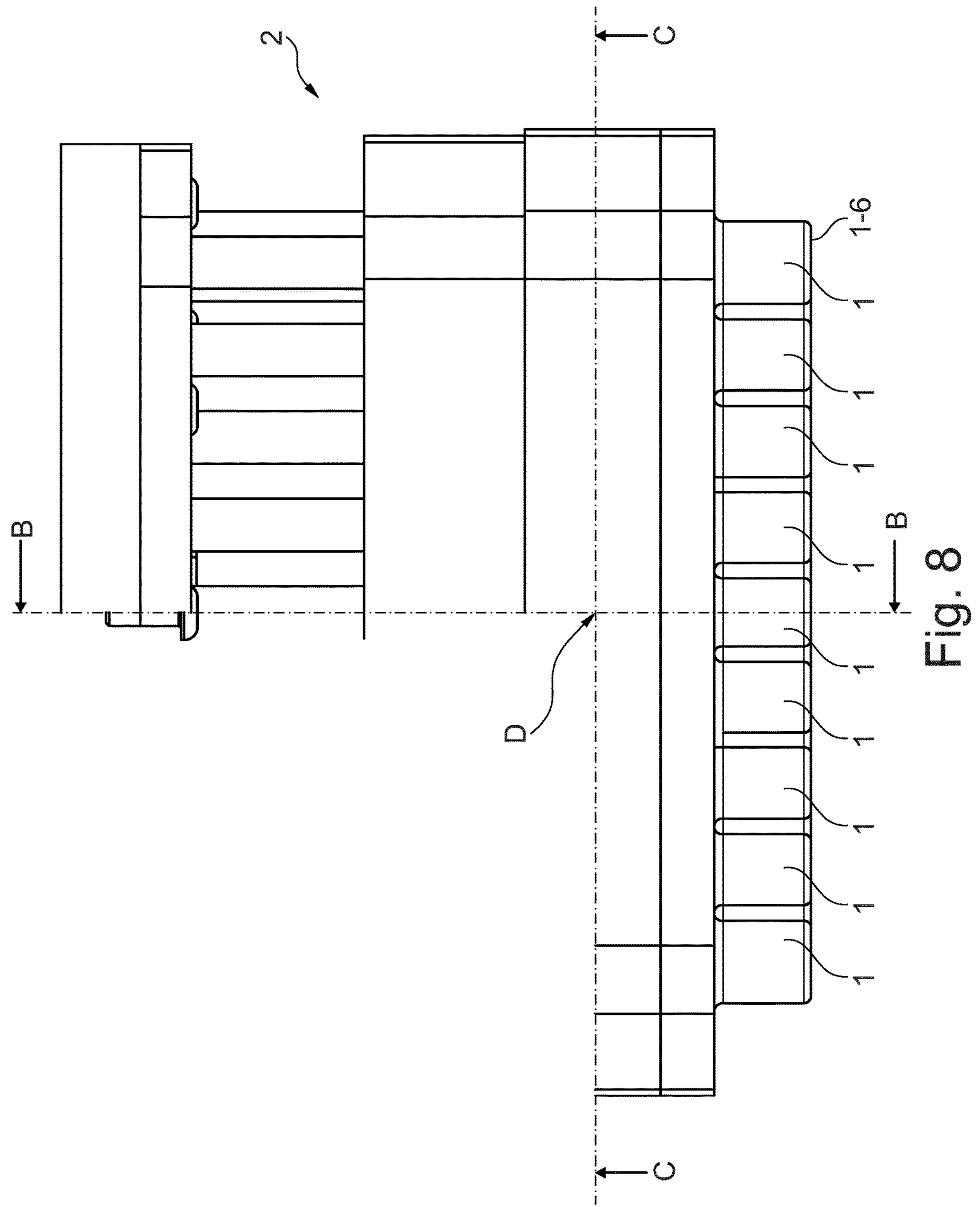
FIG. 8: shows a front view of DOSDEV with 9 dosing elements; with a part of DOSDEV cut off, the part is roughly a quarter of DOSDEV along the lines B-B and C-C; the lines B-B and C-C cross at the point denoted with D.

FIG. 1 shows, how the upper side of the dosing chamber (1-4) is limited by a filter element (2-8), the filter element (2-8) comprises a filter (2-8-1). Also FIG. 5, FIG. 6 and FIG. 7 show details of the filter element. So the DOSDEV (2) further comprises the filter element (2-8), the filter element (2-8) and the filter (2-8-1) have a round, flat shape, the radial wall (2-9) is the filter element (2-8) and the filter element (2-8) is the filter (2-8-1), so the radial wall (2-9) is the filter (2-8-1).

The lower side of the filter (2-8-1) faces the dosing chamber (1-4).

The mesh size of the filter (2-8-1) is 43 micrometers.

Values for the open and passable area of the filter (2-8-1) are from 8 to 15% of the area of the filter (2-8-1).

FIG. 1 shows the filter element (2-8) in the vacuum position.

FIG. 1, FIG. 2, FIG. 3, FIG. 4, FIG. 5, FIG. 7 and FIG. 8 show further details: The dosing chamber (1-4) has a cylindrical form; the axial wall of the cylinder forming the dosing chamber (1-4) are formed by the inner tube shaped extension (1-1), the lower end of the cylinder forming the dosing chamber (1-4) is the opening of the inner tube shaped extension (1-1), that is the opening (1-9) of the dosing chamber (1-4), and the top end of the cylinder forming the dosing chamber (1-4) is delimited by the radial wall (2-9) containing the filter element (2-8). The opening (1-9) of the dosing chamber (1-4) and the dosing chamber (1-4) are in fluid connection through the filter (2-8-1) with a channel which starts from the upper side of the filter (2-8-1) and extends through the upper part of DOSDEV (2), this channel is connected to a vacuum supply and is called the vacuum channel (2-1); the vacuum can be applied via the vacuum channel (2-1) to the dosing chamber (1-4). The dosing chamber (1-4) is also in fluid connection through the filter (2-8-1) and through the vacuum channel (2-1) with a gas supply for applying an air blow via the vacuum channel (2-1) and through the filter (2-8-1) into the dosing chamber (1-4). Thereby both alternatives are possible: applying an air blow or a suction via the vacuum channel 2-1 and through the filter (2-8-1) into the dosing chamber (1-4).

The vacuum supply is not shown in any of the figures.

The inner diameter of the dosing chamber (1-4) is constant from its lower end, that is from the opening (1-9) of the dosing chamber (1-4), up to the radial wall (2-9) delimiting the dosing chamber (1-4) at its upper end. That means that the inner tube shaped extension (1-1) has a constant inner diameter over its length. The section of the inner tube shaped extension (1-1) which is the axial wall of the dosing chamber (1-4), is a tube and the axial wall of the dosing chamber (1-4) is an axially straight tubular, that is a cylindrical wall.

The radial wall (2-9) comprising the filter element (2-8) is movable in the axial direction of the dosing chamber (1-4) between an upper position, the upper position is the vacuum position of the radial wall (2-9) containing the filter element (2-8), and a lower position, the lower position is the ejecting position of the filter element (2-8). The ejecting position is axially closed to the end of the inner tube shaped extension (1-1), the ejecting position does not exceed axially beyond the rim (1-7) of the end of the wall of the inner tube shaped extension; that is it does not extend axially into then SLIT (1-8).

FIG. 6 and FIG. 7 show further details of the filter, the filter (2-8-1) is attached with its upper side to the lower end of a filter tube (2-7) by welding (2-8-2). The filter tube (2-7) has an outer diameter that is equal to the inner diameter of the dosing chamber (1-4). The lower end of the filter tube (2-7) is part of the radial wall (2-9) containing the filter element (2-8). The circumference of the radial wall (2-9) containing the filter element (2-8) has the same shape as the circumference of the dosing chamber (1-4), both shapes are circular shapes with the dosing chamber (1-4) being the inside of a cylinder, that is of a tube, and the radial wall (2-9) snuggly fits into the dosing chamber (1-4).

The axial location of the vacuum position, that is the axial location of the radial wall (2-9) containing the filter element (2-8), determines the size of the dosing chamber (1-4).

The SPACE (1-3) is connected at its end opposite to the SLIT (1-8) to a gas supply, the gas supply is not shown in the figures. The SPACE (1-3) starts on its lower end from the SLIT (1-8) and extends through the space between the inner and outer tube shaped extensions (1-2) of the dosing element (1) and then connects to more than one gas channel which extend further through the upper part of DOSDEV (2). SPACE (1-3) is connected via the more than one gas channels to a gas supply, the supplied gas flows from the gas supply through the more than one gas channels into SPACE (1-3) in DOSDEV (2) and exits from the SLIT (1-8).

Figure 9:
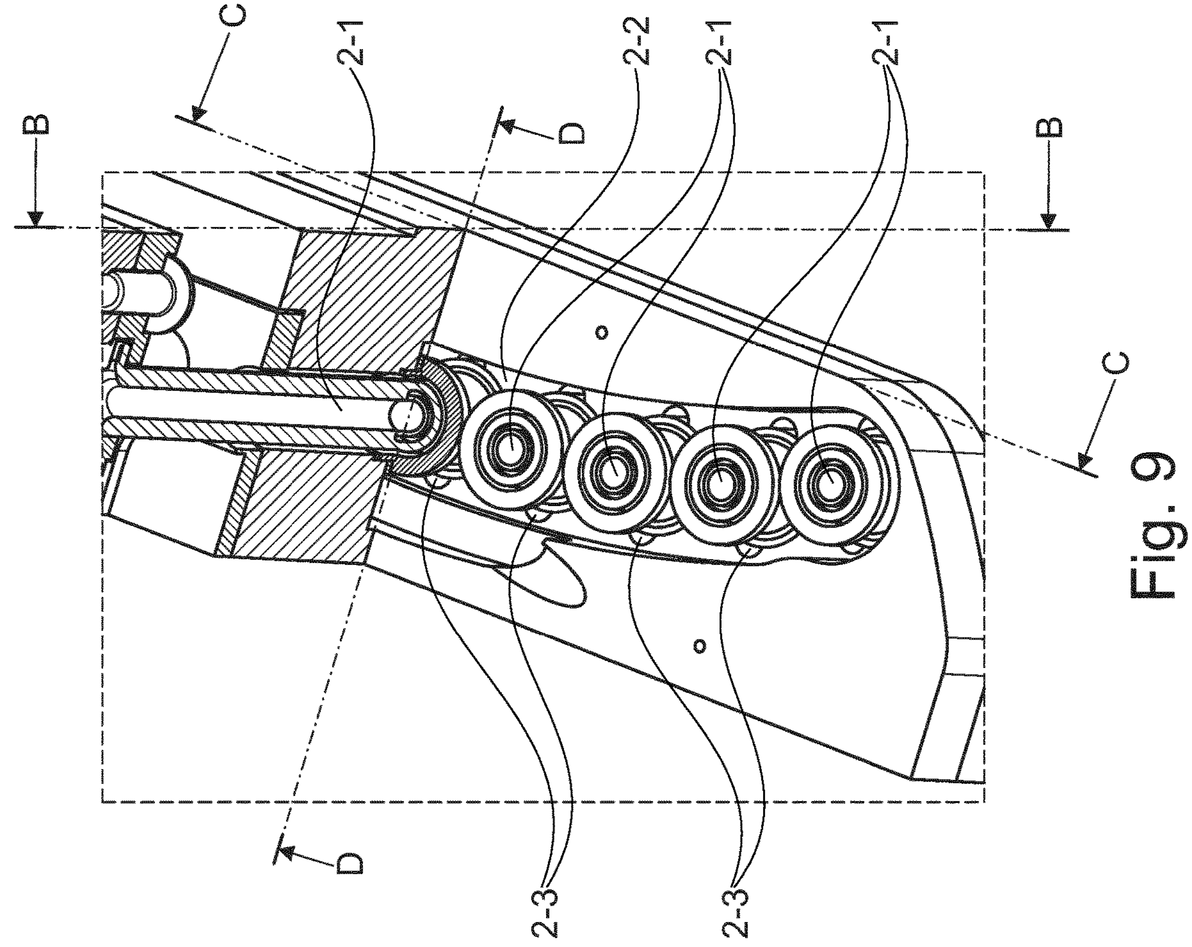
in FIG. 9 a perspective view of part of the inner surface of DOSDEV exposed by the removal is shown

Each SPACE (1-3) of each of the 9 dosing elements (1) is connected through the more than one gas channel to a space cavity, SPACECAV (2-2), SPACECAV (2-2) is located in the upper part of DOSDEV (2), and then SPACECAV (2-2) again is connected via a gas channel to the gas supply. Some of these details are shown in FIG. 4B and FIG. 9. Thereby each SLIT (1-8) of each of the 9 dosing elements (1) is in fluid connection with the respective other SLITs (1-8) of the other dosing elements (1) via the respective SPACE (1-3) and the respective more than one gas channels and SPACECAV (2-2), and each SLIT (1-8) of each of the 9 dosing elements (1) is in fluid connection with the gas supply via SPACECAV (2-2). Thereby only one gas supply is required to feed simultaneously all SPACEs (1-3) in each of the 9 dosing elements (1) via SPACECAV (2-2) with gas.

SPACECAV (2-2) is located in the upper part of DOSDEV (2), above the dosing elements (1), which are located in the lower section of DOSDEV (2).

From SPACECAV (2-2) there are more than one exits (2-3) to the SPACE (1-3).

DOSDEV (2) comprises a body of DOSDEV (2) which has 9 positions of a dosing element (1) where a dosing element (1), which is a part which is separable from any other part of DOSDEV (2), can be connected to the body of DOSDEV (2);

- DOSDEV (2) is a kit of parts comprising 9 sets of dosing elements (1), SODE, one for each of the 9 positions of a dosing element (1);
- the dosing elements (1) of each of the 9 SODEs are parts which are separable from each other and from any other part of DOSDEV (2);
- within a SODE the inner diameter of the inner tube shaped extension (1-1) of any dosing element (1) contained in the SODE is different from the inner diameter of the inner tube shaped extension (1-1) of any other dosing element (1) contained in the SODE; any SODE is identical with any other SODE.

The number of dosing elements (1) contained in a SODE, NUM-DE-SODE, is 4; each SODE contains the four dosing elements (1) DE1, DE2, DE3 and DE4.

POS-DE is 9;

NUM-DE 36;

NUM-DE-SODE=4;

NUM-DE-CONNECTED=1 to 9.

SODE is not shown in the Figures.

Figure 10:
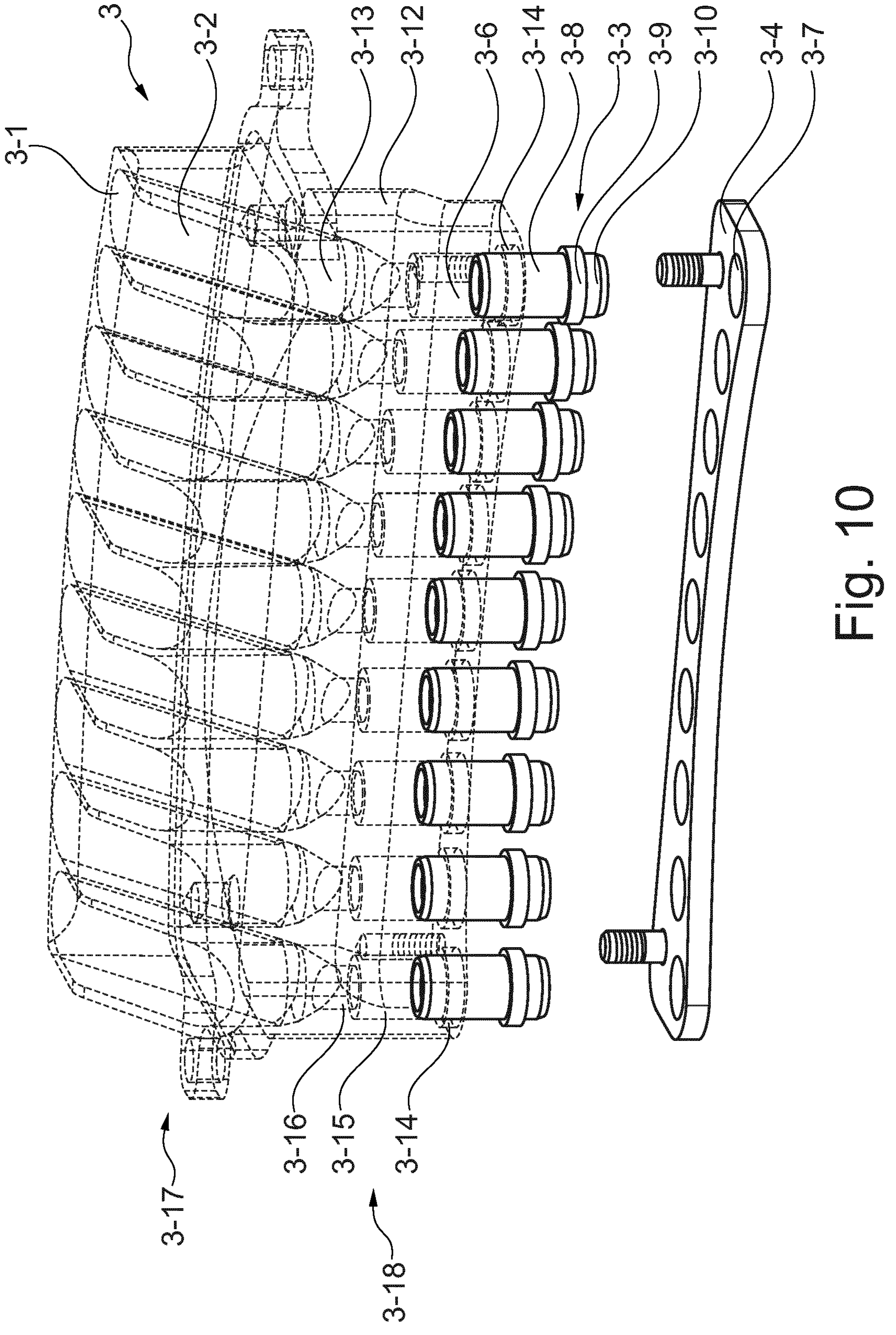
FIG. 10: shows an exploded perspective view of TRANSDEV with 9 channels.

FIG. 10 shows a transfer device, TRANSDEV (3), for transferring solid particulate material (4-1) from the DOSDEV (2) into a receptacle;

- TRANSDEV (3) has an upper side facing upwards in vertical direction and a bottom side facing downward in vertical direction;
- TRANSDEV (3) comprises in its upper side 9 receiving openings (3-1) and in its bottom side 9 discharging openings (3-5);
- the 9 receiving openings (3-1) and the 9 discharging openings (3-5) are connected by 9 respective channels;
- the 9 receiving openings (3-1) of TRANSDEV (3) corresponds to the 9 openings (1-9) of the dosing chamber (1-4) of DOSDEV (2);
- the 9 discharging openings (3-5) of TRANSDEV correspond to the openings of the receptacle.

So each of the receiving opening (3-1) is the opening of the respective channel at the upper side of TRANSDEV (3); and the respective discharging opening (3-5) is the opening of the respective channel at the bottom side the TRANSDEV (3). The respective channel runs through TRANSDEV (3) connecting the receiving opening (3-1) with the respective discharging opening (3-5).

TRANSDEV (3) is a device for cooperation with DOSDEV (2) and corresponds with and to DOSDEV (2), they are interrelated devices.

Figure 12:
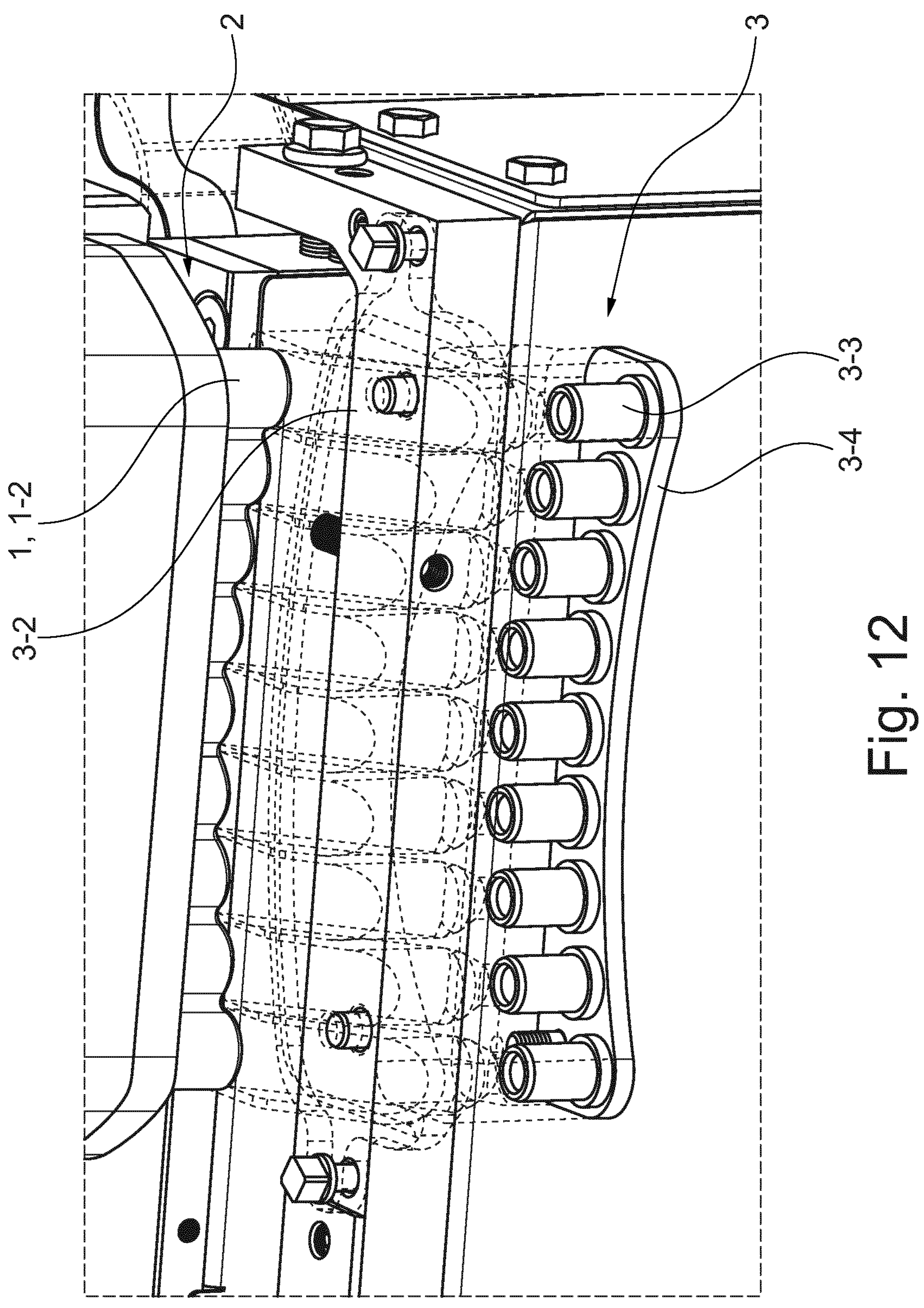
FIG. 12: shows DOSDEV and TRANSDEV vertically aligned in DOSAPP, DOSDEV has 9 dosing elements and TRANSDEV has 9 channels, each channel of TRANSDEV corresponding with one of the dosing elements of DOSDEV.
Figure 13:
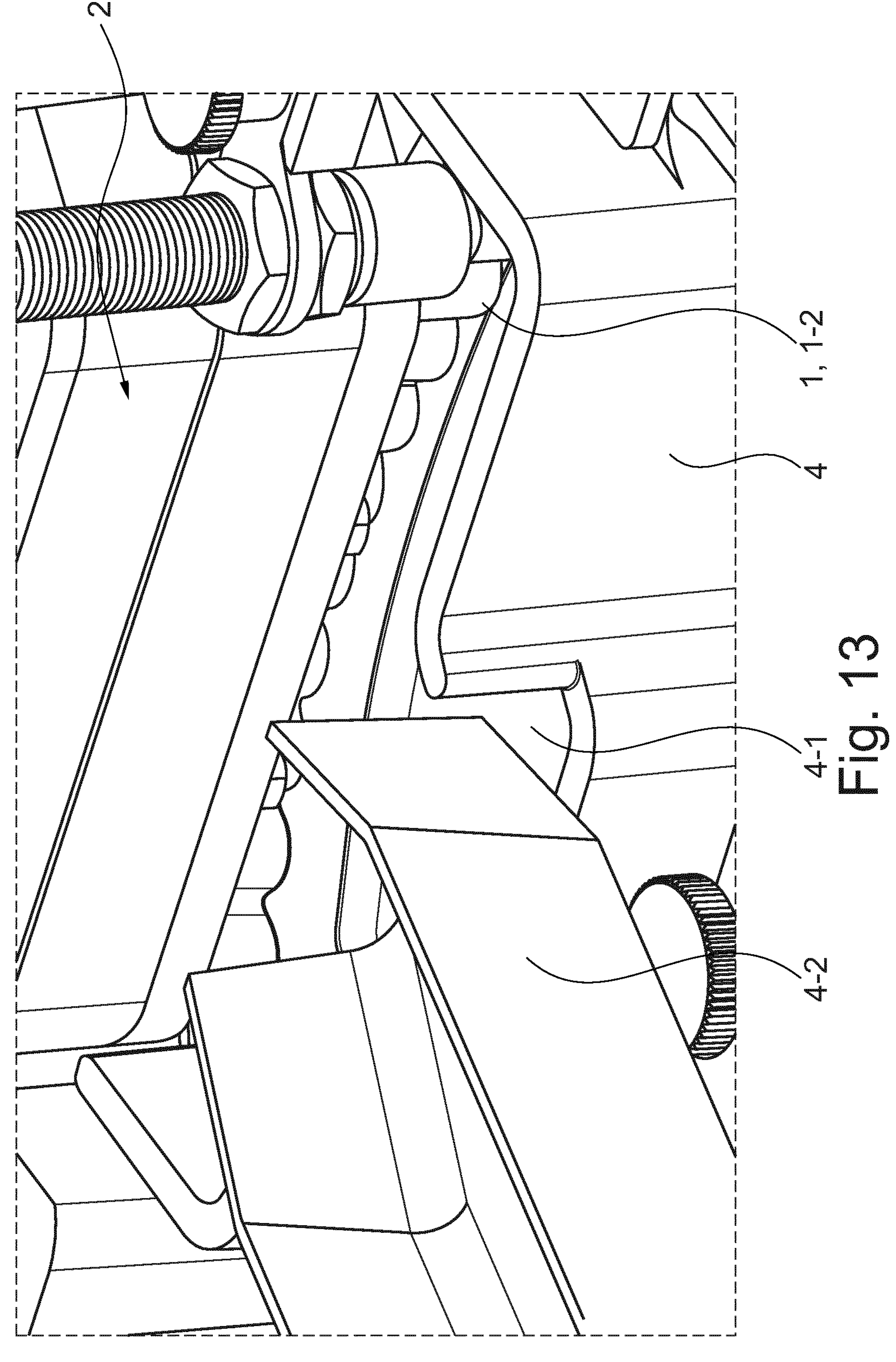
FIG. 13 shows a part of DOSAPP and a part of DOSDEV with DOSDEV being in the distanced position relative to the reservoir.

FIG. 12 shows the correspondence of DOSDEV (2) with TRANSDEV (3), that is their cooperation and interrelation, it is manifest in that the openings at the lower end of the 9 inner tube shape extensions, that is the opening (1-9) of the 9 dosing chambers (1-4), of DOSDEV (2) correspond with and to the receiving openings (3-1) on TRANSDEV (3). The shape of the openings (1-9) of the dosing chamber (1-4) correspond to the shape of the receiving openings (3-1). DOSDEV (2) is positioned above TRANSDEV (3) in such a way that the openings (1-9) of each of the 9 dosing chamber (1-4) are in vertical alignment with a respective receiving opening (3-1) in TRANSDEV (3), this position of DOSDEV (2) is also called a position of vertical alignment of DOSDEV (2) and TRANSDEV (3). The correspondence of said openings in the two devices means that any solid particulate material (4-1) which is discharged from an opening (1-9) of the dosing chamber (1-4), when DOSDEV (2) is in vertically alignment with TRANSDEV (3), is charged into, for example enters or falls into the corresponding receiving opening (3-1) of TRANSDEV (3).

The correspondence of said two openings in the two devices is realized by a correspondence of the sizes and/or shapes of the two openings.

The centers of the openings (1-9) of the dosing chambers (1-4) of DOSDEV (2) are vertically aligned with the respective centers of the receiving openings (3-1) of TRANSDEV (3) when DOSDEV (2) is in vertical alignment with TRANSDEV (3).

Each receiving opening (3-1) of TRANSDEV (3) has the shape of a slot.

The width of the receiving opening (3-1) corresponds to the diameter of the opening (1-9) of the dosing chamber (1-4); the width of the receiving opening (3-1) is 10.7 mm.

When solid particulate material (4-1) is discharged from DOSDEV (2) via TRANSDEV (3) into a receptacle, then DOSDEV (2) is in vertical alignment with TRANSDEV (3) and TRANSDEV (3), that is the discharging opening (3-5) of TRANSDEV (3) is in vertical alignment with the opening of a receptacle.

The Figures do not show a receptacle.

This means that when discharging solid particulate material (4-1) from DOSDEV (2) via TRANSDEV (3) into a receptacle, then the opening (1-9) of the dosing chamber (1-4) of DOSDEV (2) is in vertical alignment with a receiving opening (3-1) in TRANSDEV (3) and the discharging opening (3-5) of TRANSDEV (3), which is connected via the channel with said receiving opening (3-1), is in vertical alignment with the opening of the receptacle. Thereby solid particulate material (4-1) is discharged from the dosing chamber (1-4) of DOSDEV (2) into the receiving opening (3-1) of TRANSDEV (3), then the solid particulate material (4-1) passes through the channel to the discharging opening (3-5) of TRANSDEV (3) and is discharged from TRANSDEV (3) into the opening of the receptacle.

This vertical alignment of DOSDEV (2), TRANSDEV (3) and the receptacle provides for a minimized loss or even no loss of solid particulate material (4-1) during the dosing operation.

The diameter of the discharging opening (3-5) is smaller than the diameter of the opening of the receptacle into which the solid particulate material (4-1) shall be dosed.

The channel comprises two sections, an upper channel (3-13) and a lower channel;

- the upper end of the upper channel (3-13) is the receiving opening (3-1);
- the lower end of the lower channel is the discharging opening (3-5).

So the upper channel (3-13) and the lower channel is a pair that forms the channel.

Tupper channel (3-13) is a straight channel with a direction in TRANSDEV (3) with an angle against the vertical direction of 45° and thereby forms a SLIDE (3-2), SLIDE (3-2);

The lower channel is a straight channel with a vertical direction in TRANSDEV (3).

The lower channel is a part that is separable from any other part of TRANSDEV (3) and is a tube shaped part, also called lower tube (3-3) herein.

The body (3-12) of TRANSDEV (3) has a vertical bore (3-6) that extends from the bottom of the body (3-12) of TRANSDEV (3) upwards into the body (3-12) of TRANSDEV (3) and which corresponds to the lower tube (3-3).

TRANSDEV (3) comprises at least three parts, the body (3-12) of TRANSDEV (3), a base plate (3-4) and the lower tube (3-3), which are separable from each other and from any other part of TRANSDEV (3);

- the body (3-12) of TRANSDEV (3) contains the vertical bore (3-6) and the upper channel (3-13);
- the lower tube (3-3) can be fastened to the body (3-12) of TRANSDEV (3) in the vertical bore (3-6) by the base plate (3-4), the base plate (3-4) is fastened to the bottom of the body (3-12) of TRANSDEV (3);
  - the base plate (3-4) has a circular opening (3-7) with a diameter corresponding to the outer diameter of the lower tube (3-3) so that the lower tube (3-3) can be fixed to TRANSDEV (3) in the vertical bore (3-6).

FIG. 10 and FIG. 12 show also the following details:

The lower tube (3-3) has on its outer surface an axial section in the shape of a ring shaped protrusion (3-9), the axial protrusion extends circumferentially around the outer surface of the lower tube (3-3) with an axial extension in the axial direction of the lower tube (3-3) which is smaller then the length of the lower tube (3-3), and the ring shaped protrusion (3-9) is located axially on the lower tube (3-3) with a distance from the upper end and with another distance from the lower end (3-11) of the lower tube (3-3);

- thereby the lower tube (3-3) has at least three axial sections, an upper section (3-8), a middle section (3-9) which is the ring shaped protrusion (3-9), and a lower section (3-10), with the outer diameters of the upper (3-8) and lower sections (3-10) being smaller than the outer diameter of the ring shaped protrusion (3-9);
- the vertical bore (3-6) starts at the bottom of the body (3-12) of TRANSDEV (3) with a circular recess (3-14) having an inner diameter that is equal to the outer diameter of the ring shaped protrusion (3-9) of the lower tube (3-3), and having a vertical height that is very slightly smaller than the length of the axial extension of the ring shaped protrusion (3-9), this circular recess (3-14) can be called the first section (3-14) of the vertical bore (3-6);
- from the circular recess (3-14), that is from the first section (3-14) of the vertical bore (3-6), the vertical bore (3-6) continues with a second section (3-15) of the vertical bore (3-6) upwards with an inner diameter which corresponds to the outer diameter of the upper section (3-7) of the lower tube (3-3), and with a length that corresponds to the length of the upper section (3-7) of the lower tube (3-3);
- the diameter of the circular opening (3-7) in the base plate (3-4) is equal to the outer diameter of the lower section (3-10) of the lower tube (3-3).

The outer diameters of the upper section (3-7) and of the lower section (3-10) of the lower tube (3-3) are equal.

Thereby the lower tube (3-3) fits into the vertical bore (3-6) with the ring shaped protrusion (3-9) fitting into the circular recess (3-14) and with the ring shaped protrusion (3-9) abutting with the upper end of the circular recess (3-14); the lower section (3-10) of the lower tube (3-3) extends into or even through the base plate (3-4), and the upper section (3-7) of the lower tube (3-3) extends into the vertical bore (3-6) above the circular recess (3-14), that is into the second section (3-15) of the vertical bore (3-6), and the lower end of the ring shaped protrusion (3-9) protrudes slightly from the rim of the beginning of the vertical bore (3-6) at the bottom of the body (3-12) of TRANSDEV (3), thereby the base plate (3-4) of TRANSDEV (3) snuggly fixes the lower tube (3-3) in the vertical bore (3-6) in TRANSDEV (3).

The thickness of the base plate (3-4) is equal to the length of the lower section (3-10) of the lower tube (3-3).

From the circular recess (3-14), that is from the first section (3-14) of the vertical bore (3-6), the vertical bore (3-6) continues with the second section (3-15) of the vertical bore (3-6) upwards which has an inner diameter which is equal to the outer diameter of the upper section (3-7) of the lower tube (3-3), and with a length that is equal to the length of the upper section (3-7) of the lower tube (3-3).

The vertical bore (3-6) continues with the third section (3-16) of the vertical bore (3-6) upwards from the position of the upper end of the upper section (3-7) of the lower tube (3-3), when the lower tube (3-3) is inserted in the vertical bore (3-6), but with a diameter that is smaller than the inner diameter of the rim (3-20) of the end of the upper section (3-7) of the lower tube (3-3).

So the vertical bore (3-6) can be described as comprising three sections, the lowest and first section (3-14) of the vertical bore (3-6) is the circular recess (3-14) of the vertical bore (3-6), upwards from the first section (3-14) of the vertical bore (3-6) the second section (3-15) of the vertical bore (3-6) continues which is the section of the vertical bore (3-6) wherein the upper section (3-7) of the lower tube (3-3) is positioned, from the second section (3-15) of the vertical bore (3-6) the third section (3-16) of the vertical bore (3-6) continues upwards, which is the section of the vertical bore (3-6) with a diameter which is smaller than the diameter of the second section (3-15) of the vertical bore (3-6).

The lower opening of the upper channel (3-13) opens into the vertical bore (3-6) above the upper end of the upper section (3-7) of the lower tube (3-3) when the lower tube (3-3) is inserted into the vertical bore (3-6), that is it opens into the third section (3-16) of the vertical bore.

The width of the lower opening of the upper channel (3-13) corresponds to the diameter of the third section (3-16) of the vertical bore (3-6); the width of the lower end or lower opening of the upper channel (3-13) is equal to than the diameter of the third section (3-16) of the vertical bore (3-6).

The outer diameter of the upper section (3-7) of the lower tube (3-3) is 8 mm; the outer diameter of the middle section (3-9) of the lower tube (3-3) is 9.8 mm, with the outer diameter of the upper section (3-7) and of the lower section (3-10) of the lower tube (3-3) being equal.

The thickness of the base plate (3-4) is 3 mm.

The body (3-12) of TRANSDEV (3) has described has having two regions, an upper region (3-17) of TRANSDEV (3) containing the upper channel (3-13) and a lower region (3-18) of TRANSDEV (3) containing the lower channel or lower tube (3-3). The body (3-12) of TRANSDEV (3) is realized with one part containing the upper channel in the upper region (3-17) of the body and the lower tube (3-3) in the lower region (3-18) of the body.

The inner diameter of the lower end (3-11) of the lower tube (3-3) is the diameter of the discharging opening (3-5).

The diameter of the discharging opening (3-5) are 3.5, 4, 4.5 or 5.5 mm.

The inner diameter of the lower section (3-10) of the lower tube (3-3) is equal to the diameter of the discharging opening (3-5).

TRANSDEV (3) is a kit of parts comprising the base plate (3-4), the body (3-12) of TRANSDEV (3) with the channel comprising the vertical bore (3-6), the upper channel (3-13) and a set of lower tubes (3-3), SOLT, for the vertical bore (3-6), wherein in SOLT the diameter of the discharging opening (3-5) of anyone of the lower tubes (3-3) contained in SOLT is different from the diameter of the discharging opening (3-5) of any other of the lower tubes (3-3) contained in SOLT;

with each lower tube (3-3) in the SOLT fitting into the vertical bore (3-6);

with the lower tubes (3-3) in the SOLT and the base plate (3-4) being parts which are separable from each other and from any other part of TRANSDEV (3);

then the number of lower tubes (3-3) in the SOLT is 4 and the four different diameters of the discharging opening (3-5) of the four tubes in the SOLT are 3.5, 4, 4.5 and 5.5 mm.

SOLT is not shown in the Figures.

Figure 19:
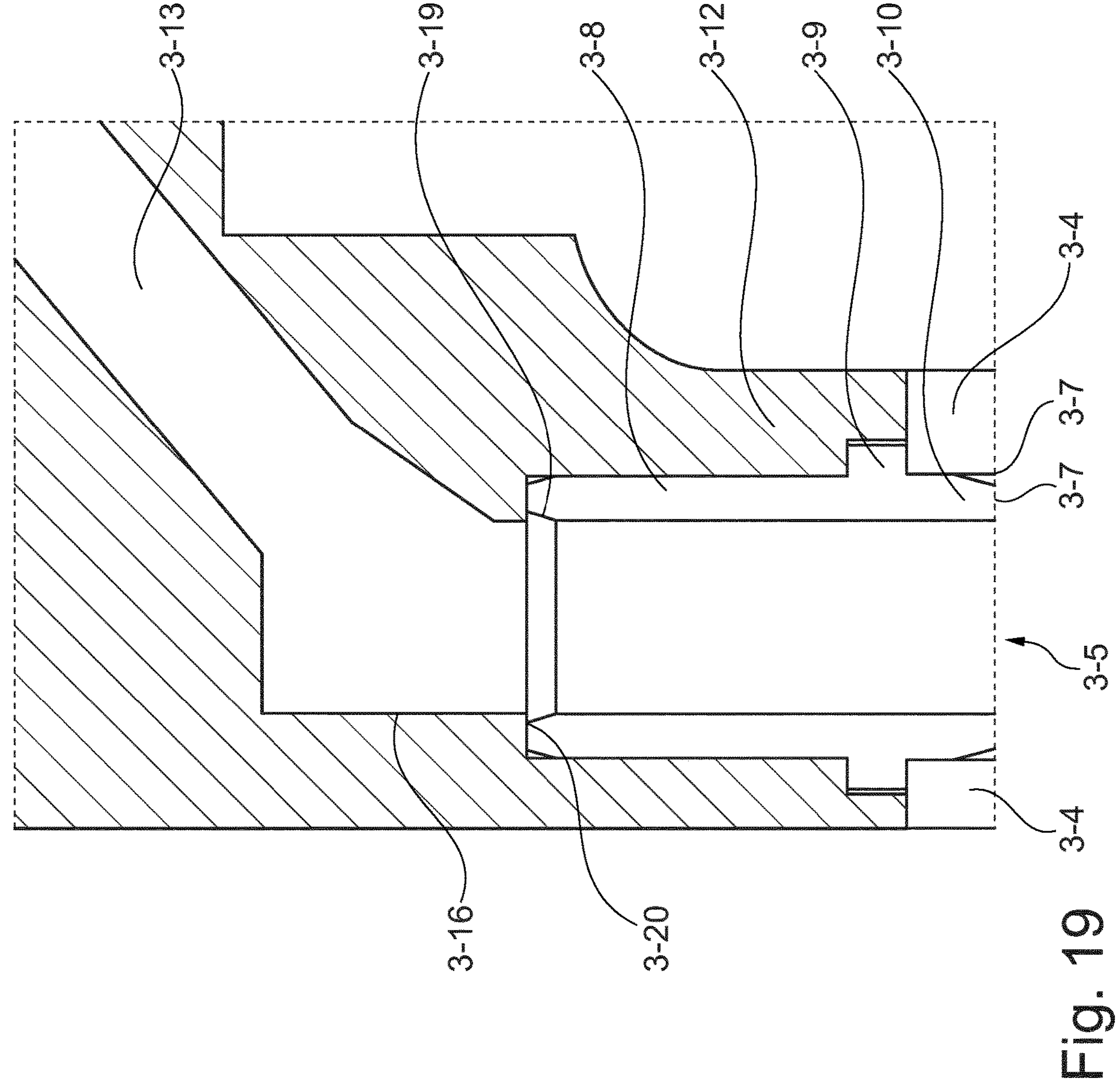
FIG. 19 shows details of the transition from the upper channel via the third section of the vertical bore to the upper section of the lower tube in TRANSDEV.

FIG. 19 shows details of the transition from the upper channel via the third section of the vertical bore to the upper section of the lower tube in TRANSDEV:

The lower tube (3-3) is a part which is separable from any other part of TRANSDEV (3), and then the upper section (3-7) of the lower tube (3-3) has and ends with at its upper end on the inside with a circumferential chamfer (3-19), the chamfer (3-19) of the upper end of the lower tube (3-3), which enlarges the inner diameter of the lower tube (3-3) in axial direction towards and until the rim (3-20) of the end of the upper section (3-7) of the lower tube (3-3), thereby the inner diameter of the rim (3-20), IDR, of the end of the upper section (3-7) of the lower tube (3-3), is larger than the inner diameter of the lower tube (3-3) in axial direction downwards before the start of the chamfer (3-19).

This IDR larger than the inner diameter of the third section (3-16) of the vertical bore (3-6) that continues upwards from the position of the upper end of the upper section (3-7) of the lower tube (3-3), when the lower tube (3-3) is inserted in the vertical bore (3-6).

All the rims (3-20) of the upper ends of the upper sections (3-7) of each lower tube (3-3) in the SOLT have the same IDR;

the upper section (3-7) of any lower tube (3-3) in the SOLT has the same outer diameter as the upper section (3-7) of any other lower tube (3-3) in the SOLT; the different diameters of the discharging openings (3-5) of the lower tubes (3-3) in the SOLT are realized by respective different wall thicknesses, that is by respective different inner diameters of the lower section (3-10) of the lower tubes (3-3) in the SOLT;

thereby all lower tubes (3-3) in a SOLT fit into the respective vertical bore (3-6).

TRANSDEV (3) comprise 9 channels as shown in FIG. 10 and FIG. 12.

The vertical positions of the receiving openings (3-1) with respect to their vertical position in TRANSDEV (3) are the same for all receiving opening (3-1), so all the receiving openings (3-1) are vertically aligned with each other with respect to their vertical position in TRANSDEV (3);

that means that all the upper ends of the upper channels (3-13) of TRANSDEV (3), that is all the upper rims of the upper channels (3-13), are horizontally aligned with each other with respect to their vertical position in TRANSDEV (3).

All channels are identical.

TRANSDEV (3) comprises each channel in form of the vertical bore (3-6), the upper channel (3-13) and the lower tube (3-3); the vertical bore (3-6), the upper channel (3-13) and the lower tube (3-3) in each channel are identical for all channels.

The upper channel (3-13) and the lower channel of a channel form a pair, also the receiving opening (3-1) and the discharging opening (3-5) which are connected by a channel form a pair.

TRANSDEV (3) comprises the same number of channels, that is the same number of pairs of receiving opening (3-1) and discharging opening (3-5) as the number of dosing elements (1) in DOSDEV (2);

so in other words TRANSDEV (3) comprises the same number of pairs of upper channel (3-13) and lower channel as the number of dosing elements (1) in DOSDEV (2);

wherein the vertical positions of the receiving openings (3-1) of each channel with respect to their vertical position in TRANSDEV (3) are the same for all receiving opening (3-1), so all the receiving openings (3-1) are vertically aligned with each other with respect to their vertical position in TRANSDEV (3);

the horizontal positions of the receiving openings (3-1) in TRANSDEV (3) corresponds to the horizontal positions of the openings (1-9) of the dosing chambers (1-4) in DOSDEV (2), so that each opening (1-9) of a dosing chamber (1-4) in DOSDEV (2) has one corresponding receiving opening (3-1) in TRANSDEV (3) forming a corresponding pair; and DOSDEV (2) can be positioned above TRANSDEV (3) in such a way that each opening (1-9) of a dosing chamber (1-4) is in horizontal and vertical alignment with the corresponding receiving opening (3-1) in TRANSDEV (3);

the center of each opening (1-9) of a dosing chamber (1-4) is in vertical alignment with the center of the corresponding receiving opening (3-1) in TRANSDEV (3).

FIG. 12 shows DOSDEV vertically aligned above TRANSDEV.

TRANSDEV (3) comprises the base plate (3-4), the body (3-12) of TRANSDEV (3) with the same number of channels as the number of dosing elements (1) in DOSDEV (2), each channel comprising a respective vertical bore (3-6), an upper channel (3-13) and a lower tube (3-3) for the vertical bore (3-6);

with all lower tubes (3-3) and the base plate (3-4) being parts which are separable from each other and from the body (3-12) of TRANSDEV (3), with the base plate (3-4) having one bore for each channel;

with all channels being identical to each other;

TRANSDEV (3) is a kit of parts comprising one SOLT for each channel, with all SOLTs being identical to each other.

Figure 11:
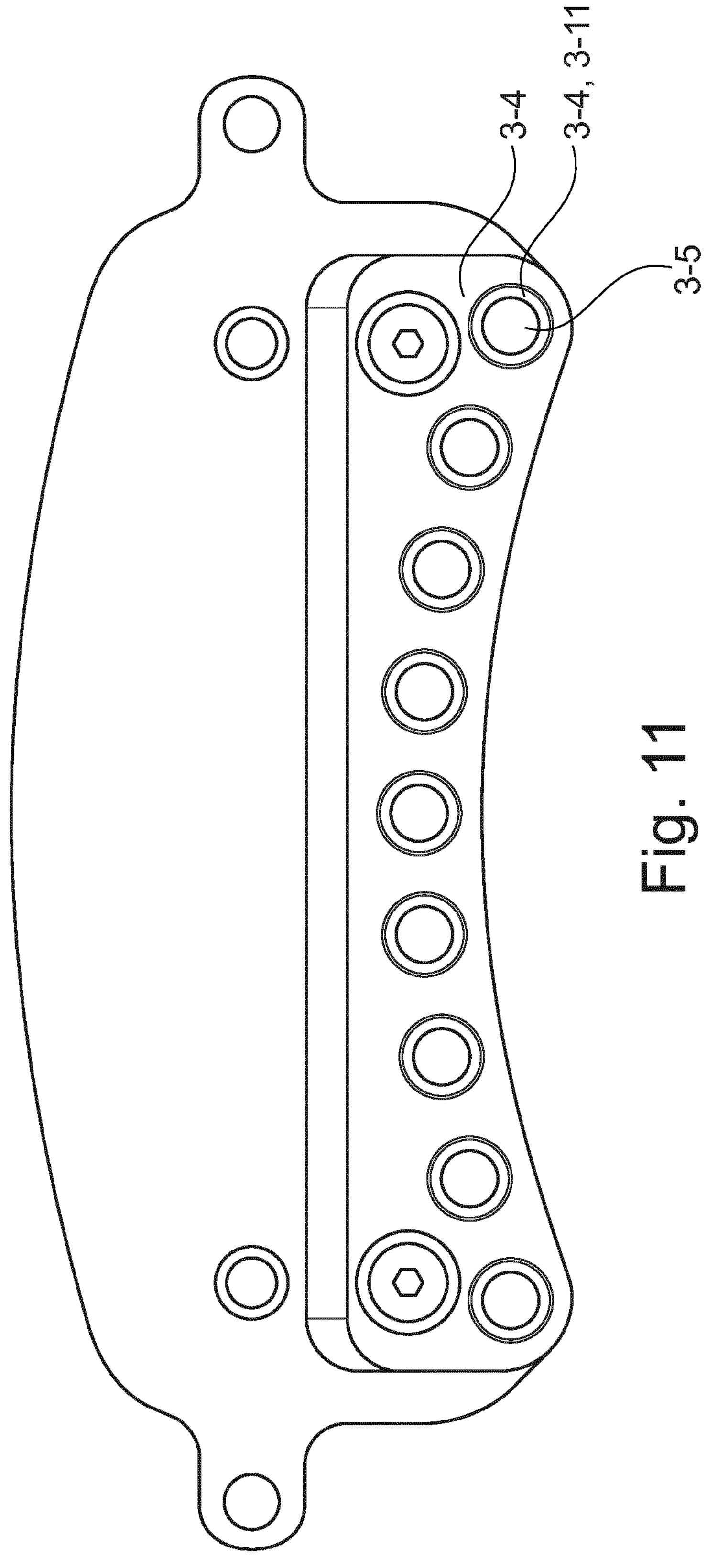
FIG. 11: shows a bottom view of TRANSDEV with 9 discharging openings.

FIG. 11 shows a bottom view of TRANSDEV with 9 discharging openings.

Figure 14:
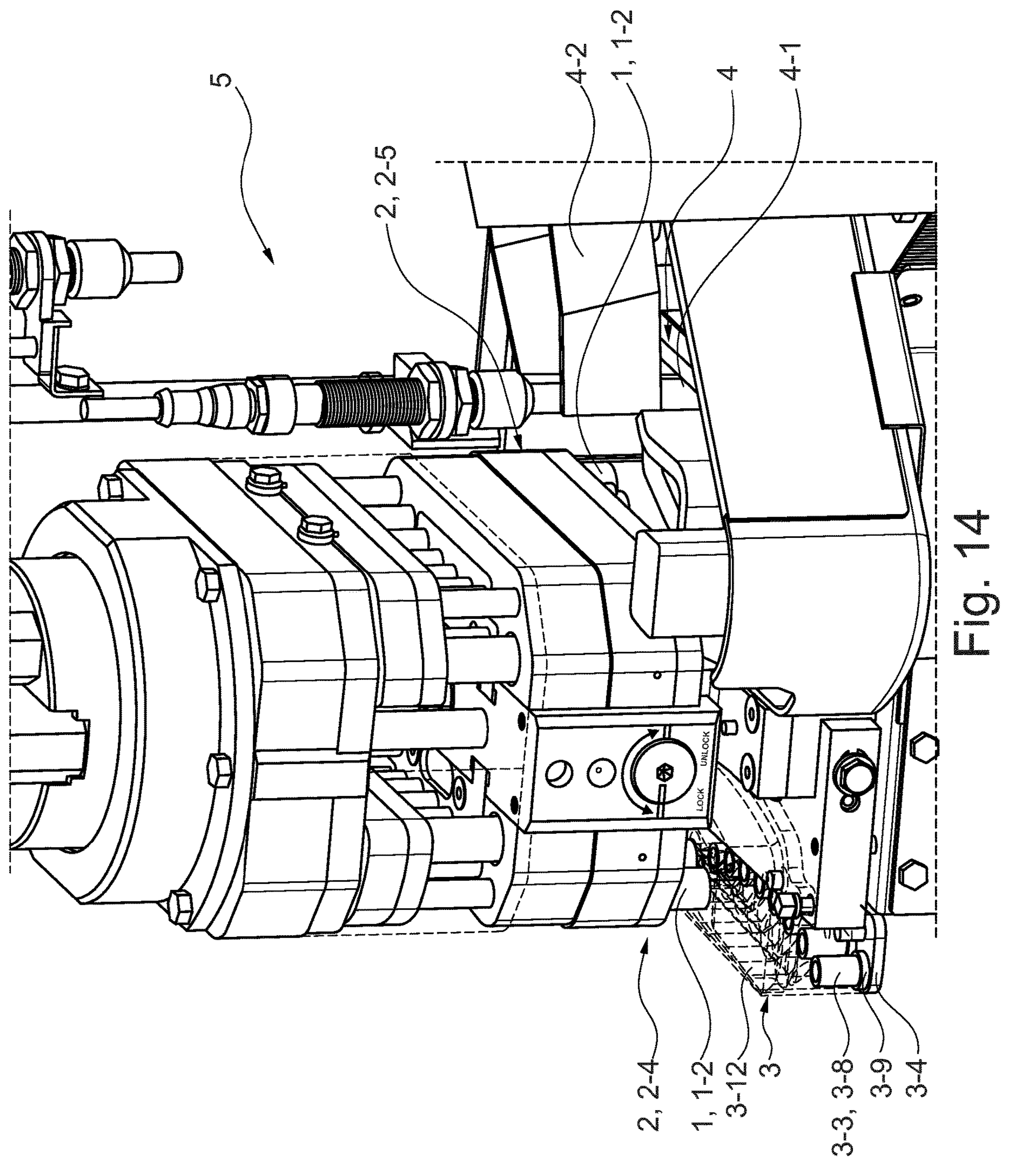
FIG. 14 shows a part of DOSAPP containing two DOSDEVs and one TRANSDEV; the one of the two DOSDEVs is in the distanced position relative to the reservoir while the other DOSDEV is in the release position above TRANSDEV.

FIG. 14 shows the dosing apparatus, DOSAPP (5), comprising 2 DOSDEV (2);

what is not shown in FIG. 14 is that the DOSAPP (5) is connected to a gas supply and to a vacuum source;

the SPACE (1-3) is in fluid connection with the gas supply;

the dosing chamber (1-4) is in fluid connection with the vacuum source.

The vacuum source is not shown in the Figures

DOSAPP (5) interacts with a reservoir (4) for containing solid particulate material (4-1), and a receptacle retaining unit for retaining a receptacle, which is not shown in FIG. 14.

DOSAPP (5) has two positions for DOSDEV (2), a position of DOSDEV (2) above the reservoir (4), and a release position (2-4) of DOSDEV (2) above the receptacle retaining unit for releasing the collected dose of the solid particulate material (4-1) from the dosing chamber (1-4) into a receptacle retained in the receptacle retaining unit.

DOSAPP (5) can displace DOSDEV (2) back and forth between the position above the reservoir (4) and the release position (2-4).

Preferably, when DOSDEV (2) is in the position above the reservoir (4), then DOSAPP (5) can displace DOSDEV (2) and the reservoir (4) relative to each other back and forth between two vertical positions, a collecting position (2-6) and a distanced position (2-5);

in the collecting position (2-6) the lower end of the dosing chamber (1-4), that is the opening (1-9) of the dosing chamber (1-4), is immersed in the solid particulate material (4-1) when solid particulate material (4-1) is contained in the reservoir (4); the collecting position (2-6) is the position wherein DOSDEV (2) is located vertically closer to the reservoir (4), that is closer than in the distanced position (2-5), for collecting a predetermined dose of solid particulate material (4-1) from the reservoir (4) into the dosing chamber (1-4) of DOSDEV (2);

in the distanced position (2-5) the lower end of the dosing chamber (1-4), that is the opening (1-9) of the dosing chamber (1-4), is outside and above the solid particulate material (4-1), the distanced position (2-5) is the position wherein DOSDEV (2) is located vertically at a greater distance to the reservoir (4) than in the collecting position (2-6).

DOSAPP (5) also comprises TRANSDEV (3);

in the release position (2-4) DOSDEV (2) is located above TRANSDEV (3) and the opening (1-9) of the dosing chamber (1-4) of DOSDEV (2) is in vertical alignment with the receiving opening (3-1) of TRANSDEV (3);

TRANSDEV (3) is located above the receptacle retaining unit, which is not shown in FIG. 14, and the discharging opening (3-5) of TRANSDEV (3) is in vertical alignment with the opening of the receptacle.

FIG. 14 shows DOSAPP with the two DOSDEV and the TRANSDEV, one DOSDEV is in the release position above TRANSDEV, the other DOSDEV is above the reservoir.

Figure 15:
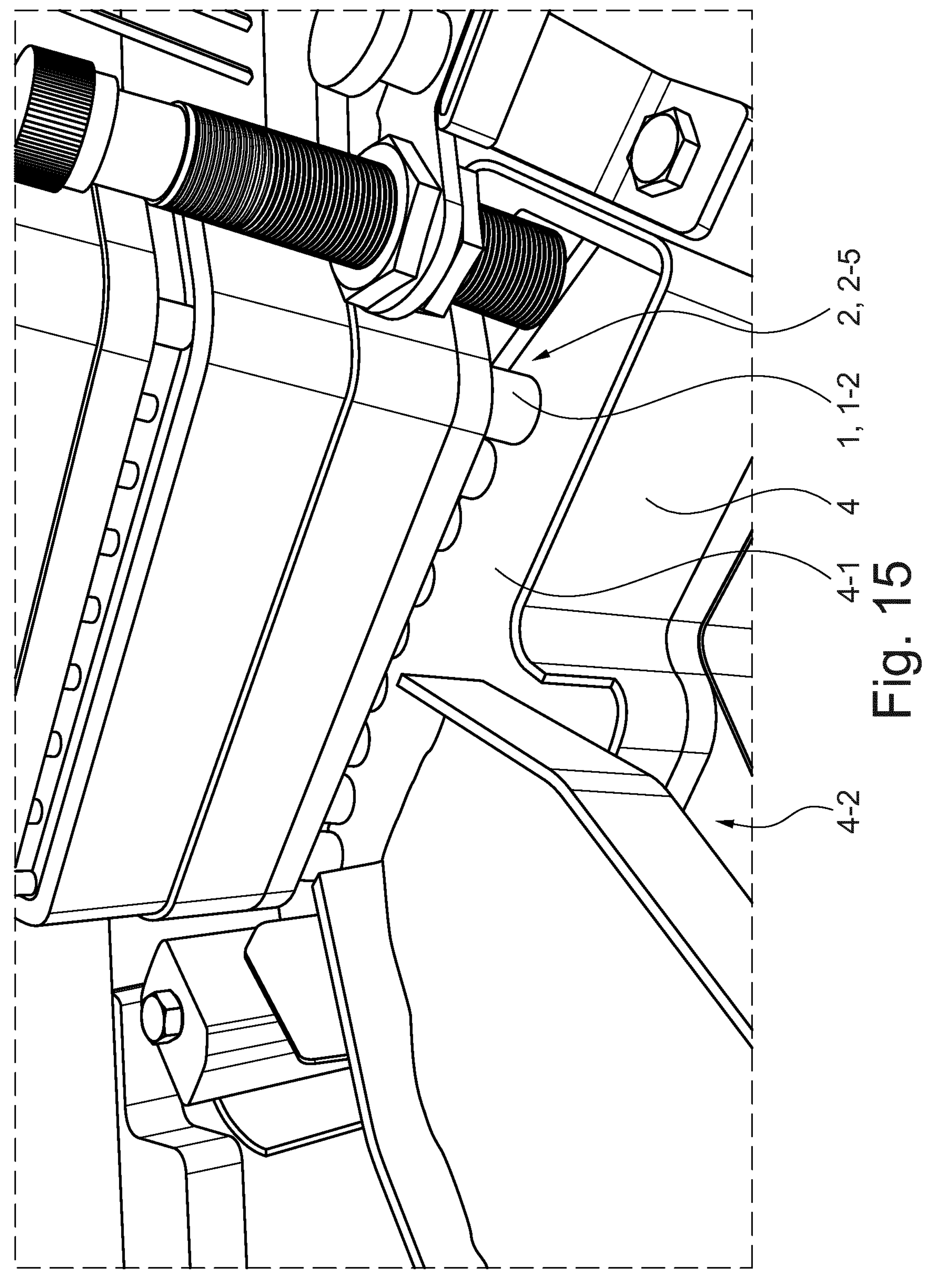
FIG. 15 shows a part of DOSAPP and a DOSDEV with 9 dosing elements, with DOSDEV being in the distanced position relative to the reservoir.
Figure 16:
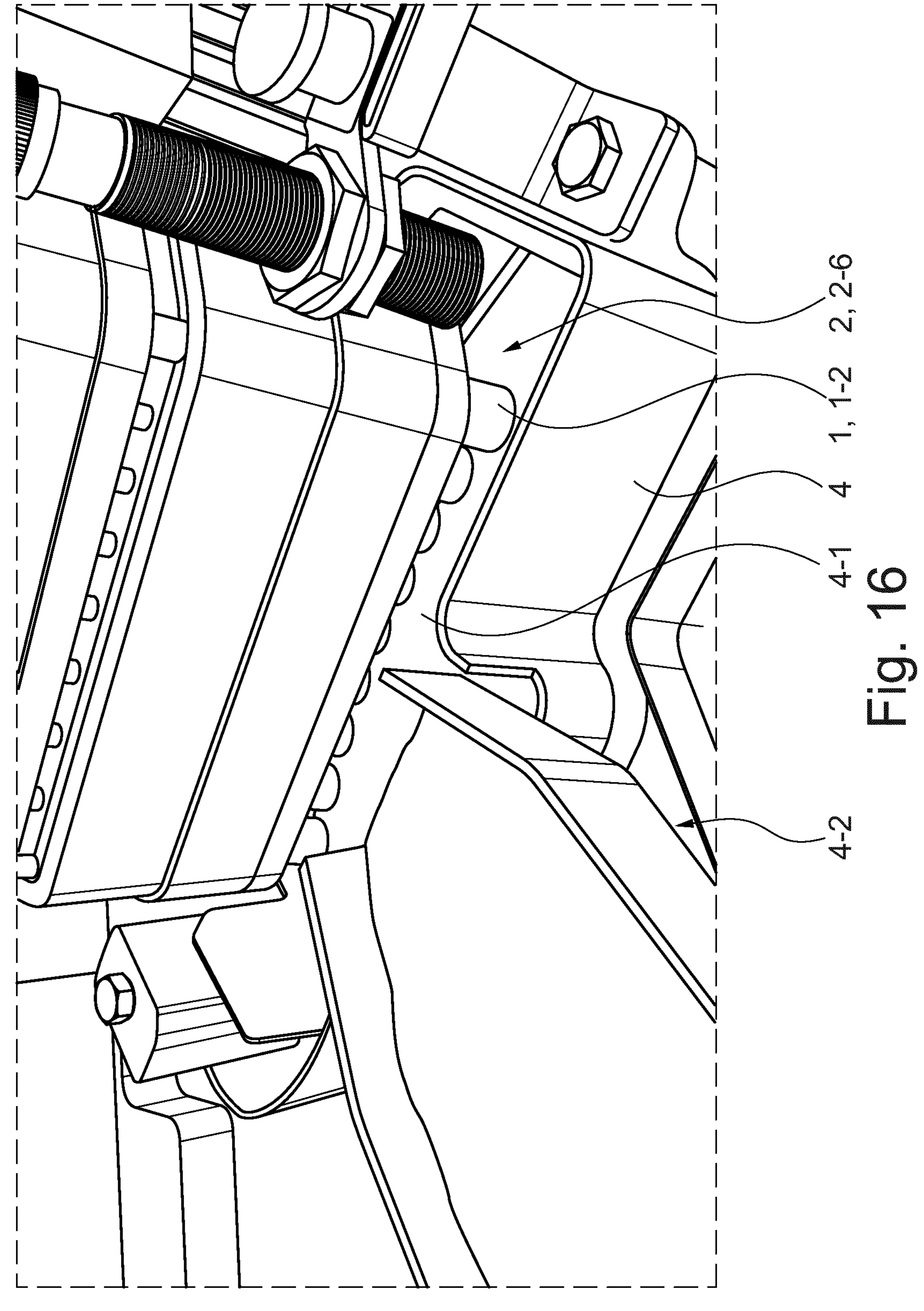
FIG. 16 shows a part of DOSAPP and a DOSDEV with 9 dosing elements, with DOSDEV and the reservoir being in the collecting position relative to each other with the lower ends of the dosing elements immersed into the solid particulate material.
Figure 17:
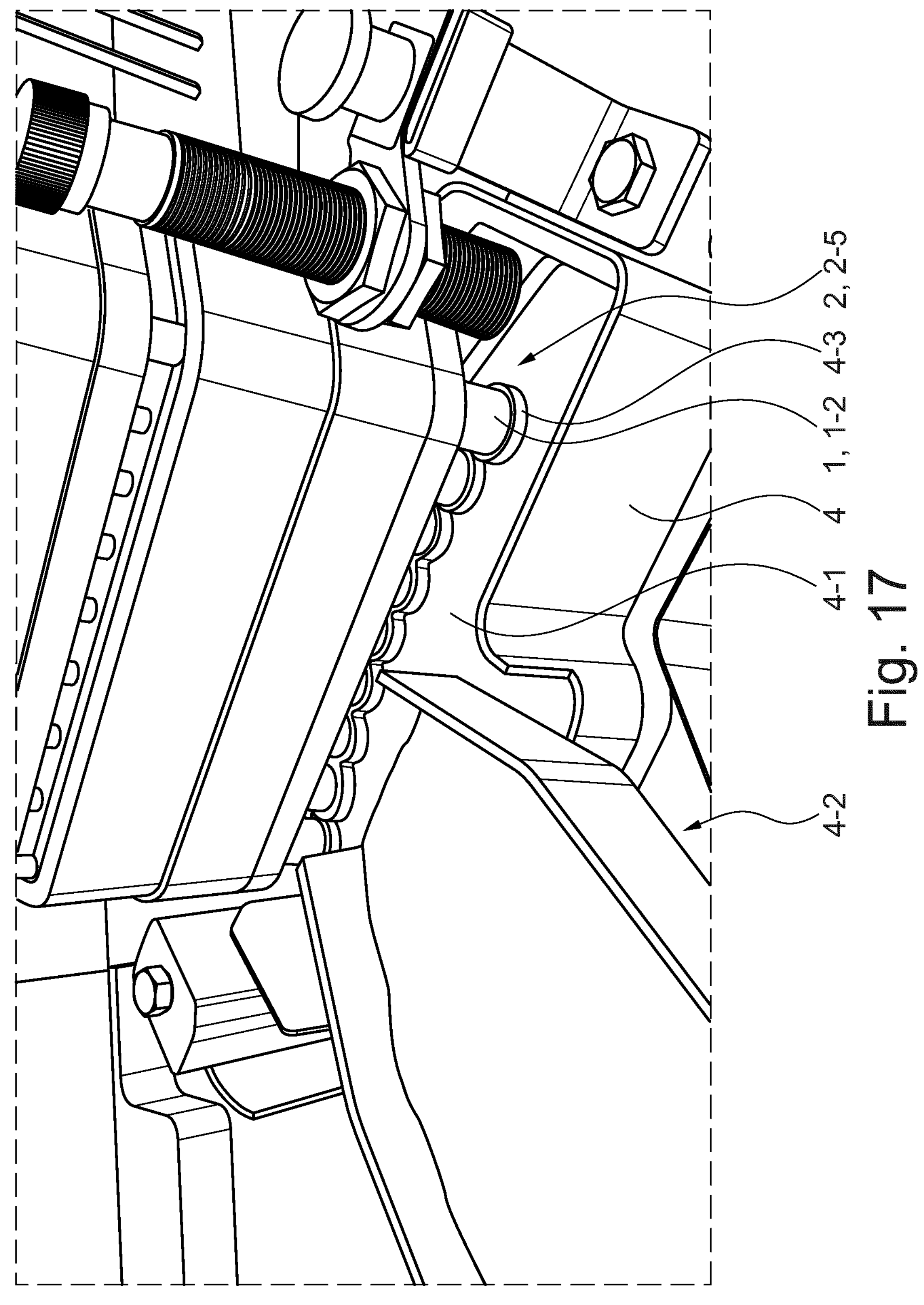
FIG. 17 shows a part of DOSAPP and a DOSDEV with 9 dosing elements, with DOSDEV being in the distanced position relative to the reservoir with excess solid particulate material sticking to the outside of the lower end of the dosing elements.

FIG. 15, FIG. 16 and FIG. 17 show a DOSDEV in the position above the reservoir, whereas in FIG. 18 DOSAPP has displaced the DOSDEV by a certain angle from the position above the reservoir towards the release position.

FIGS. 15 and 17 shows DOSDEV in the distanced position; FIG. 16 shows DOSDEV in the collecting position.

In the release position (2-4) the collected dose of the solid particulate material (4-1) is released from the dosing chamber (1-4) into the receiving opening (3-1) of TRANSDEV (3) and from TRANSDEV (3), that is from the discharging opening (3-5) of TRANSDEV (3), the solid particulate material (4-1) is released into the receptacle.

The vertical displacement of DOSDEV (2) and the reservoir (4) with respect to each other is done by DOSAPP (5), DOSAPP (5) can displace DOSDEV (2) or the reservoir (4) or both back and forth between the collecting position (2-6) and the distanced position (2-5).

One of the two DOSDEVs (2) is positioned at the position above the reservoir (4) when the other of the two DOSDEVs (2) is positioned in the release position (2-4); and DOSAPP (5) exchanges simultaneously the two DOSDEVs (2) between these two positions.

Thereby the DOSDEV (2) in the position above the reservoir (4) can collect a dose of solid particulates materials from the reservoir (4) into the dosing chamber (1-4) while in the meantime the other DOSDEV (2) can release its collected dose of solid particulate material (4-1) from its dosing chamber (1-4) into TRANSDEV (3); this can take place alternatingly with each exchange by DOSAPP (5) of the two DOSDEVs (2) between the two positions.

The reservoir (4) further interacts with a feed container for feeding or charging solid particulate material (4-1) into the reservoir (4), this is realized via a slide (4-2).

FIG. 15, FIG. 16 and FIG. 17 show the slide.

The receptacle retaining unit of DOSAPP (5) has at least 9 receptacles as the number of dosing element (1) in DOSDEV (2);

in the release position (2-4) each opening (1-9) of the dosing chamber (1-4) of DOSDEV (2) is in vertical alignment with the respective receiving opening (3-1) of TRANSDEV (3), and each discharging opening (3-5) of TRANSDEV (3) is in vertical alignment with the respective opening of a receptacle.

The receptacle retaining unit is not shown in the Figures.

The receptacle retaining unit is a rotary type having a rotary turret which holds at its circumference as receptacles the bodies of two piece hard capsules. The receptacles are aligned in a ring form around the rotary turret.

The spatial alignment, in particular the horizontal alignment of the dosing elements (1) and of the corresponding channels in TRANSDEV (3), and therewith also of the dosing elements (1) in DOSDEV (2), corresponds to the alignment of the receptacles in the receptacle retaining unit; the horizontal alignment of the channels in TRANSDEV (3) and of the dosing elements (1) in DOSDEV (2) corresponds to a part of the ring form of the rotary alignment of the receptacles in the receptacle retaining unit.

FIG. 2, FIG. 9, FIG. 11, FIG. 12 show that the dosing elements of DOSDEV and the channels of TRANSDEV are arranged in such a part of a ring form which corresponds to a rotary alignment of receptacles in a receptacle retaining unit.

The filling machine also allows for a circular movement of the receptacles in the receptacle retaining unit relative to the horizontal position of the discharging opening (3-5) of TRANSDEV (3). This horizontal movement is used to exchange under TRANSDEV (3) filled receptacles against empty receptacles for the next filling step.

Both the receptacle retaining unit and DOSAPP (5) are each a part of a filling machine, and the filling machine effects any movement, such as horizontal or vertical, of the receptacles in the receptacle retaining unit relative to the horizontal and vertical position of the discharging opening (3-5) of TRANSDEV (3).

The filling machine is not shown in the Figures.

In the method for dosing solid particulate material (4-1) from a reservoir (4) which contains the solid particulate material (4-1), into a receptacle with the dosing apparatus, DOSAPP (5); the reservoir (4) contains an amount of solid particulate material (4-1);

the receptacle retaining unit contains a multiplicity of 9 receptacles;

the method comprises the six steps step (A), step (B), step (C), step (D), step (E) and step (F), which are done consecutively in their alphabetical order, (A) displacing DOSDEV (2) and the reservoir (4) relative to each other from the distanced position (2-5) to the collecting position (2-6), thereby immersing the lower end of the dosing chamber (1-4) into the solid particulate material (4-1);

(B) applying a vacuum with a predetermined strength to the dosing chamber (1-4), thereby sucking a predetermined dose of solid particulate material (4-1) into the dosing chamber (1-4);

(C) displacing DOSDEV (2) and the reservoir (4) relative to each other from the collecting position (2-6) back to the distanced position (2-5);

(D) cutting off of any excess (4-3) solid particulate material (4-1) sticking to the outside of the lower end of the dosing element (1) of DOSDEV (2) with a gas jet blown out of the SLIT (1-8) of the dosing element (1) by pressing gas with a predetermined pressure for a predetermined time from the gas supply into the SPACE (1-3);

(E) displacing DOSDEV (2) from the distanced position (2-5) relative to the reservoir (4) to the release position (2-4);

(F) releasing the dose of solid particulate into the receptacle, with DOSDEV (2) being in the release position (2-4), by lowering the strength of the vacuum.

FIG. 15 shows a part of DOSAPP and a DOSDEV with 9 dosing elements, with DOSDEV being in the distanced position relative to the reservoir this is the situation right before step (A).

FIG. 16 shows a part of DOSAPP and a DOSDEV with 9 dosing elements, with DOSDEV and the reservoir being in the collecting position relative to each other with the lower ends of the dosing elements immersed into the solid particulate material, this is the situation in step (B).

FIG. 17 shows a part of DOSAPP and a DOSDEV with 9 dosing elements, with DOSDEV being in the distanced position relative to the reservoir with excess solid particulate material sticking to the outside of the lower end of the dosing elements, this is the situation after step (C) and before step (D).

FIG. 18 shows a part of DOSAPP and a DOSDEV with 9 dosing elements, with DOSDEV being on the way from the distanced position relative to the reservoir to the release position (not shown) which is located on the other side of DOSAPP opposite to the side where the position of above the reservoir is located; DOSAPP has turned DOSDEV for some degrees from the position above the reservoir around a vertical axis into the direction of the release position; no excess material is sticking to the outside of the lower end of the dosing elements, this is a situation in step (E).

After step (F) a seventh step, step (G), is done, in step (G) DOSDEV (2) is moved from the release position (2-4) back to the distanced position (2-5) relative to the reservoir (4).

The doses of each of the 9 dosing element (1) in DOSDEV (2) are filled simultaneously into the respective receptacles.

DOSAPP (5) carries out simultaneously the method for both DOSDEVs (2), but with the sequence of steps for each DOSDEV (2) shifted against the other one in such a way that step (E) for the one DOSDEV (2) is done simultaneously with step (G) for the other DOSDEV (2).

The predetermined pressure with which the gas is forced from the gas supply into the SPACE (1-3) is from 0.01 to 2 bar.

The predetermined time during which the gas is forced from the gas supply into the SPACE (1-3) is may be 0.04 sec.

The gas is air.

Once the vacuum has been applied in step (B) and the predefined dose of solid particulate material (4-1) has been sucked into the dosing chamber (1-4), the vacuum remains active until the release of the solid particulate material (4-1) in step (F).

The release of the solid particulate material (4-1) from the dosing chamber (1-4) in step (F) is triggered by removing the vacuum, that was applied to suck the solid particulate material (4-1) into the dosing chamber (1-4), thereby the dose of the solid particulate material (4-1) falls down from the dosing chamber (1-4) through TRANSDEV (3) into the receptacle.

The release of the solid particulate material (4-1) from the dosing chamber (1-4) in step (F) is effected by a step a):

a) removing the vacuum that was applied to suck the solid particulate material into the dosing chamber (1-4);

and after step a) a succession of a step b) and a step c) is done:

b) moving the radial wall (2-9) containing the filter element (2-8) from the vacuum position to the ejecting position, thereby pushing any solid particulate material (4-1), which has remained in the dosing chamber (1-4) after step a), out of the dosing chamber (1-4);

c) a gas blow is applied through the filter (2-8-1) into the dosing chamber (1-4);

All three steps a), b) and c) are done in their alphabetical order.

After step a), step b) and step c), the radial wall (2-9) containing the filter element (2-8) is in a step d) again moved back from the ejecting position into the vacuum position. Step d) is done before step (B).

Example with a Comparison of the Filling Performance of an Apparatus with an Gas Jet Blow According to the Instant Invention Against the Filling Performance of an Apparatus with a Scraper The performance of an apparatus as disclosed in U.S. Pat. No. 10,835,451 B2, which uses 9 scrapers for scraping the 9 dosing chambers after emersion from the solid particulate material in order to eliminate excess solid particulate material residue that may stick to the outer surface of the dosing chamber around or in the proximity of the aperture of the dosing chamber, was compared with the performance of a dosing apparatus according instant invention, wherein excess solid particulate material residue that may stick to the outer surface of the 9 dosing chambers around or in the proximity of the opening of the dosing chambers is eliminated by an gas jet blow as described herein.

In case of the dosing apparatus, DOSAPP (5), according to instant invention, which cuts off any excess (4-3) solid particulate material (4-1) sticking to the outside of the lower end of the dosing element (1) of DOSDEV (2) with a gas jet blown out of the SLIT (1-8) of the dosing element (1), DOSAPP (5) had 2 DOSDEVs (2) and one TRANSDEV (3), each DOSDEV (2) had 9 dosing elements (1); with DOSAPP (5), DOSDEV (2) and TRANSDEV (3) as described herein in the Detailed Description of Preferred Embodiments.

In case of the apparatus as disclosed in U.S. Pat. No. 10,835,451 B2, which used 9 scrapers (6-2) for scraping the 9 dosing chambers of its DOSDEV, where one of the 9 scrapers (6-2) is scraping the respective one of the 9 dosing chambers of its DOSDEV, after emersion from the solid particulate material (6-3) contained in a respective reservoir (6-1) in order to eliminate excess solid particulate material residue that may stick to the outer surface of the dosing chambers.

Figure 22:
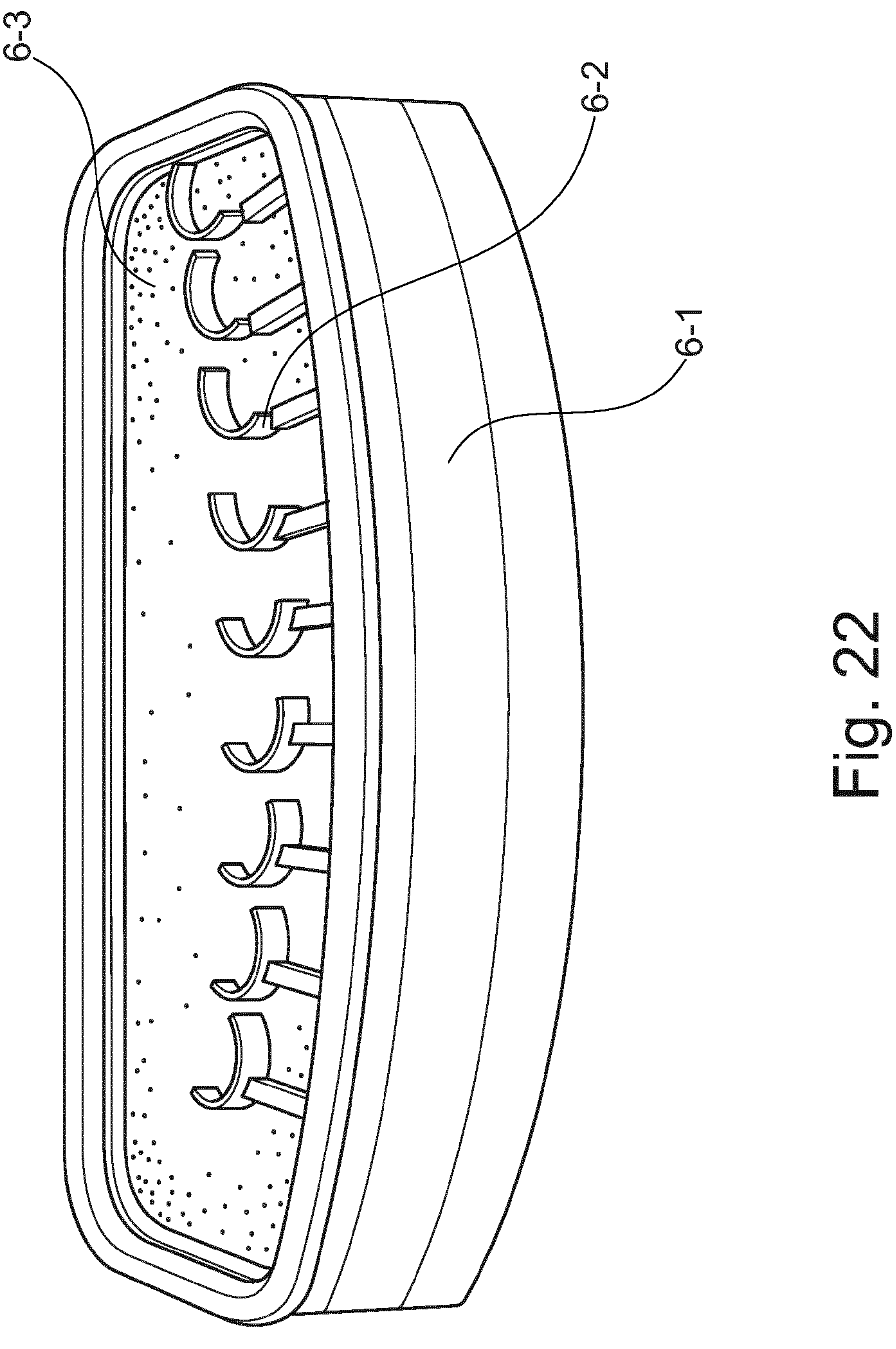
FIG. 22 shows the arrangement of the 9 scrapers over the reservoir in the apparatus as disclosed in U.S. Pat. No. 10,835,451 B2.

FIG. 22 shows the arrangement of the 9 scrapers (6-2) over the reservoir (6-1) in the apparatus as disclosed in U.S. Pat. No. 10,835,451 B2.

In both cases gelatin capsules of size 0 were filled with ca. 195 mg of microcrystalline cellulose microspheres, Celphere CP-203, obtained from Asahi KASEI, Japan, with bulk density 0.87 g/ml Particle Size Range 150 to 300 micrometer Sphericity 1.1.

Table 4 gives the results of these two filling operations:

TABLE 4

| | Scraper | Gas Jet |
|---|---|---|
| N | 500 | 2146 |
| mean [mg] | 194.6 | 196.4 |
| SD | 3.39 | 1.80 |
| min [mg] | 185.1 | 190.7 |
| max [mg] | 203.1 | 202.3 |

N number of capsules filled mean the mean value of the fill weights in mg

SD Standard Deviation of the fills min smallest fill weight in mg max largest fill weight in mg With a comparable mean fill weight, the standard deviation is noticeably larger in case of the use of scrapers than in case of the use of a gas jet blow, this means that the apparatus using a gas jet blow provides for more accurate and reproducible dosing.

Figure 20:
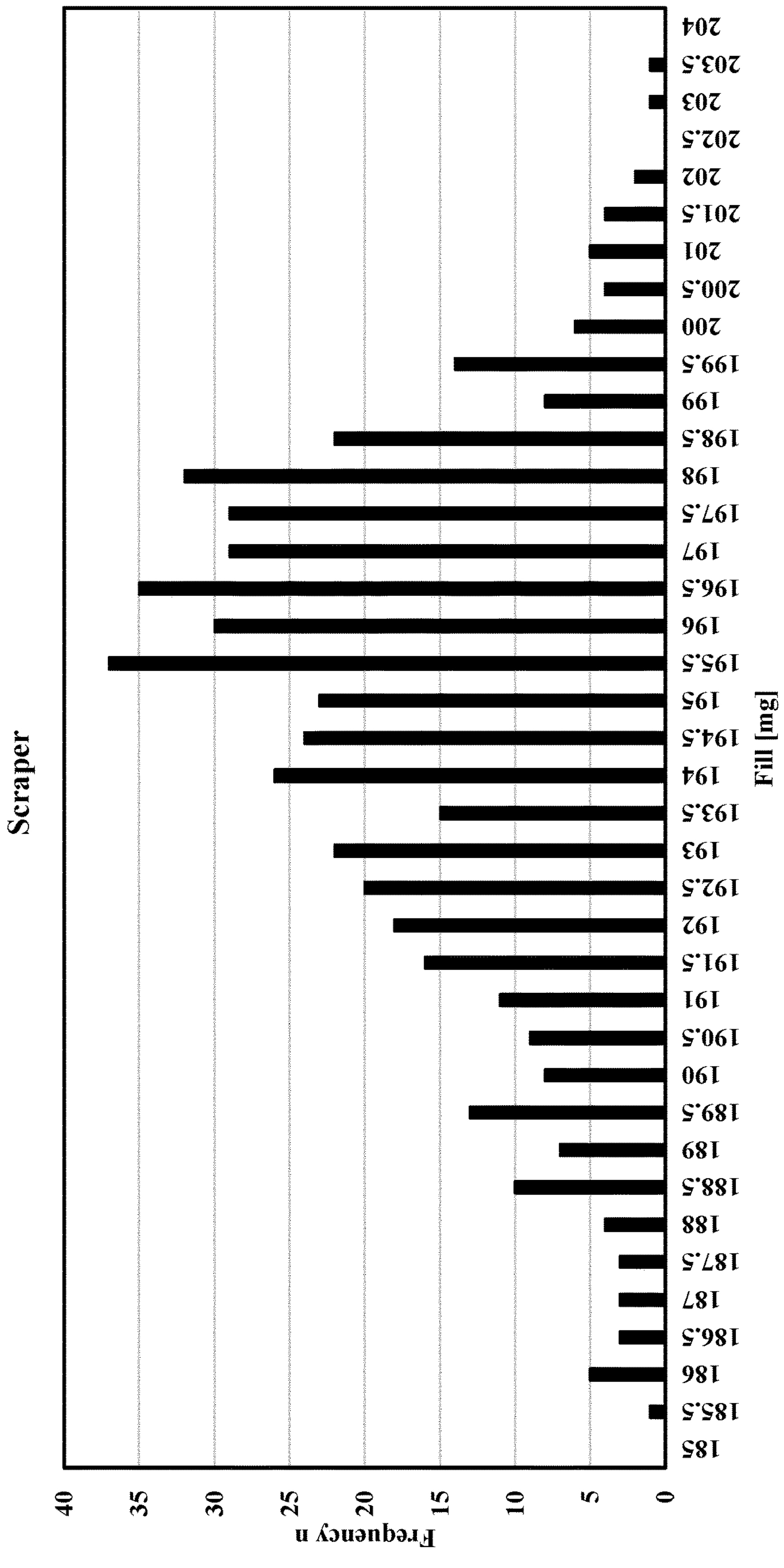
FIG. 20 shows the data of the filling with the apparatus of U.S. Pat. No. 10,835,451 B2 with the use of the 9 scrapers in graphical form.
Figure 21:
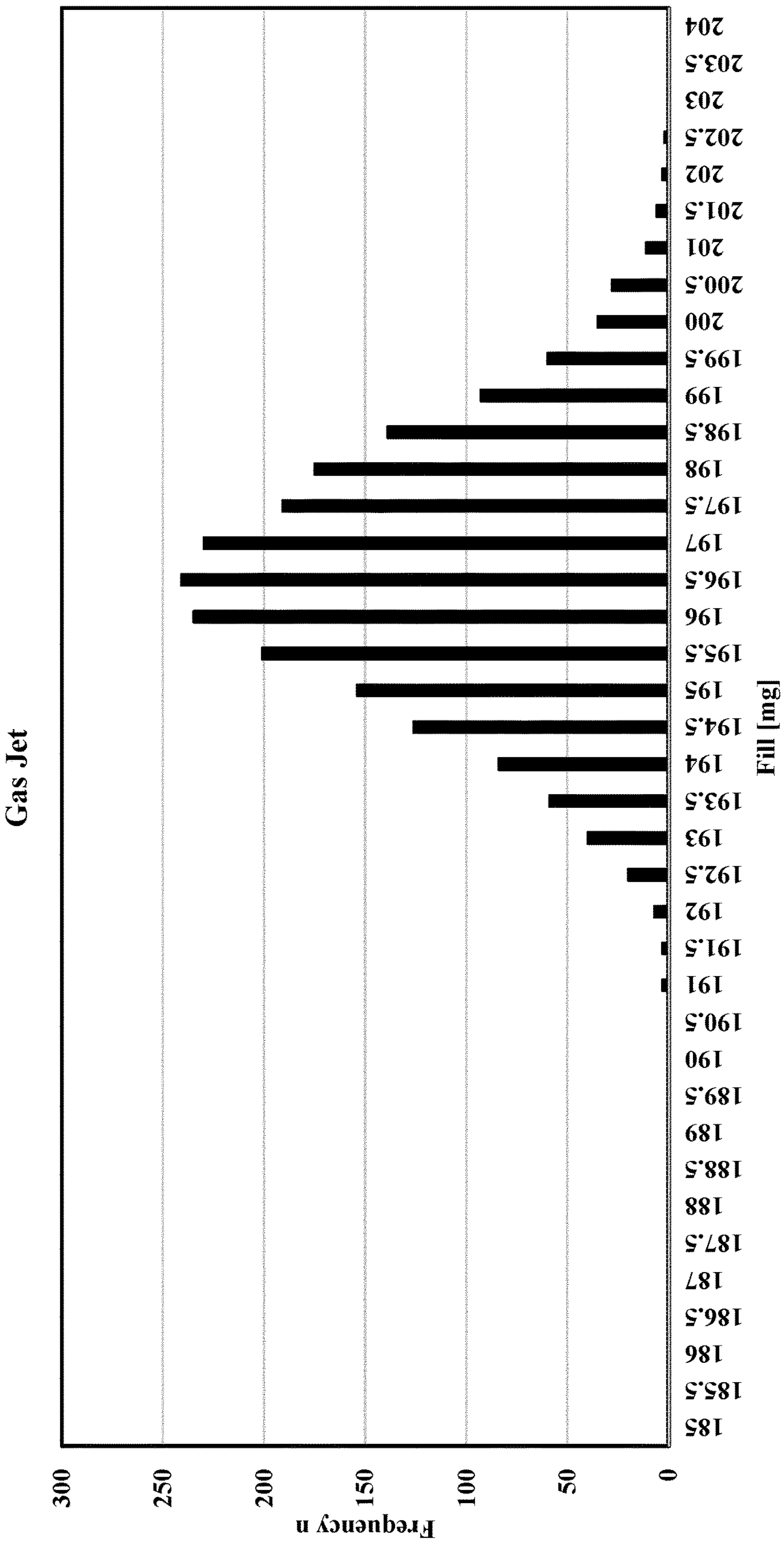
FIG. 21 shows the data of the filling with the apparatus of instant invention with the use of the gas jet blow in graphical form.

FIG. 20 shows the data of the filling with the apparatus of U.S. Pat. No. 10,835,451 B2 with the use of the 9 scrapers (6-2) in graphical form;

FIG. 21 shows the data of the filling with the apparatus of instant invention with the use of the gas jet blow in graphical form;

the frequency n are the number of fills with the respective fill weight in mg.

LIST OF REFERENCE NUMERALS

1 dosing element
1-1 inner tube shaped extension
1-2 outer tube shaped extension
1-3 SPACE between the outer tube shaped extension and the inner tube shaped extension
1-4 dosing chamber
1-5 BEND in the wall of the outer tube shaped extension
1-6 rim of the end of the wall of the outer tube shaped extension
1-7 rim of the end of the wall of the inner tube shaped extension
1-8 SLIT between the end of the inner tube shaped extension and the end of the outer tube shaped extension
1-9 opening of the dosing chamber
1-12 protruding section of the dosing element
1-13 protruding section of the inner tube shaped extension
1-14 protruding section of the outer tube shaped extension
1-15 upper section of the dosing element
1-16 upper section of the inner tube shaped extension
1-17 upper section of the outer tube shaped extension
2 DOSDEV
2-1 vacuum channel
2-2 SPACECAV
2-3 exit from SPACECAV which connects SPACECAV with the SPACE between the outer tube shaped extension and the inner tube shaped extension which ends with the SLIT
2-4 DOSDEV in the release position
2-5 DOSDEV and the reservoir in the distanced position relative to each other
2-6 DOSDEV and the reservoir in the collecting position relative to each other
2-7 filter tube
2-8 filter element
2-8-1 filter
2-8-2 welding that attaches the filter to the lower end of a tube
2-9 radial wall limiting the upper side of the dosing chamber
3 TRANSDEV
3-1 receiving opening
3-2 SLIDE
3-3 lower tube
3-4 base plate
3-5 discharging opening
3-6 vertical bore
3-7 circular opening in the base plate
3-8 upper section of lower tube
3-9 ring shaped protrusion of the lower tube, middle section of the lower tube
3-10 lower section of the lower tube
3-11 lower end of the lower tube
3-12 body of TRANSDEV
3-13 upper channel
3-14 circular recess of the vertical bore, first section of the vertical bore
3-15 second section of the vertical bore
3-16 third section of the vertical bore
3-17 upper region of TRANSDEV
3-18 lower region of TRANSDEV
3-19 chamfer of the upper end of the lower tube
3-20 rim of the end of the upper section of the lower tube
4 reservoir for containing an amount of solid particulate material
4-1 solid particulate material
4-2 slide for charging solid particulate material into the reservoir
4-3 excess solid particulate material
5 DOSAPP or part of DOSAPP
6-1 reservoir of the apparatus as disclosed in U.S. Pat. No. 10,835,451 B2 for containing an amount of solid particulate material
6-2 one of the nine scrapers
6-3 solid particulate material contained in the reservoir (6-1)

The invention claimed is:

1. A dosing device (DOSDEV 2) for dosing solid particulate material (4-1) into a receptacle;

the dosing device (DOSDEV 2) comprises a dosing element (1) which consists of an inner tube shaped extension (1-1) and an outer tube shaped extension (1-2), both extensions protrude downwards at a lower side of the dosing device (DOSDEV 2);

the inner tube shaped extension (1-1) and the outer tube shaped extension (1-2) are coaxially aligned with respect to each other;

the inner tube shaped extension (1-1) is located within the outer tube shaped extension (1-2);

an outer diameter of the inner tube shaped extension (1-1) is smaller than an inner diameter of the outer tube shaped extension (1-2), whereby a space (SPACE 1-3) is formed between the outer tube shaped extension (1-2) and the inner tube shaped extension (1-1), the space (SPACE 1-3) extending circumferentially around the inner tube shaped extension (1-1);

an inside of the inner tube shaped extension (1-1) forms a dosing chamber (1-4);

an opening at a lower end of the inner tube shaped extension forms an opening (1-9) of the dosing chamber (1-4) at a lower end of the dosing chamber (1-4);

a wall of the outer tube shaped extension (1-2) extends beyond a rim (1-7) of an end of a wall of the inner tube shaped extension (1-1) in an axial direction and has a bend (BEND 1-5) in an axial proximity of the end of the wall of the inner tube shaped extension (1-1), by the bend (BEND 1-5) the wall of the outer tube shaped extension (1-2) extends radially inwards at least partially around the end of the inner tube shaped extension (1-1);

the outer tube shaped extension (1-2) ends with an opening whose diameter is smaller than the inner diameter of the outer tube shaped extension (1-2) axially before the bend (BEND 1-5);

the space (SPACE 1-3) extends over an inner surface of the bend (BEND 1-5) and further onto a rim (1-6) of the end of the wall of the outer tube shaped extension (1-2), thereby radially inwards from the bend (BEND 1-5) the space (SPACE 1-3) ends in an opening slit (SLIT 1-8) between the end of the inner tube shaped extension (1-1) and the end of the outer tube shaped extension (1-2);

the rim (1-6) of the end of the wall of the outer tube shaped extension (1-2) does not extend in a radial inward direction beyond an inner diameter of the end of the wall of the inner tube shaped extension (1-1);

wherein after the bend (BEND 1-5) in the radially inward direction towards the end of the outer tube shaped extension (1-2), the wall of the outer tube shaped extension (1-2) ends with an angle (ANGLE) relative to the axial direction of the outer tube shaped extension (1-2);

wherein the angle (ANGLE) is from 60 to 90°; and wherein the space (SPACE 1-3) is connected to a gas supply to selectively provide gas at a predetermined pressure to the slit (SLIT 1-8).

2. The dosing device (DOSDEV 2) according to claim 1, wherein the dosing device is adapted for filling the receptacle, which is a two piece hard capsule used for medical and nutritional applications.

3. The dosing device (DOSDEV 2) according to claim 1, wherein the inner tube shaped extension (1-1) is a part which is separable from the outer tube shaped extension (1-2) and from any other part of the dosing device (DOSDEV 2); and the outer tube shaped extension (1-2) is a part which is separable from the inner tube shaped extension (1-1) and from any other part of the dosing device (DOSDEV 2).

4. The dosing device (DOSDEV 2) according to claim 1, wherein the dosing device (DOSDEV 2) is a device that comprises more than one dosing element (1);

wherein POS-DE-DOSDEV is the number of positions of dosing elements (1) in the dosing device (DOSDEV 2); and the POS-DE-DOSDEV is from 1 to 48.

5. The dosing device (DOSDEV 2) according to claim 4, wherein all of the dosing elements (1) contained in the dosing device (DOSDEV 2) protrude axially with the same vertical length and all the lower ends of the outer tube shaped extensions (1-2) are horizontally aligned with each other with respect to their vertical position in the dosing device (DOSDEV 2).

6. The dosing device (DOSDEV 2) according to claim 1, wherein the outer tube shaped extension (1-2) ends with an opening whose diameter is equal to or smaller than the outer diameter of the inner tube shaped extension (1-1), and whose diameter is not smaller than an inner diameter of the inner tube shaped extension (1-1).

7. The dosing device (DOSDEV 2) according to claim 1, wherein the angel is 90° and the end of the wall of the outer tube shaped extension (1-2) ends with the rim (1-6) vertically aligned with an inner surface of the inner tube shaped extension (1-1).

8. The dosing device (DOSDEV 2) according to claim 1, wherein the width of the slit (SLIT 1-8) is from 0.1 to 1 mm.

9. The dosing device (DOSDEV 2) according to claim 1, wherein the inner tube shaped extension (1-1) comprises a protruding part having an inner diameter, and further wherein the inner diameter of the protruding part of the inner tube shaped extension (1-1) is from 3 to 10 mm.

10. The dosing device (DOSDEV 2) according to claim 1, wherein an upper side of the dosing chamber (1-4) is limited by a radial wall (2-9) comprising a filter element (2-8), wherein the filter element (2-8) comprises a filter (2-8-1).

11. The dosing device (DOSDEV 2) according to claim 1, wherein the dosing device (DOSDEV 2) comprises a body which has a position of the dosing element (1), wherein the dosing element (1) is a part which is separable from any other part of the dosing device (DOSDEV 2), and can be connected to the body of the dosing device (DOSDEV 2);

wherein the dosing device (DOSDEV 2) is a kit of parts comprising a set of dosing elements (SODE) at for the position of a dosing element (1);

wherein the dosing elements (1) of the SODE are parts which are separable from each other and from any other part of the dosing device (DOSDEV 2);

within each of the SODE, the inner diameter of the inner tube shaped extension (1-1) of any one of the dosing elements (1) contained in the SODE is different from the inner diameter of the inner tube shaped extension (1-1) of any of the other dosing elements (1) contained in the SODE;

any one of the SODE is identical with any one of the other SODE.

12. The dosing device (DOSDEV 2) according to claim 11, wherein the number of dosing elements (NUM-DE-SODE) contained in each one of the SODE is from 2 to 10.

13. A dosing apparatus (DOSAPP 5) comprising a dosing device (DOSDEV 2) according to claim 1;

the dosing apparatus (DOSAPP 5) is adapted for being connected to a gas supply and to a vacuum source;

when the dosing apparatus (DOSAPP 5) is connected to the gas supply, then the space (SPACE 1-3) is in fluid connection with the gas supply;

when the dosing apparatus (DOSAPP 5) is connected to the vacuum source, then the dosing chamber (1-4) is in fluid connection with the vacuum source;

the dosing apparatus (DOSAPP 5) has at least two positions for the dosing device (DOSDEV 2), a first position and a second position, these at least two positions of the dosing device (DOSDEV 2) are horizontally spaced apart, and the dosing apparatus (DOSAPP 5) can displace the dosing device (DOSDEV 2) back and forth between the at least two positions.

14. The dosing apparatus (DOSAPP 5) according to claim 13, wherein the dosing apparatus (DOSAPP 5) has an interface for interacting with a reservoir (4) for containing the solid particulate material (4-1);

the interface is formed by the lower end of the dosing chamber (1-4), that is the opening (1-9) of the dosing chamber (1-4) of the dosing device (DOSDEV 2).

15. The dosing apparatus (DOSAPP 5) according to claim 13, wherein the dosing apparatus (DOSAPP 5) comprises a transfer device (TRANSDEV 3) adapted for transferring the solid particulate material (4-1) from the dosing device (DOSDEV 2) into the receptacle;

the transfer device (TRANSDEV 3) has an upper side facing upwards in a vertical direction and a bottom side facing downward in a vertical direction;

the transfer device (TRANSDEV 3) comprises in its upper side a receiving opening (3-1) and in its bottom side a discharging opening (3-5);

the receiving opening (3-1) and the discharging opening (3-5) are connected by a channel;

the receiving opening (3-1) of the transfer device (TRANSDEV 3) corresponds to the opening (1-9) of the dosing chamber (1-4) of the dosing device (DOSDEV 2);

the discharging opening (3-5) of the transfer device (TRANSDEV 3) is adapted to serve as an interface for interacting with an opening of the receptacle;

the first of the at least two positions that the dosing apparatus (DOSAPP 5) has for the dosing device (DOSDEV 2) is the release position of the dosing device (DOSDEV 2), and in the release position the dosing device (DOSDEV 2) is located above the transfer device (TRANSDEV 3) and the opening (1-9) of the dosing chamber (1-4) of the dosing device (DOSDEV 2) is in vertical alignment with the receiving opening (3-1) of the transfer device (TRANSDEV 3) for releasing a collected dose of the solid particulate material (4-1) from the dosing chamber (1-4) into the receiving opening (3-1) of the transfer device (TRANSDEV 3);

if the dosing apparatus (DOSAPP 5) can displace the dosing device (DOSDEV 2) in at least one of the at least two positions, which are horizontally and vertically spaced apart, then it is the second of the at least two positions that the dosing apparatus (DOSAPP 5) has for the dosing device (DOSDEV 2) where the dosing apparatus (DOSAPP 5) can displace the dosing device (DOSDEV 2) vertically.

16. The dosing apparatus (DOSAPP 5) according to claim 15, wherein the channel comprises two sections, an upper channel (3-13) and a lower channel;

an upper end of the upper channel (3-13) is the receiving opening (3-1);

a lower end of the lower channel is the discharging opening (3-5);

the upper channel (3-13) is a straight channel with a direction in the transfer device (TRANSDEV 3) with an angle against the vertical direction of from greater than 0 to smaller than 90°;

the lower channel is a straight channel with a vertical direction in the transfer device (TRANSDEV 3).

17. The dosing apparatus (DOSAPP 5) according to claim 16, wherein the transfer device (TRANSDEV 3) comprises at least two parts, which are separable from each other and from any other part of the transfer device (TRANSDEV 3), wherein the at least two parts comprise a body (3-12) and the lower channel comprises a tube shaped part called a lower tube (3-3);

the body (3-12) of the transfer device (TRANSDEV 3) has a vertical bore (3-6) that extends from a bottom of the body (3-12) of the transfer device (TRANSDEV 3) upwards into the body (3-12) of the transfer device (TRANSDEV 3) and which corresponds to the lower tube (3-3).

18. The dosing apparatus (DOSAPP 5) according to claim 17, wherein the transfer device (TRANSDEV 3) comprises at least three parts, the body (3-12) of the transfer device (TRANSDEV 3), a base plate (3-4) and the lower tube (3-3), which are separable from each other and from any other part of the transfer device (TRANSDEV 3);

the lower tube (3-3) is fastened to the body (3-12) of the transfer device (TRANSDEV 3) in the vertical bore (3-6) by the base plate (3-4), and the base plate (3-4) is fastened to the bottom of the body (3-12) of the transfer device (TRANSDEV 3);

the base plate (3-4) has a circular opening (3-7) with a diameter corresponding to an outer diameter of the lower tube (3-3) so that the lower tube (3-3) can be fixed to the transfer device (TRANSDEV 3) in the vertical bore (3-6).

19. The dosing apparatus (DOSAPP 5) according to claim 18, wherein the transfer device (TRANSDEV 3) is a kit of parts comprising the base plate (3-4), the body (3-12) of the transfer device (TRANSDEV 3) with the channel comprising the vertical bore (3-6), the upper channel (3-13) and a set of lower tubes (SOLT) for the vertical bore (3-6);

wherein in the SOLT, a diameter of the discharging opening (3-5) of any one of the lower tubes (3-3) contained in the SOLT is different from a diameter of the discharging opening (3-5) of any other of the lower tubes (3-3) contained in the SOLT;

with each lower tube (3-3) in the SOLT fitting into the vertical bore (3-6);

with the lower tubes (3-3) in the SOLT and the base plate (3-4) being parts which are separable from each other and from any other part of the transfer device (TRANSDEV 3).

20. The dosing apparatus (DOSAPP 5) according to claim 19, wherein the number of lower tubes (3-3) in the SOLT is from 2 to 14.

21. The dosing apparatus (DOSAPP 5) according to claim 15, wherein when the dosing device (DOSDEV 2) comprises more than one dosing element (1), then the transfer device (TRANSDEV 3) comprises the same number of channels as the number of dosing elements (1) in the dosing device (DOSDEV 2), wherein the vertical positions of the receiving openings (3-1) with respect to their vertical position in the transfer device (TRANSDEV 3) are the same for all receiving openings (3-1), so all the receiving openings (3-1) are vertically aligned with each other with respect to their vertical position in the transfer device (TRANSDEV 3);

in the release position of the dosing device (DOSDEV 2) the dosing device (DOSDEV 2) is located above the transfer device (TRANSDEV 3) in such a way that the horizontal positions of the receiving openings (3-1) in the transfer device (TRANSDEV 3) correspond to the horizontal positions of the openings of the dosing chambers (1-4) in the dosing device (DOSDEV 2), so that each opening of a dosing chamber (1-4) in the dosing device (DOSDEV 2) has one corresponding receiving opening (3-1) in the transfer device (TRANSDEV 3) forming a corresponding pair; and the dosing device (DOSDEV 2) is positioned above the transfer device (TRANSDEV 3) in such a way that each opening of a dosing chamber (1-4) is in horizontal and vertical alignment with the corresponding receiving opening (3-1) in the transfer device (TRANSDEV 3).

22. The dosing apparatus (DOSAPP 5) according to claim 13, wherein the dosing apparatus (DOSAPP 5) comprises two dosing devices (DOSDEV 2), one of the two dosing devices (DOSDEV 2) is positioned in the first of the at least two positions which are horizontally spaced apart that the dosing apparatus (DOSAPP 5) has for the dosing device (DOSDEV 2) when the other of the two dosing devices (DOSDEV 2) is positioned in the second of the at least two positions which are horizontally spaced apart that the dosing apparatus (DOSAPP 5) has for the dosing device (DOSDEV 2); and the dosing apparatus (DOSAPP 5) can exchange the two dosing devices (DOSDEV 2) between these two positions.

23. A method for dosing solid particulate material (4-1) from a reservoir (4), which contains the solid particulate material (4-1), into a receptacle contained in a retaining unit for retaining the receptacle with the dosing apparatus (DOSAPP 5) defined in claim 13, the reservoir (4) contains an amount of solid particulate material (4-1);

the dosing apparatus (DOSAPP 5) is connected to a gas supply and to a vacuum source;

the space (SPACE 1-3) is in fluid connection with the gas supply;

the dosing chamber (1-4) is in fluid connection with the vacuum source;

the second of the two positions that the dosing apparatus (DOSAPP 5) has for the dosing device (DOSDEV 2) is a position of the dosing device (DOSDEV 2) above the reservoir (4);

when the dosing device (DOSDEV 2) is in the second position, then the dosing apparatus (DOSAPP 5) can displace the dosing device (DOSDEV 2) and the reservoir (4) relative to each other back and forth between two vertical positions, a collecting position and a distanced position;

in the collecting position the lower end of the dosing chamber (1-4), that is the opening (1-9) of the dosing chamber (1-4), is immersed in the solid particulate material (4-1) when the solid particulate material (4-1) is contained in the reservoir (4);

in the distanced position the lower end of the dosing chamber (1-4), that is the opening (1-9) of the dosing chamber (1-4), is outside and above the solid particulate material (4-1) when the solid particulate material (4-1) is contained in the reservoir (4);

the transfer device (TRANSDEV 3) is located above the receptacle retaining unit and the discharging opening (3-5) of the transfer device (TRANSDEV 3) is in vertical alignment with the opening of the receptacle;

the method comprises six steps, step (A), step (B), step (C), step (D), step (E) and step (F), which are done consecutively in their alphabetical order, (A) displacing the dosing device (DOSDEV 2) and the reservoir (4) relative to each other from the distanced position to the collecting position, thereby immersing the lower end of the dosing chamber (1-4) into the solid particulate material (4-1);

(B) applying a vacuum with a predetermined strength to the dosing chamber (1-4), thereby sucking a predetermined dose of the solid particulate material (4-1) into the dosing chamber (1-4);

(C) displacing the dosing device (DOSDEV 2) and the reservoir (4) relative to each other from the collecting position back to the distanced position;

(D) cutting off of any excess (4-3) solid particulate material (4-1) sticking to the outside of the lower end of the dosing element (1) of the dosing device (DOSDEV 2) with a gas jet blown out of the slit (SLIT 1-8) of the dosing element (1) by pressing gas with a predetermined pressure for a predetermined time from the gas supply into the space (SPACE 1-3);

(E) displacing the dosing device (DOSDEV 2) from the distanced position relative to the reservoir (4) to the release position;

(F) releasing the dose of solid particulate material (4-1) into the receptacle, with the dosing device (DOSDEV 2) being in the release position, by lowering the strength of the vacuum.

24. The method for dosing solid particulate material (4-1) according to claim 23, wherein after step (F) a seventh step, step (G), is done, in step (G) the dosing apparatus (DOSAPP 5) displaces the dosing device (DOSDEV 2) from the release position back to the distanced position.

25. The dosing apparatus (DOSAPP 5) according to claim 13 wherein the dosing apparatus (DOSAPP 5) can displace the dosing device (DOSDEV 2) in at least one of the at least two positions, which are horizontally spaced apart, also back and forth between at least two vertical positions, which are vertically spaced apart at the respective horizontal position.

* * * * *